US008553572B2

(12) United States Patent
Farrell et al.

(10) Patent No.: US 8,553,572 B2
(45) Date of Patent: Oct. 8, 2013

(54) INTERNET PROTOCOL OPTIMIZER

(75) Inventors: Richard S. Farrell, Tyngsboro, MA (US); David J. Reiland, Maple Grove, MN (US); James R. Signorelli, Champlin, MN (US)

(73) Assignee: Hyperdata Technologies, Inc., Maple Grove, MN (US)

( * ) Notice: Subject to any disclaimer, the term of this patent is extended or adjusted under 35 U.S.C. 154(b) by 1005 days.

(21) Appl. No.: 10/571,189

(22) PCT Filed: Sep. 9, 2004

(86) PCT No.: PCT/US2004/029715
§ 371 (c)(1),
(2), (4) Date: Mar. 9, 2006

(87) PCT Pub. No.: WO2005/026912
PCT Pub. Date: Mar. 24, 2005

(65) Prior Publication Data
US 2007/0110046 A1 May 17, 2007

Related U.S. Application Data

(60) Provisional application No. 60/501,970, filed on Sep. 10, 2003.

(51) Int. Cl.
*H04L 12/26* (2006.01)
(52) U.S. Cl.
USPC ........... 370/252; 370/401; 370/402; 370/338; 370/446; 709/222; 709/225
(58) Field of Classification Search
USPC ......... 370/338, 912, 902, 446, 463, 535, 401, 370/402, 469; 709/222, 225
See application file for complete search history.

(56) References Cited

U.S. PATENT DOCUMENTS

| 5,293,379 A * | 3/1994 | Carr ............................... 370/474 |
| 5,437,006 A | 7/1995 | Turski |
| 6,273,622 B1 | 8/2001 | Ben-David |

(Continued)

FOREIGN PATENT DOCUMENTS

| EP | 1063830 B1 | 7/2007 |
| WO | WO-9842107 A1 | 9/1998 |

(Continued)

OTHER PUBLICATIONS

NPL-Document RFC-793, Published, 1981 by Information Sciences Institute. See all document.*

(Continued)

*Primary Examiner* — Kibrom T Hailu
*Assistant Examiner* — Zewdu A Beyen
(74) *Attorney, Agent, or Firm* — Pauly DeVries Smith & Deffner, L.L.C.

(57) ABSTRACT

A method for optimizing the throughput of TCP/IP applications by aggregating user application data and consolidating multiple TCP/IP connection streams into a single optimized stream for delivery to a destination application. Optimization of the internet protocol uses a packet interceptor to intercept packets from a source application, a packet driver to aggregate the intercepted packets, a data mover to transport the aggregated packets to another data mover at the destination, a destination packet driver to disaggregate the transported aggregated packets, and a destination end processor to deliver the disaggregated IP packets to the destination application.

30 Claims, 50 Drawing Sheets

(56) References Cited

U.S. PATENT DOCUMENTS

| | | | |
|---|---|---|---|
| 6,460,085 B1 | 10/2002 | Toporek et al. | |
| 6,496,505 B2* | 12/2002 | La Porta et al. | 370/392 |
| 6,529,477 B1 | 3/2003 | Toporek et al. | |
| 6,614,808 B1* | 9/2003 | Gopalakrishna | 370/469 |
| 6,618,397 B1* | 9/2003 | Huang | 370/474 |
| 6,643,292 B2* | 11/2003 | Chapman et al. | 370/395.52 |
| 6,791,982 B2* | 9/2004 | Westberg | 370/392 |
| 6,947,401 B2* | 9/2005 | El-Malki et al. | 370/331 |
| 6,975,647 B2* | 12/2005 | Neale et al. | 370/466 |
| 6,987,771 B2* | 1/2006 | Shimizu et al. | 370/401 |
| 7,068,647 B2* | 6/2006 | Fangman et al. | 370/352 |
| 7,274,706 B1* | 9/2007 | Nguyen et al. | 370/419 |
| 7,305,493 B2* | 12/2007 | McAlpine et al. | 709/250 |
| 7,333,498 B2* | 2/2008 | Duisenberg et al. | 370/395.71 |
| 2001/0009554 A1 | 7/2001 | Katseff et al. | |
| 2002/0044556 A1* | 4/2002 | Ando et al. | 370/395.42 |
| 2002/0112076 A1* | 8/2002 | Rueda et al. | 709/245 |
| 2002/0116644 A1 | 8/2002 | Richard | |
| 2002/0194361 A1* | 12/2002 | Itoh et al. | 709/233 |
| 2003/0014544 A1* | 1/2003 | Pettey | 709/249 |
| 2003/0050974 A1 | 3/2003 | Mani-Meitav et al. | |
| 2003/0076832 A1* | 4/2003 | Ni | 370/395.1 |
| 2003/0210921 A1 | 11/2003 | Ueda et al. | |
| 2003/0211832 A1 | 11/2003 | Inokoshi et al. | |
| 2003/0212864 A1 | 11/2003 | Hicken et al. | |
| 2003/0212869 A1 | 11/2003 | Burkey et al. | |
| 2003/0212870 A1 | 11/2003 | Nowakowski | |
| 2003/0217257 A1 | 11/2003 | Ebsen et al. | |
| 2003/0217310 A1 | 11/2003 | Ebsen et al. | |
| 2003/0223433 A1* | 12/2003 | Lee et al. | 370/395.52 |
| 2004/0039775 A1* | 2/2004 | Yoshida et al. | 709/203 |
| 2004/0042487 A1* | 3/2004 | Ossman | 370/466 |
| 2004/0081087 A1 | 4/2004 | Shea | |
| 2004/0215665 A1 | 10/2004 | Edgar et al. | |
| 2004/0243710 A1* | 12/2004 | Mao | 709/227 |
| 2005/0018651 A1* | 1/2005 | Yan et al. | 370/352 |
| 2007/0086454 A1* | 4/2007 | Grinfeld | 370/389 |

FOREIGN PATENT DOCUMENTS

| | | |
|---|---|---|
| WO | WO-0046669 | 8/2000 |
| WO | WO-03056718 A1 | 7/2003 |
| WO | WO-2005026912 | 3/2005 |

OTHER PUBLICATIONS

""International Search Report from International application No. PCT/US04/29715, corresponding to U.S. Appl. No. 60/501,970, mailed Mar. 2, 2005, p. 1"".

"NETEX General Information Manual", *Network Systems* 1987, 1-42.

Border, J. et al., "Performance Enhancing Proxies Intended to Mitigate Link-related Degradations", *The Internet Society* Jun. 2001, 1-41.

Tounsi, Hajer et al., "Small Packets Aggregation in an IP Domain", *IEEE* 2001, pp. 708-713.

"EP Supplementary Search Report under 153(7) EPC, for EP application No. 04783798.4, corresponding to U.S. Appl. No. 10/571,189, mailed Oct. 22, 2009, pp. 1-119".

"European Examination Report, Communication pursuant to Article 94(3) EPC, from the European Patent Office in EP Patent Application No. 04783798.4, corresponding to U.S. Appl. No. 10/571,189, dated Mar. 2, 2010, (pp. 1-6)".

"First Examination Report, from the Government of India Patent Office in IN Patent Application No. 797/KOLNP/2006, corresponding to U.S. Appl. No. 10/571,189, dated Mar. 3, 2010, (pp. 1-7)".

"Response to European Examination Report, Communication pursuant to Article 94 (3) EPC, dated Mar. 2, 2010, Filed in the European Patent Office on Sep. 21, 2010 for EP Patent Application No. 04783798.4, corresponding to U.S. Appl. No. 10/571,189, pp. 1-18".

European Communication Pursuant to Article 94(3) EPC, from the European Patent Office in corresponding EP Patent Application No. 04783798.4, mailed Jun. 9, 2011, 4 pages.

"Canadian Office Action Received", for Canadian Application No. 2538602, corresponding to U.S. Appl. No. 60/501,970, mailed Aug. 9, 2011, (pp. 8).

* cited by examiner

**Transport Protocol Optimizer Configuration

Transport Protocol Optimizer Configuration

Transport Protocol Optimizer Configuration

Transport Protocol Optimizer Configuration

Transport Protocol Optimizer Data Unit

TCP/IP Application Connection Process
(Source Side)

TCP/IP Application Connection Process
(Destination Side)

TCP/IP Application Connection Process
(Destination Side)

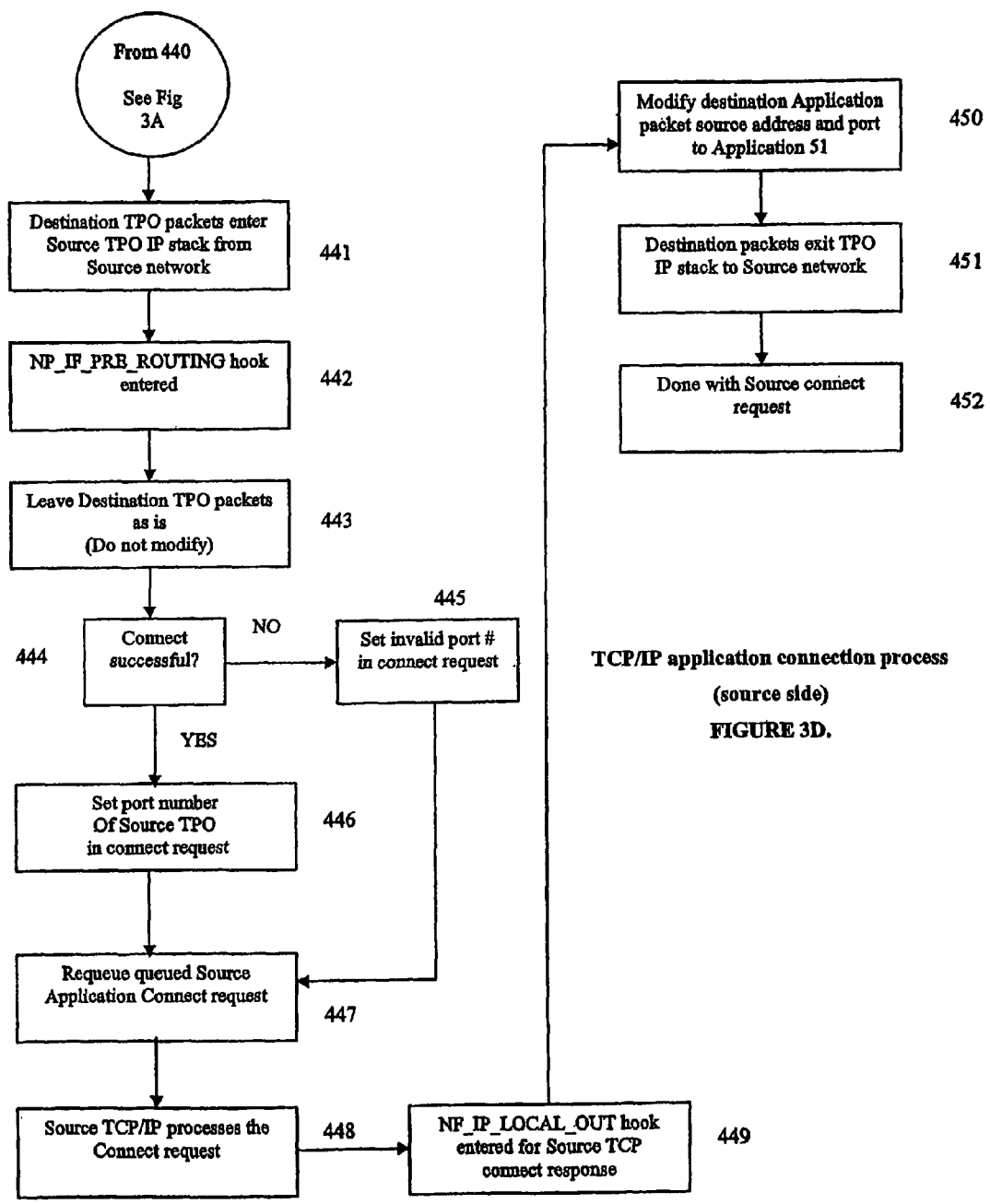

TCP/IP Application Write Process
(Source Side)

TCP/IP Application Write Process
(Destination Side)

TCP/IP Application UDP Write Process
(Source Side)

TCP/IP Application UDP Write Process
(Destination Side)

TCP/IP Application ICMP Write Process
(Source Side)

TCP/IP Application ICMP Write Process
(Destination Side)

Data Mover Network Request Block Structure

Data Mover Driver Protocol Data

Data Mover Network Message Header

Data Mover Network Connect / Confirm Protocol Data

Data Mover Physical Address Map List

Data Mover Physical Address Map Entry

Data Mover Physical Address Map Route

Data Mover Transport Protocol Base Field

The Transport Protocol Base Field is followed by one or more Transport Protocol Subfields (Figures 7B through 7E).

Data Mover Transport Protocol Connect Subfield

Data Mover Transport Protocol Data Subfield

Data Mover Transport Protocol Acknowledgement Subfield

Data Mover Transport Protocol Disconnect Subfield

Data Mover Session Manager Protocol Base Field

The Session Manager Protocol Base Field is followed by either the Session Manager Protocol Connect or Confirm Subfields (Figures 8B through 8C).

Data Mover Session Manager Protocol Connect Subfield

Data Mover Session Manager Protocol Confirm Subfield

Data Mover Session Services Protocol Base Field

The Session Services Protocol Base Field is followed by the Session Services Protocol Null Subfield (Figure 8E).

Data Mover Null Session Protocol Subfield

Data Mover Session Connection Sequence

Data Mover Transport Connection Sequence

Data Mover Transport Reconnection Sequence

Packet Driver Protocol Data

Packet Driver Protocol Data - Routing Header

Packet Driver Protocol Data - Message Header

Sample TPO Installation Browser Screen

Sample TPO Configuration Browser Screen

Sample TPO Commands Browser Screen

- Incoming source application IP packets on source LAN
- Packets flow through network layer into IN_EXIT
- Packet interceptor changes destination IP address and port to source TPO IP address and edge processor port
- Packets are read by edge processor Source TPO Packet Flow – Application Source-in Packet Interceptor Source TPO Packet Flow – Application Source-in Packet Delivery

Source TPO packet flow

☐ Packet driver aggregates packets and passes them to compression engine
☐ Compressed aggregated packets are returned to data mover Source TPO Packet Flow – Aggregated Packet Compression Source TPO Packet Flow – Optimized Source-out

Destination TPO packet flow

- Data mover drives UDP connection from peer TPO data mover
- Incoming TPO IP packets on destination LAN
- Packets flow through network layer into IN_EXIT
- Packets flow unchanged through IN_EXIT into data mover Destination TPO Packet Flow – Optimized Destination-in Destination TPO Packet Flow – Packet Driver Decompression Destination TPO Packet Flow – Disaggregation

Destination TPO Packet Flow

- Packets flow into OUT_EXIT
- Source IP address and port is changed to originating server IP address and port
- Packets flow through the network layer onto the destination LAN Destination TPO Packet Flow – Application Destination-out Packet Interceptor

TPO TCP Connection Flow

INTERNET PROTOCOL OPTIMIZER

CROSS-REFERENCE TO RELATED APPLICATION

This application claims the benefit of U.S. Provisional Patent Application No. 60/501,970 entitled "TRANSPORT PROTOCOL OPTIMIZER" as filed on Sep. 10, 2003.

FIELD OF TECHNOLOGY

The technology described in this specification relates to data communication protocols for optimizing the end-to-end throughput of data transported over TCP/IP networks.

DESCRIPTION OF EMBODIMENTS

Background

Internet Protocol (IP) networks are ubiquitous and their use continues to expand. Moreover, the need for fast transfer of large amounts of data over IP networks is also expanding. For example, businesses must ensure that their operations remain up and running during a disaster. This often requires transfer of the business' data over IP networks for storage at a remote site. In examples such as this, large amounts of data are transferred and the transfer must be done at high speed to minimize the cost for use of the transport media, such as coaxial cable, fiber cable, and microwave links. However, TCP/IP was not designed to efficiently handle fast transfer of large blocks of data; it was designed to handle small packets in low latency networks.

The embodiments of the technology presented in this specification discloses a process and apparatus for optimization of data transfer over an IP network. The embodiments of the internet protocol optimizer enhances the performance of IP applications without requiring any changes to the user's applications or tuning of the platform on which the applications are running.

The embodiments described are often referred to as the "transport protocol optimizer" or as the "TPO." This is not meant to limit the technology claimed in the specification. It is meant to be a general reference, the purpose of which is to make the specification more readable and understandable.

The transport protocol optimizer is a network enhancement of IP application performance when running over high-speed IP networks. The transport protocol optimizer enhances performance by (a) overcoming the effects of long distance (latency) on TCP/IP traffic, (b) compressing data at the block level, and (c) shielding TCP applications from variations in circuit conditions that may be occasional, but are often disruptive such as latency, jitter, bit error rate, distance, and bandwidth.

An embodiment of the internet protocol optimizer uses Linux-based software to enhance business continuity application performance when running over long-distance IP networks. The TPO may be implemented as a network appliance on a standard Intel platform. It may, however, be ported to different operating systems or computer platforms, such as a blade in a storage controller or switching platform. Use of the internet protocol optimizer for data replication and/or data mirroring of corporate mission critical, high-volume data is best transported over corporate private IP (intranet) networks, rather than over public IP (internet) networks.

Except in a few instances, embodiments of the TPO are described in the form of independent network appliances. Nevertheless, the TPO is not limited to this implementation. A person of ordinary skill in the art of data communications and computer technology can readily implement the TPO in other embodiments, including in a software only version running on an application server, a network switch, or other computing device.

Several characteristics of TCP/IP cause it to perform poorly over long distances. These are, for example, its (a) window size, (b) acknowledgement scheme, (c) slow start, and (d) session free-for-all.

Window Size.

To utilize the full available bandwidth of a data session, enough data must be sent to "fill the pipe". The amount of data that can be "in the air" at any point in time is governed by the window sizing capability of the TCP stack and the applications. Most TCP implementations support a feature called window scaling, which does allow large windows to be used. However, each TCP implementation may implement this feature differently, use a different default for setting the initial size, or in some cases, may not even support it. At best case, it then becomes up to the user to tune the TCP stack, and possibly even the TCP applications in order to enable this capability. In many organizations, this may not be a viable option. Another disadvantage of using window scaling is that it may apply to all applications running on that particular server, when in fact, the desire might be to only selectively enable this feature for a particular application. Also, with window scaling enabled, the window may still not be large enough, or the server or application may not have enough buffer space available to support the capacity of the network. For example, the total round-trip time for a 3000 mile connection is approximately 60 milliseconds, creating an available data "pipe" at 100 Megabits per second (Mbps) of 750 Kilobytes. A satellite connection (540 milliseconds round-trip time) at 45 Mbps creates a 3 Megabyte pipe. If window scaling is not implemented, or is not tuned to the network requirements, there may still be a large amount of "empty pipe". In contrast, the TPO window size is dynamically tuned, independent of any application TCP stack capability, and keeps the available network bandwidth pipe full, resulting in more efficient utilization and minimizing the "empty pipe" situation.

Acknowledgement Scheme.

The TCP acknowledgement scheme may cause the entire stream from any lost portion to be retransmitted in its entirety. In high packet loss/bit-error-rate (BER) scenarios this can cause large amounts of bandwidth to be wasted in resending data that has already been successfully received, all with the long latency time of the communication path. Unlike the TCP acknowledgement scheme, the TPO's acknowledgement scheme retransmits only segments that have not been positively acknowledged, and not all the subsequent segments that have already been successfully sent.

Slow Start.

TCP data transfers start slowly to avoid congestion due to possible large numbers of sessions competing for the bandwidth and ramp-up to their maximum transfer rate, resulting in poor performance for short sessions. However, the TPO startup configuration parameters allow transmissions to start at a close approximation of the available session bandwidth. Dynamic adjustments, based on feedback from the receiver in the acknowledgement protocol, quickly "zero-in" on the appropriate send rate for current conditions.

Session Free For All.

Each TCP session is throttled and contends for network resources independently ("session free-for-all"), which can cause over-subscription of resources relative to each individual session. But, the TPO's session pipeline allows traffic from multiple TCP sessions to be aggregated over a smaller set of connections between TPOs, enabling a more efficient use of the bandwidth and less protocol overhead than acknowledging many small messages for individual connections.

An embodiment of the TPO comprises: (a) an IP packet interceptor, which intercepts the IP packets and reroutes the IP packets over the TPO network; (b) one or more edge processors, which interface the IP-packet interceptor and the packet driver and interface the IP-packet interceptor and the TCP/IP application; (c) a packet driver, which aggregates the IP packets for optimization of their transmission over a communication path; (d) a compression engine, which compresses the data prior to delivery over the TPO connection and decompresses it after delivery; (e) a data mover, which provides the transport protocol that is used for delivery of the optimized TPO packets;

BRIEF DESCRIPTION OF THE DRAWINGS

FIG. 3D is a diagram showing a TCP/IP application connection process.

EMBODIMENTS

The TPO accelerates selected IP traffic over a wide area network. Participating servers and/or IP-enabled storage controllers direct IP traffic to the TPO in a gateway or proxy mode. The gateway mode is enabled by configuring a static route in each of the application servers or storage controllers. The static route specifies the local TPO as the gateway for the destination server's or storage controller's IP address. The proxy mode is enabled by configuring an additional IP address on the TPO to act as a "proxy" address for the real IP address of the destination server or storage controller. Proxy mode is typically easier to deploy, but consumes additional IP addresses.

Figure 21:
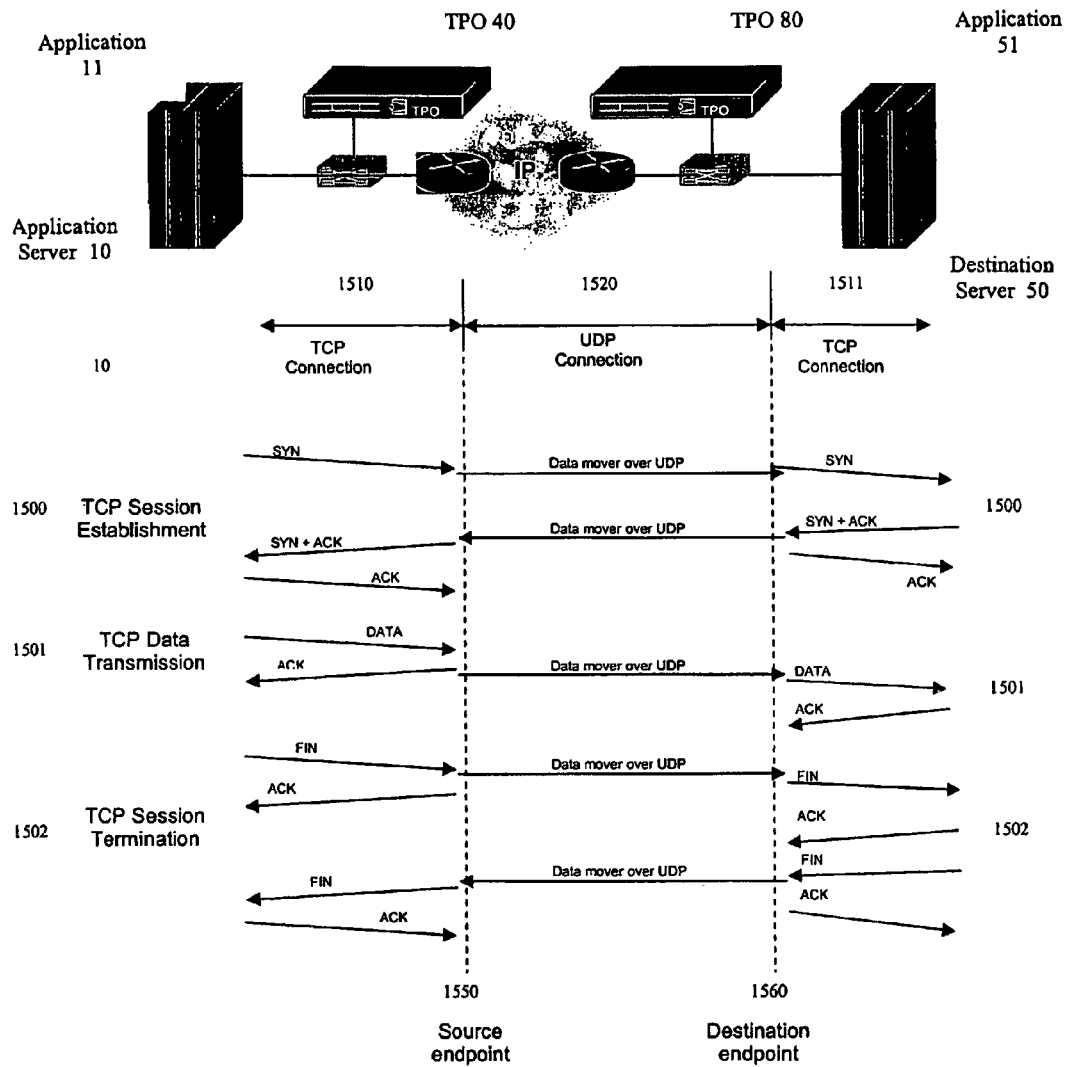
FIG. 21 is a diagram showing a TPO TCP connection flow.

The TPO selects packets for optimization based on a set of filtering criteria, which comprises the source IP address and port number, the destination IP address and port number, and the protocol type (sometimes referred to in this specification as the "quintuple"). Selected packets are aggregated and sent over the TPO connection using a protocol (the "data mover" protocol) that is optimized for achieving better performance over a wide area network. Non-selected packets are returned to the IP stack and follow the IP routing rules in effect. Typically the non-selected packets will still reach the destination, but will not be optimized for high speed transmission over the network. FIG. 21 shows a TCP application 11, which generates TCP/IP packets that are routed to a source TPO 40. The source TPO 40 optimizes the packets, and sends the optimized IP packets over an already established communication path 1520 to a destination TPO 80. (The TPO communication path 1520 is established during TPO initialization). The destination TPO 80 then strips away the optimization encapsulation from the TCP/IP packets and forwards them to the destination TCP application 51. FIG. 21 shows that the TCP connections between the source TCP application 11 and its source TPO 40, and between the destination TCP application 51 and its destination TPO 80 are each maintained locally. The routes used by the application servers are static. The actual connection between the TPOs, however, is a UDP connection. TPO is designed to be transparent to the network application. The behavior of the application remains unchanged. Whether the application was designed to operate on a peer-to-peer level or a client/server level, it continues to function in that manner over the TPO. The application is not aware that the packets are intercepted and rerouted. When the packets are received by the destination application, they look the same as if they had not been intercepted by the TPO.

The performance gains achieved by the TPO are due to reduced latency on the network. By performing more optimal transmissions and acknowledgements of buffers, the number of round-trip hops on the network are reduced, thus reducing the time required to send data. Because of the latency reduction, the greatest performance gain is usually achieved in situations that require sending large amounts of data over long distances.

The TPO is a process and/or an apparatus for enhancing the throughput of Transmission Control Protocol/Internet Protocol (TCP/IP) applications. It increases the performance of TCP/IP applications. It achieves this by (a) intercepting IP packets generated by an application running on a server computer (or on any computer) and (b) placing the data in buffers for subsequent delivery over a UDP communication path (which is usually established prior to the interception process) between two TPOs. The application running on a server computer is connected to a Local Area Network (LAN). If the local application uses the Transport Control Protocol (TCP), that connection is terminated by the TPO that resides on the same network segment as the local application server. Packet interception and UDP delivery is performed without the originating TCP/IP application being aware of this redirection. Upon reaching the destination TPO, the intercepted packet data is removed from the destination UDP buffer and delivered to the destination server. If the intercepted source application is a TCP connection, then an independent TCP connection is established between the destination TPO and the destination application executing on the destination server.

The terms "originating," "source," "sending," "transmitting," or "local" as descriptors for application, server, TPO, switch, router, LAN, or other such thing are used interchangeably in this specification. The terms "destination," "receiving," or "remote" as descriptors for application, server, TPO, switch, router, LAN, or other such thing are also used interchangeably in this specification. In this specification the embodiments will usually be described in a configuration where the server is connected to LAN.

For maximum optimization, the TPO connection normally exists over a Wide Area Network (WAN), although this is not a requirement. A TPO connection may exist over any type of IP data communications network.

A fiber or copper gigabit Ethernet (GbE) Network Interface Card (NIC) is used to interface the TPO with the network. Optionally, another copper GbE NIC can be used as a TPO management interface.

The embodiments of the TPO describe implementations that intercept TCP, UDP, or ICMP protocol IP packets. However, the TPO may be configured to use other TCP/IP protocols by a person of ordinary skill in the art of data communication software protocols. Although the term "TCP" is used throughout this specification, it is meant in a broader sense to mean any TCP/IP protocol.

An aspect of an embodiment of the TPO includes a command interface that provides a data and statistics display capability, as well as the ability to modify operating parameters and configuration data.

Figure 10:
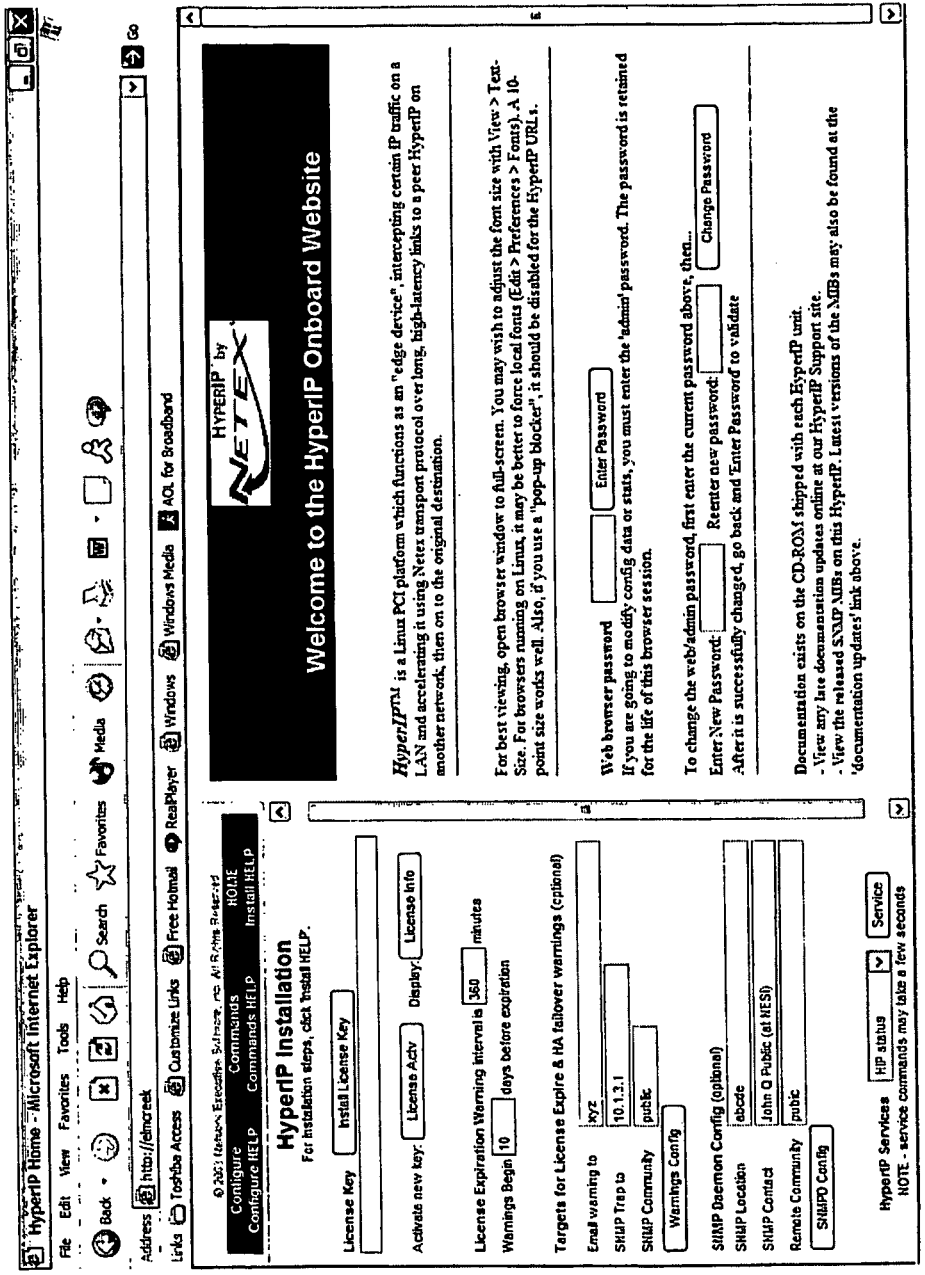
FIG. 10 is a diagram showing a sample TPO installation browser screen.
Figure 11:
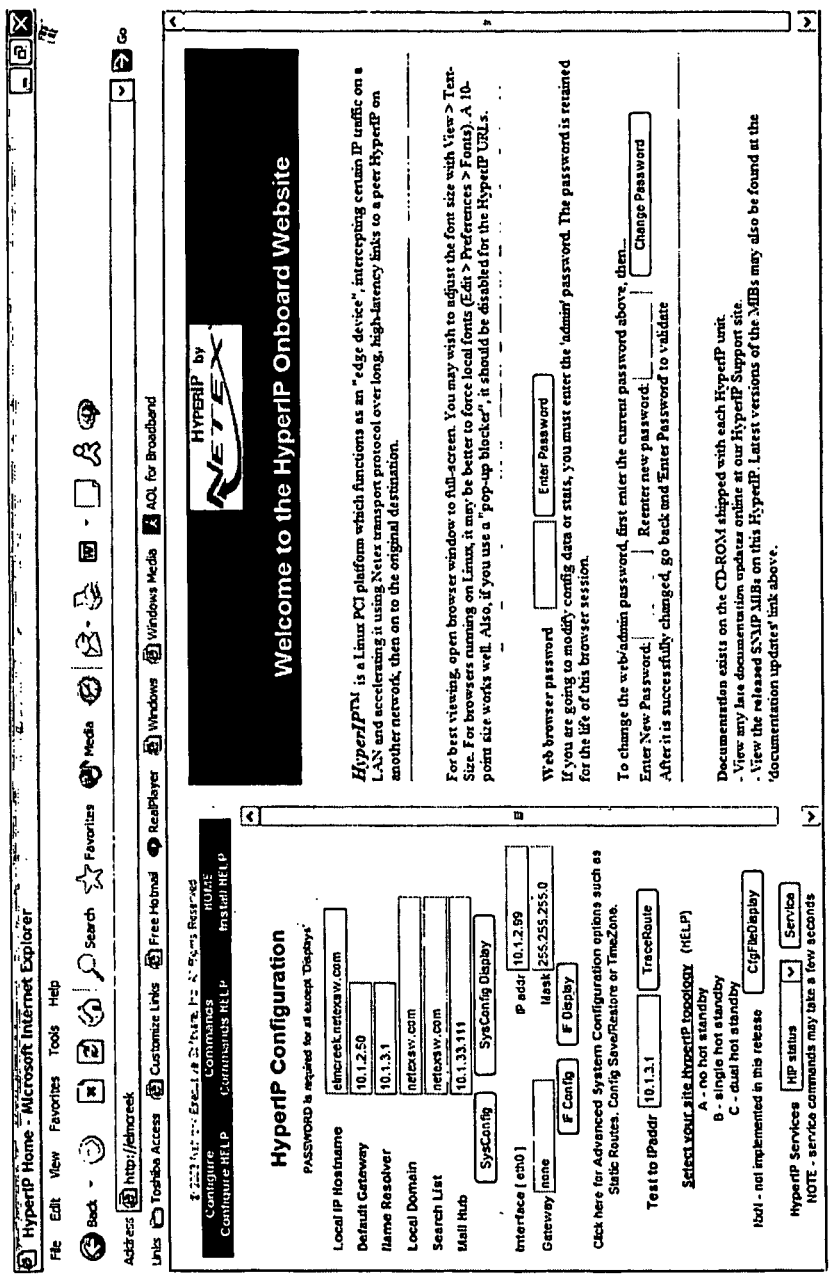
FIG. 11 is a diagram showing a sample TPO configuration browser screen.
Figure 12:
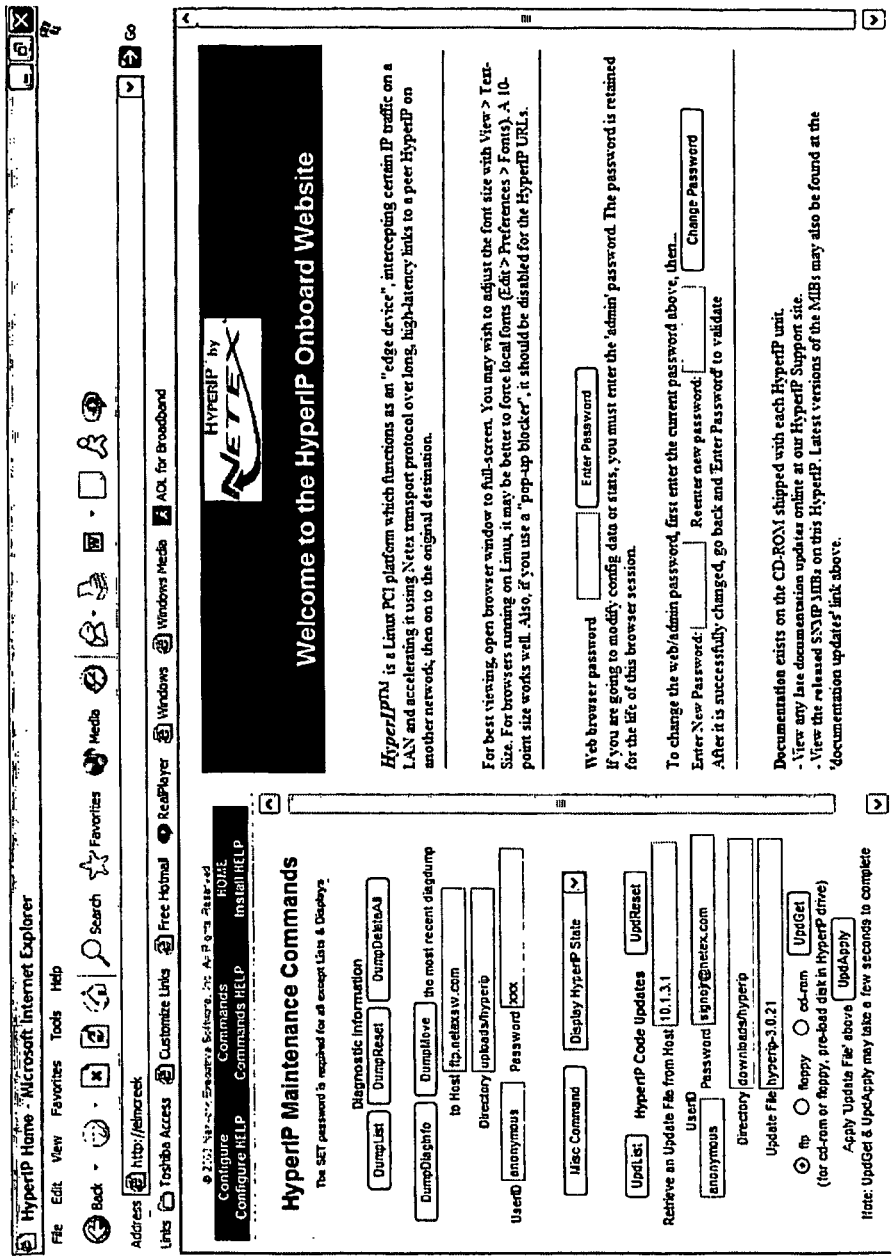
FIG. 12 is a diagram showing a sample TPO commands browser screen.

Another aspect is a Web browser for submission of selected TPO and data mover configuration and display commands from any workstation with a browser and network access to the TPO. Password protection is employed by requiring a password to do any command that changes the environment. An additional level of password protection can be employed by also requiring a password for display access. Sample browser screen images are shown in FIG. 10, FIG. 11, and FIG. 12.

Figure 1A:
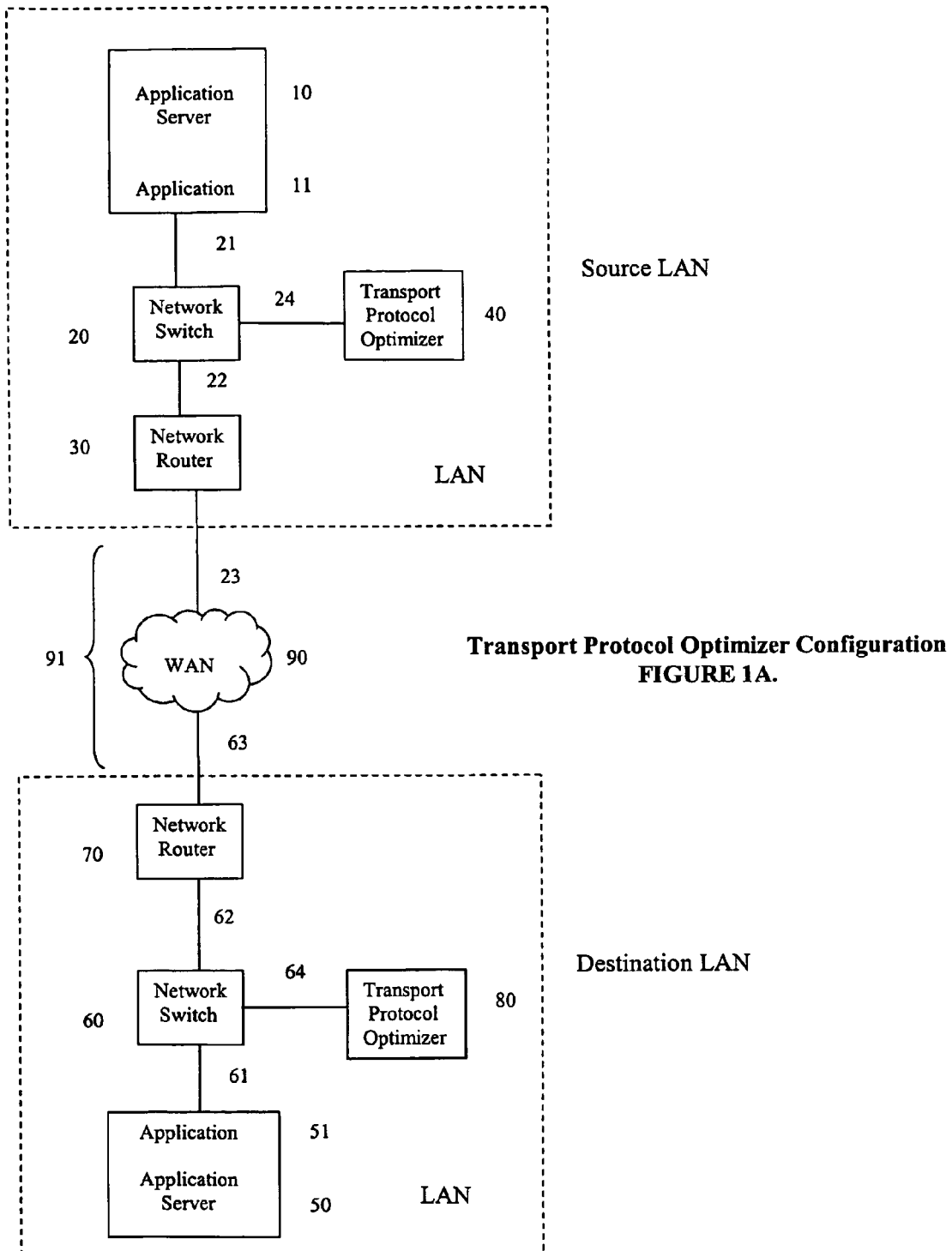
FIG. 1A is a diagram showing a transport protocol optimizer configuration.
Figure 1B:
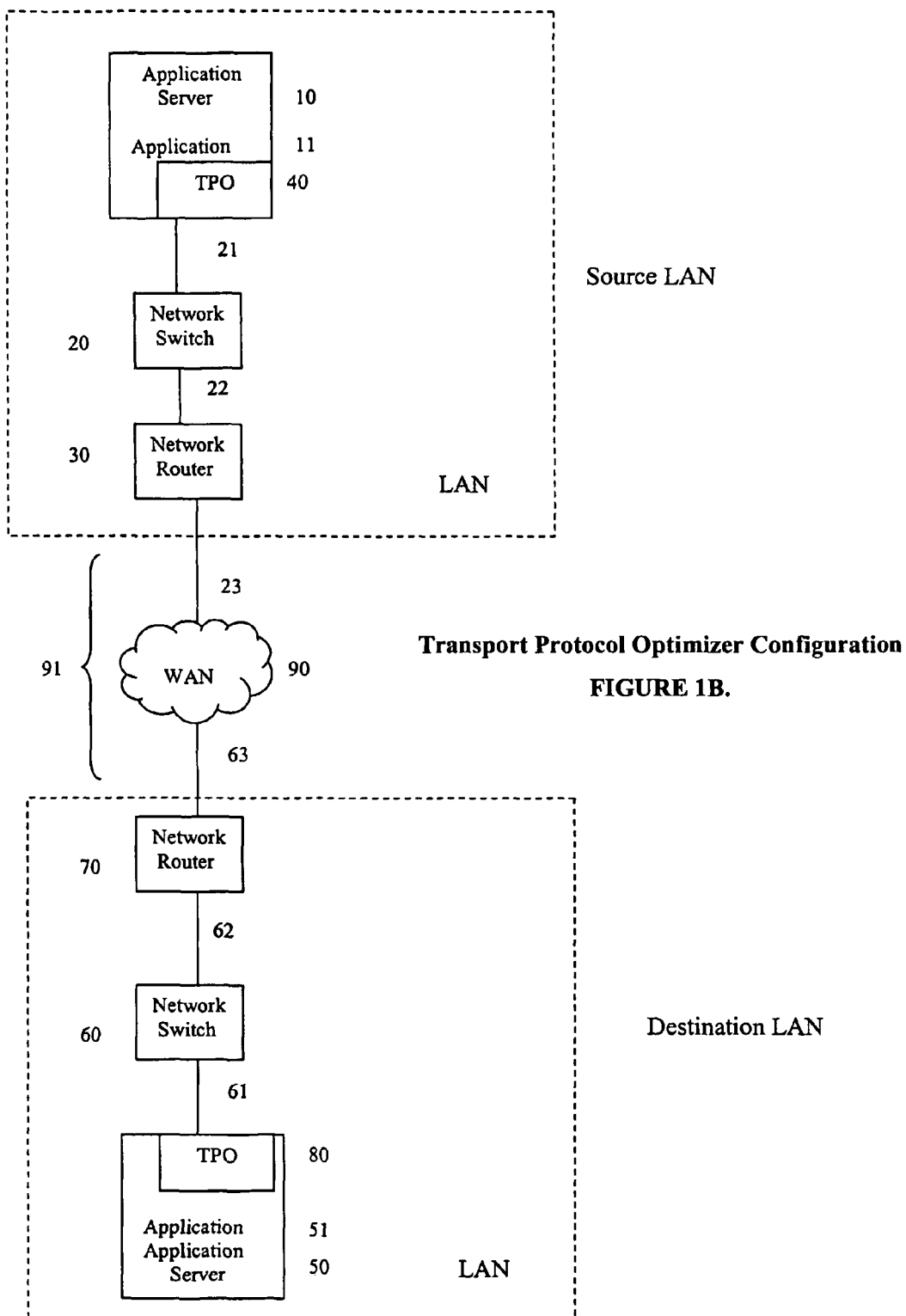
FIG. 1B is a diagram showing a transport protocol optimizer configuration.
Figure 1C:
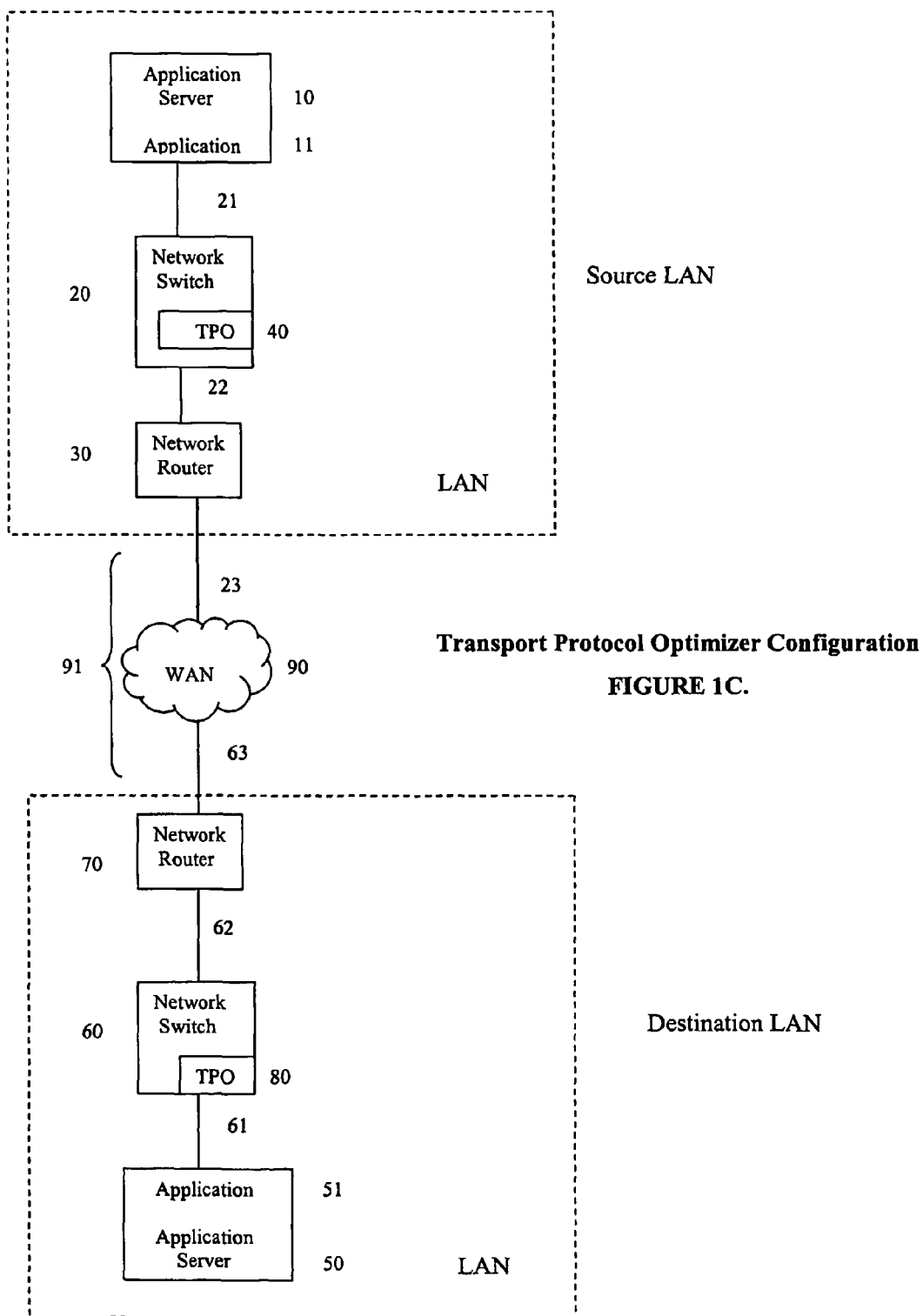
FIG. 1C is a diagram showing a transport protocol optimizer configuration.

FIGS. 1A, 1B, and 1C illustrate a configuration of a source LAN, a WAN 90 communication path 91, and a destination LAN. FIG. 1A depicts the location of an embodiment of source TPO 40 and destination TPO 80 in an end-to-end configuration. In this embodiment TPOs 40 and 80 are stand-alone units (also referred to in this specification as appliances). Each appliance includes a TPO hardware unit with TPO software residing within it. FIG. 1B illustrates another embodiment of source TPO 40 and destination TPO 80 in an end-to-end configuration. In this embodiment TPOs 40 and 80 are implemented in software only. The TPO software resides on host application servers 10 and 50. FIG. 1C illustrates a further embodiment of TPOs 40 and 80 in an end-to-end configuration. In this embodiment source and destination TPOs 40 and 80 are each implemented on a network component, shown here as network switches 20 and 60.

FIGS. 1A, 1B, and 1C use the terms network router and network switch to refer to standard networking components. These components are typically an integral part of all networking infrastructures. They are readily available from many different network component vendors. Throughout this specification the term TPO will be used to refer to one of the TPOs or both of the pair of TPOs. The technology described in this specification comprises a TPO for each communicating server.

In FIG. 1A source application server 10 executes a TCP/IP application 11. Source TCP/IP application 11 communicates with another TCP/IP application 51, the destination application, that executes on destination application server 50. Source network switch 20 provides connections to source application server 10 via cable 21, to source network router 30 via cable 22, and to source TPO 40 via cable 24. Collectively, this portion of the network comprises the source LAN. Destination network switch 60 provides connections to destination application server 50 via cable 61, to destination network router 70 via cable 62, and to destination TPO 80 via cable 64. Collectively, this portion of the network comprises the destination LAN. Source LAN is interconnected to destination LAN by the interconnection of source network router 30 to WAN 90 via cable 23 and with destination network router 70 from WAN 90 via cable 63. Data flow through the TPO configuration uses standard IP routing mechanisms. The data generated by source application 11 flows from source application server 10 to (a) source network switch 20, (b) source TPO 40, (c) back to source network switch 20, (d) source network router 30, (e) WAN 90 (or other communication path 91), (f) destination network router 70, (g) destination network switch 60, (h) destination TPO 80, (i) destination network switch 60, (j) destination application server 50, and (k) destination application 51. Data generated by destination application 51 flows in the reverse fashion back to source application 11. However, for purposes of clarity, when data is generated by destination application 51, destination application 51 becomes and is referred to as the source application as are each of its connected components which make up the destination LAN. In this embodiment TPO software runs on a TPO dedicated hardware platform. Collectively the TPO software and the dedicated TPO hardware platform is a TPO appliance. The dedicated hardware platform is optimized to serve the needs of TPO software.

In FIG. 1B source application server 10 is a server on which a TCP/IP application 11 executes and on which a software version of the TPO runs. TCP/IP application 11 communicates with another TCP/IP application 51 that executes on destination application server 50, on which the TPO is implemented. Network switch 20 provides connections to application server 11 with cable 21 and to network router 30 with cable 22. Collectively, this portion of the network comprises the source LAN. Network switch 60 provides connections to application server 50 with cable 61 and to network router 70 with cable 62. Collectively, this portion of the network comprises the destination LAN. Source LAN is interconnected to destination LAN by the interconnection of network router 30 to WAN 90 with cable 23 and with network router 70 to WAN 90 with cable 63. A person of ordinary skill in the art of writing data communication software can implement the TPO in the embodiment represented in FIG. 1B.

In FIG. 1C, application server 10 is a server on which a TCP/IP application 11 executes. Application server 10 communicates with another TCP/IP application 51 that executes on application server 50. Source TPO is integrated into network switches 20 and 60 or it is integrated into a separate server component in the network switches. Such a separate server component is referred to as a blade and is on a board with an edge connector for plugging into the back plane of, for example, the network switches. Network switch 20 provides connections to application server 10 with cable 21 and to network router 30 with cable 22. Collectively, this portion of the network comprises the source LAN. Network switch 60 connects to application server 50 with cable 61 and to network router 70 with cable 62. Collectively, this portion of the network comprises the destination LAN. Source LAN is interconnected to destination LAN by the interconnection of network router 30 to the WAN 90 with cable 23 and with network router 70 to the WAN 90 with cable 63.

An embodiment of the operation of the TPO process for optimizing IP traffic over a communications link comprises: (a) inserting a TPO into source LAN and another TPO into destination LAN; (b) interconnecting source and destination LANs by a communication path 91; (c) establishing a UDP communication link between source and destination TPOs; (d) directing IP packets (which are generated by a source TCP communication application executing on a source TCP application server on source LAN) to source TPO on source LAN using standard IP routing mechanisms; (e) accepting by the TPO for optimization of only those IP packets that meet a set of address and protocol filtering rules stored in the TPO memory; (f) rerouting of the accepted packets by the TPO while maintaining knowledge of the source IP address, source IP port, destination IP address, destination IP port, and protocol type fields of the rerouted packet; (g) referring to FIG. 21, establishing a connection between the source TCP application 11 and the source TPO 40 by the TPO's generation of a source endpoint 1550 (the source endpoint 1550 is a combination of the IP address of source TPO 40 and the port number of an edge process that is created on TPO 40) for the accepted packets (the source endpoint 1550 is established when the TPO sends the required TCP/IP protocol to source TCP application 11); (h) aggregating the accepted packet data into the source TPO buffers for subsequent transmission over the TPO communication path 91; (i) transmitting the aggregated data over the TPO communication path 91 (j) providing a reliable data delivery mechanism for the aggregated data sent over communication path 91; (k) receiving the transmitted aggregated data by the destination TPO; (l) disaggregating the received aggregated data by the destination TPO; (m) restoring the source IP address, source IP port, destination IP address, destination IP port, and protocol type fields to the rerouted packets; (n) referring to FIG. 21, establishing a connection between the destination TCP application 51 and the destination TPO 80 by the TPO's generation of a destination endpoint 1560 (the destination endpoint 1560 is a combination of the IP address of destination TPO 80 and the port number of an edge process that is created on TPO 80) for the accepted packets (the destination endpoint 1560 is established when the TPO sends the required TCP/IP protocol to the destination TCP application 51); and (o) delivering the packets to the original destination IP address on the destination LAN;

FIG. 21 illustrates the TCP connection flow utilizing the transport protocol optimizer. A TCP/IP connection 1510 is established and maintained between source application 11 executing on source application server 10 and TPO 40. Source application 11 and source endpoint 1550 represent the endpoints of TCP/IP connection 1510. A TCP/IP connection 1511 is established and maintained between destination application 51 executing on destination server 50 and TPO 80. Destination application 51 and destination endpoint 1560 represent the endpoints of TCP/IP connection 1511. Standard TCP 'syn' and 'ack' segments result in the 1500 establishment of TCP/IP connections 1510 and 1511. Standard TCP 'fin' and 'ack' segments result in the 1502 termination of TCP/IP connections 1510 and 1511. Standard TCP data segments are used for delivering data on TCP/IP connections 1510 and 1511. Data between source endpoint 1550 and destination endpoint 1560 is delivered over the TPO UDP connection 1520.

Figure 1D:
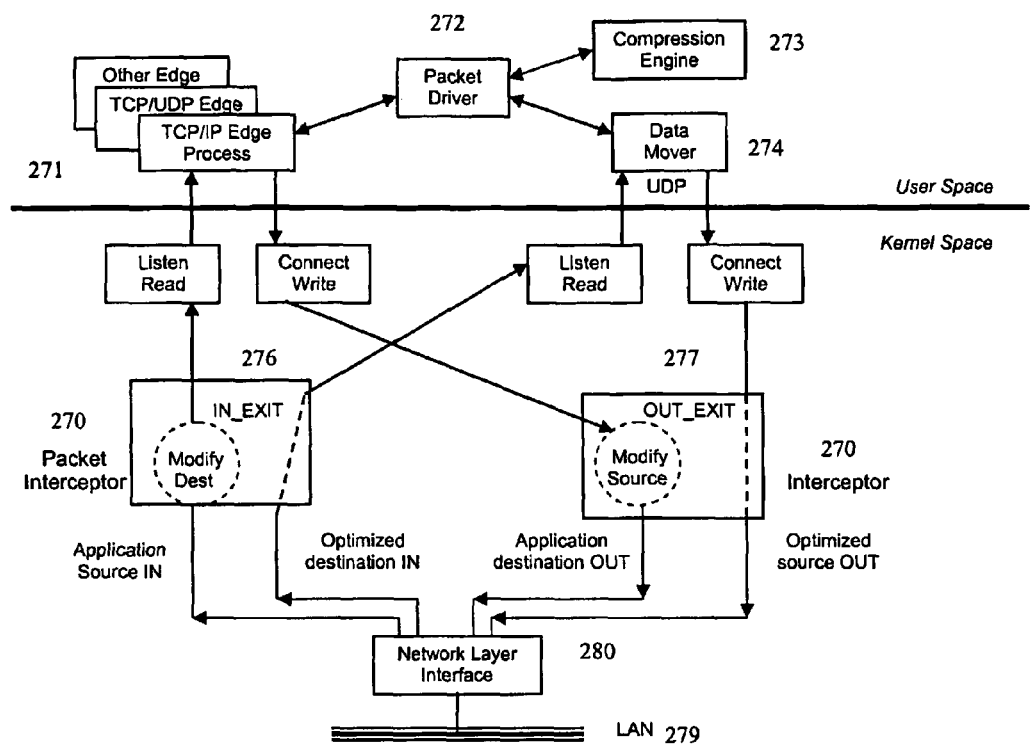
FIG. 1D is a diagram showing a transport protocol optimizer configuration.

An embodiment of the TPO is illustrated in FIG. 1D. FIG. 1D is a block level diagram of the TPO architecture. This embodiment of the TPO uses the Linux operating system. It is comprised of five elements: (a) a packet interceptor 270; (b) an edge processor 271; (c) a packet driver 272; (d) a compression engine 273; and (e) a data mover 274. The packet interceptor 270 resides in the Linux kernel space. The edge processor 271, packet driver 272, compression engine 273, and the data mover 274 all reside in the Linux user space.

The packet flow through FIG. 1D (illustrated more graphically in FIGS. 13-20) is as follows: (a) a TCP packet arrives from the network on the TPO Network Interface Card; (b) the packet interceptor reads the packet and determines if the packet should be selected for optimization; (c) if the packet should not be selected, the packet continues up the IP stack and follows the IP routing rules defined for this destination IP address; (d) if it should be selected, the original "to" IP address and port number is saved and the packet is modified with the IP address and port number of the source TPO; (e) the packet then continues up the IP stack and is delivered to the TPO; (f) in the TPO an edge process is created to run this connection; (g) the edge process receives every IP packet that is part of this connection; (h) from the edge interface, the packet goes to the packet driver; (i) from the packet driver the packet is aggregated into a buffer; (j) if compression is enabled the aggregated buffer is passed to the compression engine; (k) the compressed aggregated buffer is passed to the data mover; and (l) from the data mover the buffer goes back out the network to the destination TPO using registered TPO port 3919 (or an alternate port defined in a configuration file) and a standard UDP socket interface.

Packet Interceptor.

The first of the five elements for optimizing TCP/IP applications is the packet interceptor 270. The packet interceptor selects IP packets and reroutes them. When a message arrives in the IP layer, the kernel-level packet interceptor examines the IP header to determine if it is a message to be selected. Criteria for selection includes: source IP address; source IP port (optional); destination IP address; destination IP port (optional); and protocol type (TCP, UDP, or ICMP). In one embodiment of the TPO, configuring specific IP address pairs for selection is not supported at the User Interface level. By default, "wildcard" definitions are used, which results in the TPO selecting all packets that it receives, from any source IP address and port number, and destined to any IP address and port number (provided the packet is either TCP, UDP, or ICMP protocol type). In another embodiment of the TPO, configuring specific IP address pairs for selection is supported at the User Interface level. The TPO can be configured to intercept specific IP address pairs, or it can be configured to use different "wildcard" definitions. For example, it could be configured to intercept very specific IP source/destination address pairs of 10.1.5.2/10.2.8.3; it could be configured to intercept broad IP address ranges by specifying wildcard source/destination IP address pairs of 10.1.*.*/10.2.*.*; or it could be configured to intercept every IP packet by specifying source/destination IP address pairs of *.*.*.*/*.*.*.*.

When a message is intercepted and rerouted, the original IP addressing information is retained and sent as additional protocol information. This allows each message to be reconstructed with the original addressing information at the destination side. A configuration file describing the intercept criteria and the TPO connections is processed at startup time. Some of this information can also be changed dynamically after startup.

The packet interceptor 270 is sometimes referred to as an edge intercept. The packet interceptor 270 transparently intercepts IP packets generated by TCP applications for which optimization is desired. In FIG. 1D, packet interception occurs by using a series of Linux exit points located at various points in a Linux TCP/IP protocol stack. A series of hooks in the packet interceptor 270 interlocks with Linux exit points and redirects the packets to the TPO for detection of packets to be optimized by the TPO. The packets not defined for optimization are rejected by the TPO and routed as defined in the generating TCP application. The addresses of the packets to be intercepted are defined in a configuration file of the TPO.

Figure 13:
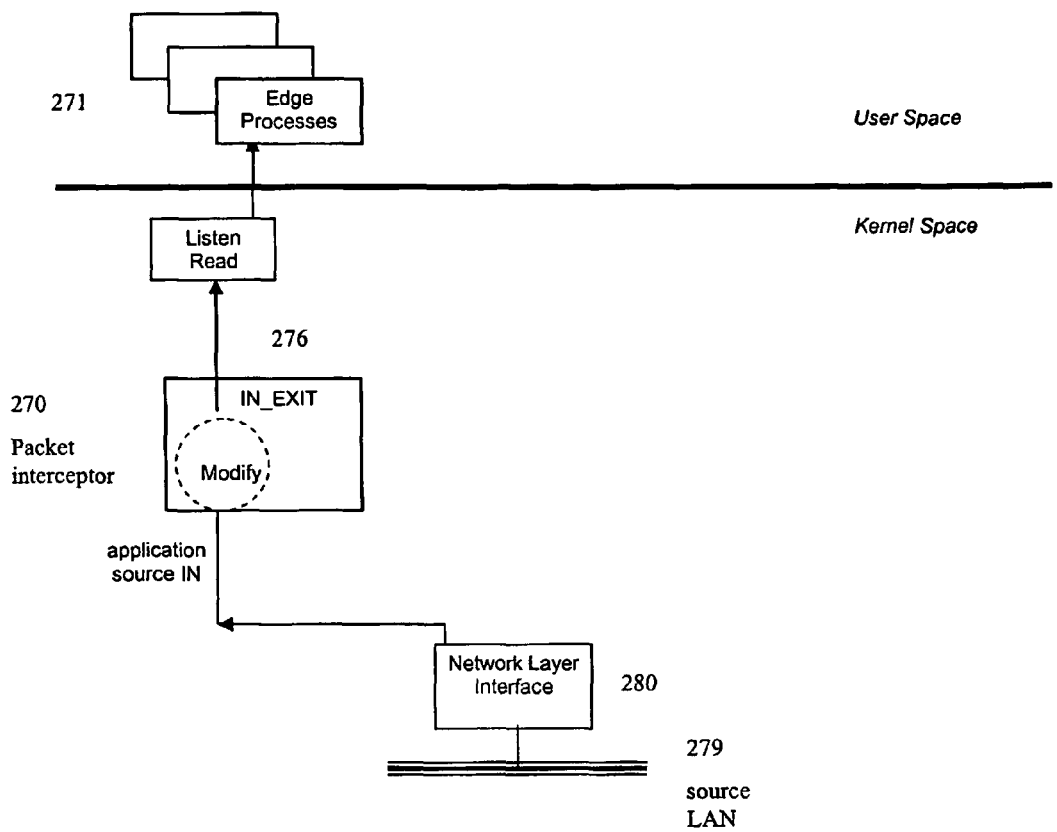
FIG. 13 is a diagram showing a source TPO packet flow—application source-in packet interceptor.
Figure 17:
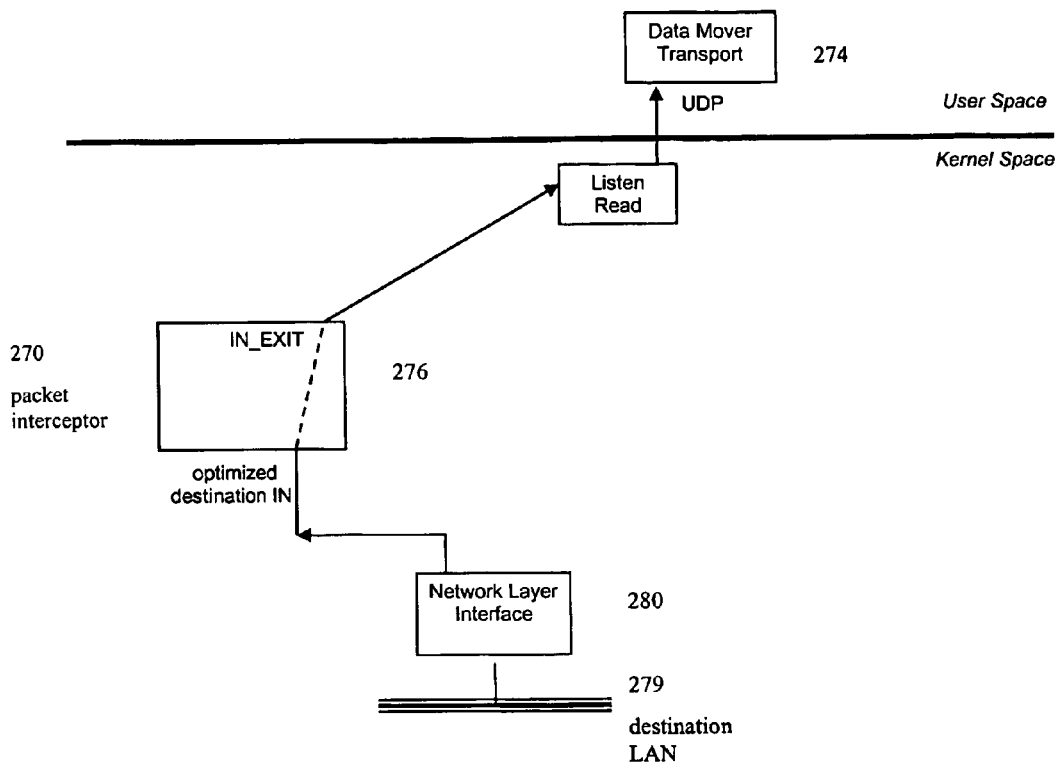
FIG. 17 is a diagram showing a destination TPO packet flow—optimized destination-in FIG. 18 is a diagram showing a destination TPO packet flow—packet driver decompression.

The TPO uses two network filtering exits in the TPO Linux operating system software, which resides on the TPO. The first exit point is written in Linux as: NF_IP_PRE_ROUTING. This exit point is entered on the source TPO 40 and on the destination TPO 80. In FIG. 13 the interlocking source TPO interceptor hook 276 is indicated as: IN_EXIT. In FIG. 17 the interlocking destination TPO interceptor hook 276 is indicated as: IN_EXIT. In FIG. 13 the packet interceptor 270, invoked from hook 276, examines the headers of IP packets originating from the source TCP application 11 as they arrive in the IP stack of source TPO 40 from the source LAN. The packet interceptor looks for quintuples (source IP [port], destination IP [port], protocol) which match those in the packet interceptor memory. Those that match are accepted by source TPO 40 and the destination IP address of the IP packet is modified to be that of the source TPO address, and the destination port number of the IP packet is modified to be that of the source TPO edge processor. Those that do not match remain unmodified, and follow the IP routing rules in effect for the destination IP address contained in the packet. In FIG. 17 the packet interceptor 270, invoked from hook 276, examines the headers of IP packets originating from the source TPO 40 as they arrive in the IP stack of destination TPO 80 from the destination LAN. The packet interceptor looks for quintuples (source IP [port], destination IP [port], protocol) which match those in the packet interceptor memory. The packets received on TPO 80 from TPO 40 will not match the selection criterion, since these packets are TPO packets.

Figure 16:
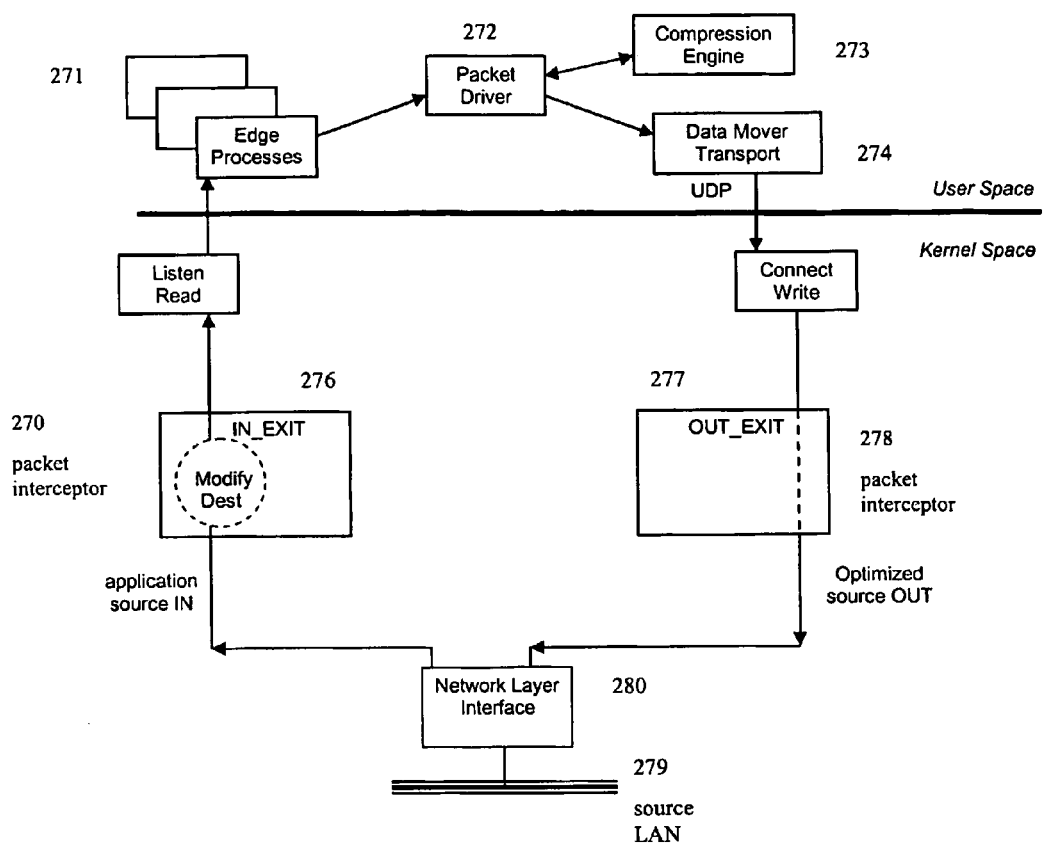
FIG. 16 is a diagram showing a source TPO packet flow—optimized source-out.
Figure 20:
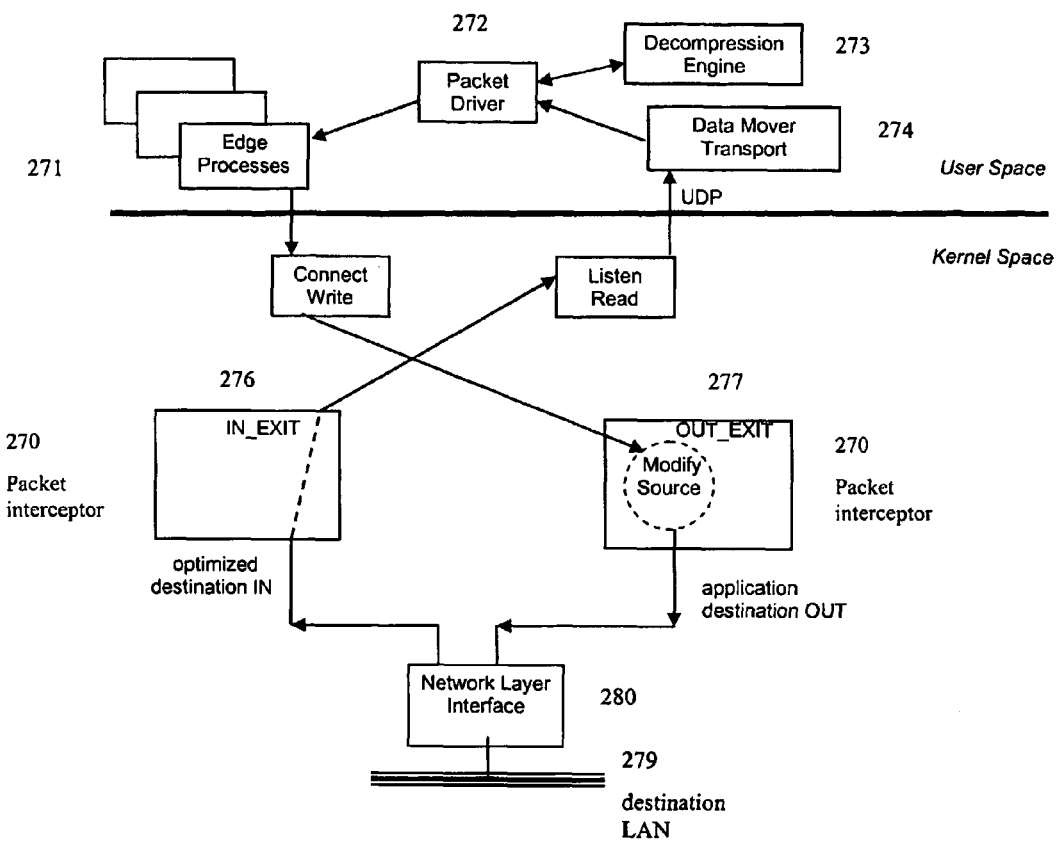
FIG. 20 is a diagram showing a destination TPO packet flow—application destination-out packet interceptor.

The second exit point is written in Linux as: NF_IP_LOCAL_OUT. This exit point is entered on the source TPO 40 and on the destination TPO 80. In FIG. 20 the interlocking destination TPO interceptor hook 276 is indicated as: OUT_EXIT. In FIG. 16 the interlocking source TPO interceptor hook 276 is indicated as: OUT_EXIT. In FIG. 20 the packet interceptor 270, invoked from hook 276, examines the headers of IP packets originating in destination TPO 80 as they leave the IP stack. The packet interceptor looks for quintuples (source IP [port], destination IP [port], protocol) which match those in the packet interceptor memory. For those that match, the source IP address of the IP packet is modified to be that of the source application IP address, and the source port number of the IP packet is modified to be that of the source application port number. Those that do not match remain unmodified, and follow the IP routing rules in effect for the destination IP address contained in the packet. In FIG. 16 the packet interceptor 270, invoked from hook 276, examines the headers of IP packets originating in source TPO 40 as they leave the IP stack. The packet interceptor looks for quintuples (source IP [port], destination IP [port], protocol) which match those in the packet interceptor memory. The packets sent to TPO 80 from TPO 40 will not match the selection criterion, since these packets are TPO packets.

The descriptions of the IN_EXIT and OUT_EXIT processing describe the case when data is generated from TCP/IP application 11 and is sent to TCP/IP application 51. When data is generated by destination application 51, destination application 51 becomes and is referred to as the source application as are each of its connected components which make up the destination LAN, and source application 11 becomes and is referred to as the destination application as are each of its connected components which make up the source LAN.

Edge Processors.

Figure 14:
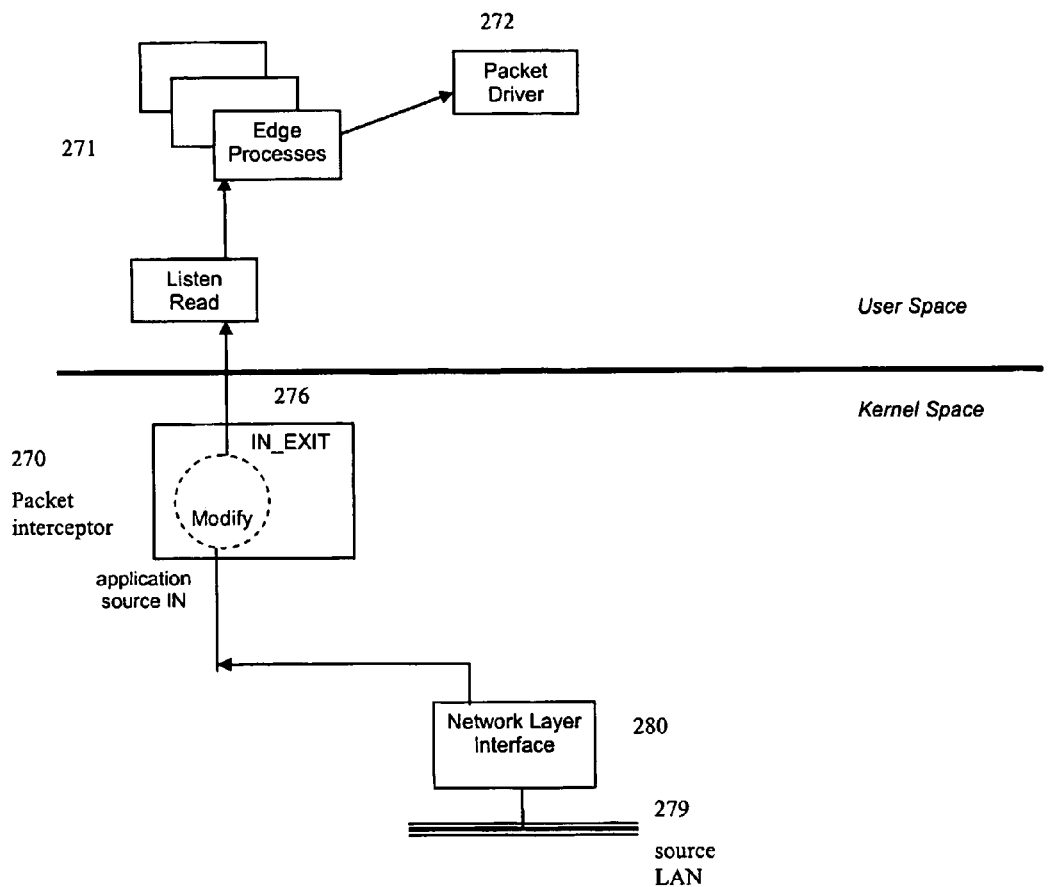
FIG. 14 is a diagram showing a source TPO packet flow—application source-in packet delivery.
Figure 19:
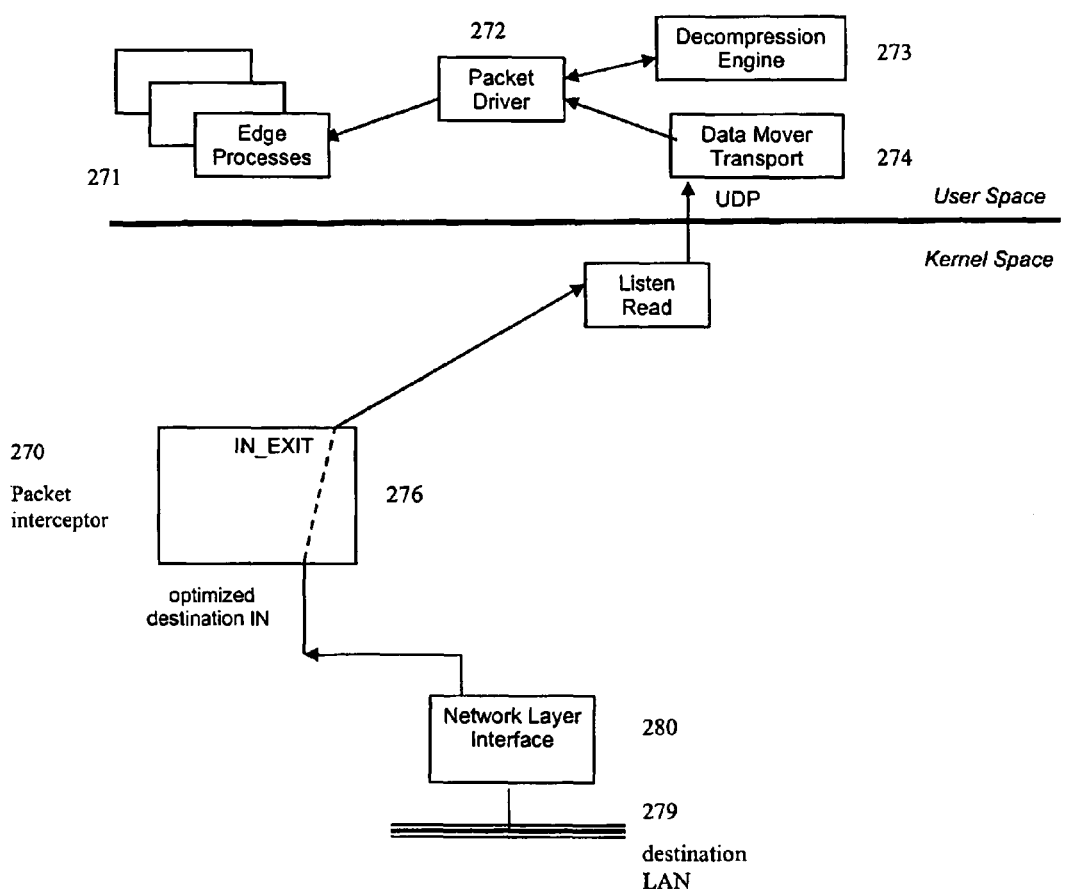
FIG. 19 is a diagram showing a destination TPO packet flow—disaggregation.

The second of the five elements of optimizing TCP/IP applications is edge processing. As packets are intercepted for a given quintuple (source IP [port], destination IP [port], protocol), an edge process 271 (FIG. 1D) is used on each side of the TPO to serve as the local endpoint for each stream of packets. In FIG. 13, source application IP packets flow through packet interceptor 270 (IN_EXIT 276), and if selected, are modified with the IP address of the local TPO and the port number of the edge process 271. In FIG. 14, source application packets are delivered from the edge process 271 to source packet driver 272. In FIG. 19, disaggregated packets are delivered from destination packet driver 272 to destination edge process 271 associated with the quintuple (source IP [port], destination IP [port], protocol) identified in the packet. In FIG. 20, packets flow from the destination edge process 271, to packet interceptor 270 (OUT_EXIT 277). There is an edge processor 271 that serves as the endpoint for each unique quintuple for packets generated by applications using the TCP/IP, TCP/UDP, or TCP/ICMP protocols.

TCP-edge processes are dynamically created whenever a new TCP application connection is detected. Each instance of this component runs as a separate process, and exists for the life of the intercepted TCP connection. Two threads drive this process, one for handling data going to TCP for the intercepted connection and the other for handling data coming from TCP for the intercepted connection. These processes run in the same user space as the other edge processes, as well as the packet driver, compression engine, and the data mover.

The UDP-edge processes are dynamically created whenever a new UDP intercept occurs, based on the UDP selection criteria. The UDP flow differs from TCP applications in that the UDP protocol represents a "connectionless" stream of packets. As with TCP, each instance of this component also runs as a separate process and exists for the life of the intercepted UDP flow. Two threads drive this process, one for handling data going to UDP for the intercepted flow, and the other for handling data coming from UDP for the intercepted flow. These processes run in the same user space as the other edge processes, as well as the packet driver, compression engine, and the data mover.

The ICMP-edge processes are dynamically created the first time an ICMP intercept occurs, based on the ICMP selection criteria. Differing from the other edge processes, there is only one instance of this component, and it also runs as a separate process. Two threads drive this process, one for handling data going to ICMP for the intercepted flow and the other for handling data coming from ICMP for the intercepted flow. These processes run in the same user space as the other edge processes, as well as the packet driver, compression engine, and the data mover.

Packet Driver.

The third of the five elements of optimizing TCP/IP applications is the packet driver 272 (FIG. 1D). The packet driver is responsible for establishing and maintaining connections with other TPO appliances on the network. It aggregates the intercepted IP packet data into buffers, compresses the buffers, and passes them to data mover for delivery over a communication link to a peer packet driver for subsequent delivery to the peer user application. The number of intercepted IP packets contained in a buffer, and therefore the size of the packet driver buffer, is variable and is dependent on several factors, including the rate of arrival of incoming source packets, the rate of optimization and delivery of the optimized packets back to the network, and the maximum size of the packet driver buffer, as specified in a TPO configuration file. When viewed from the perspective of the Open System Interconnection (OSI) Reference Model seven layer communication stack, packet driver 272 provides Layer 6 (Application) services. The packet driver runs in the same user space as the edge processes, the compression engine, and the data mover.

Figure 15:
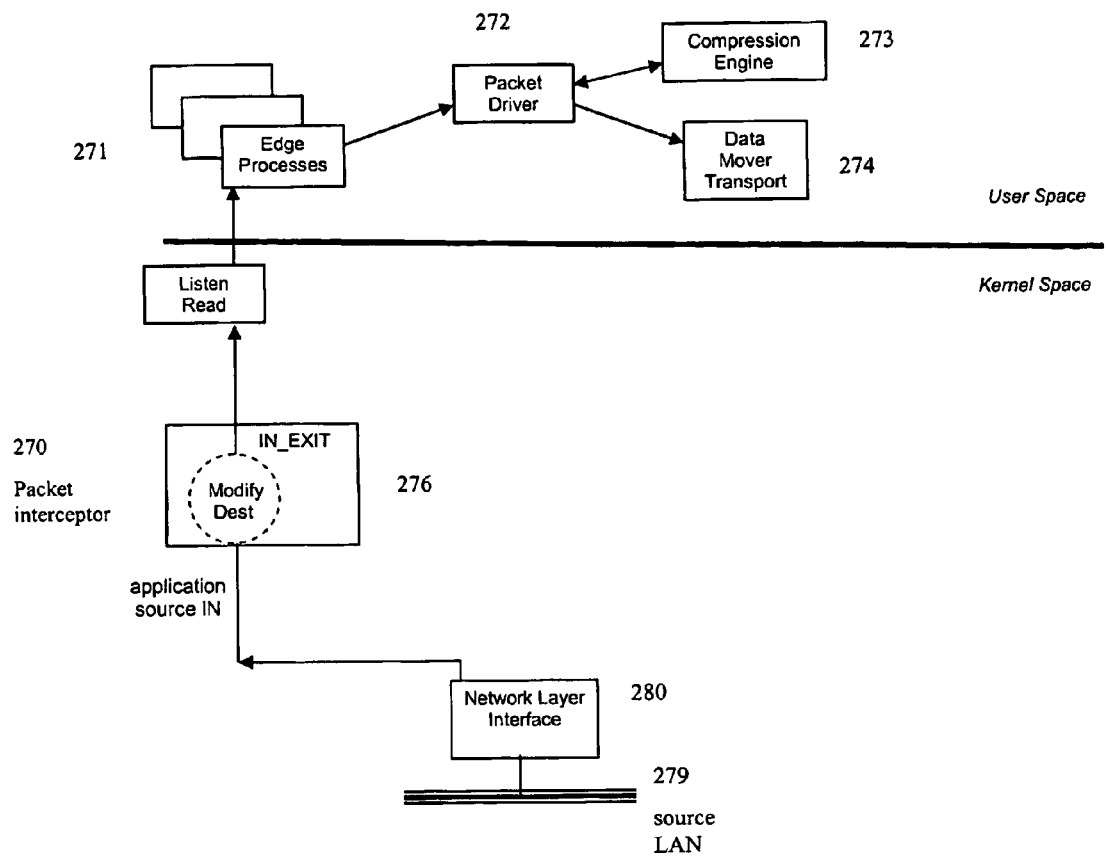
FIG. 15 is a diagram showing a source TPO packet flow—aggregated packet compression.
Figure 18:
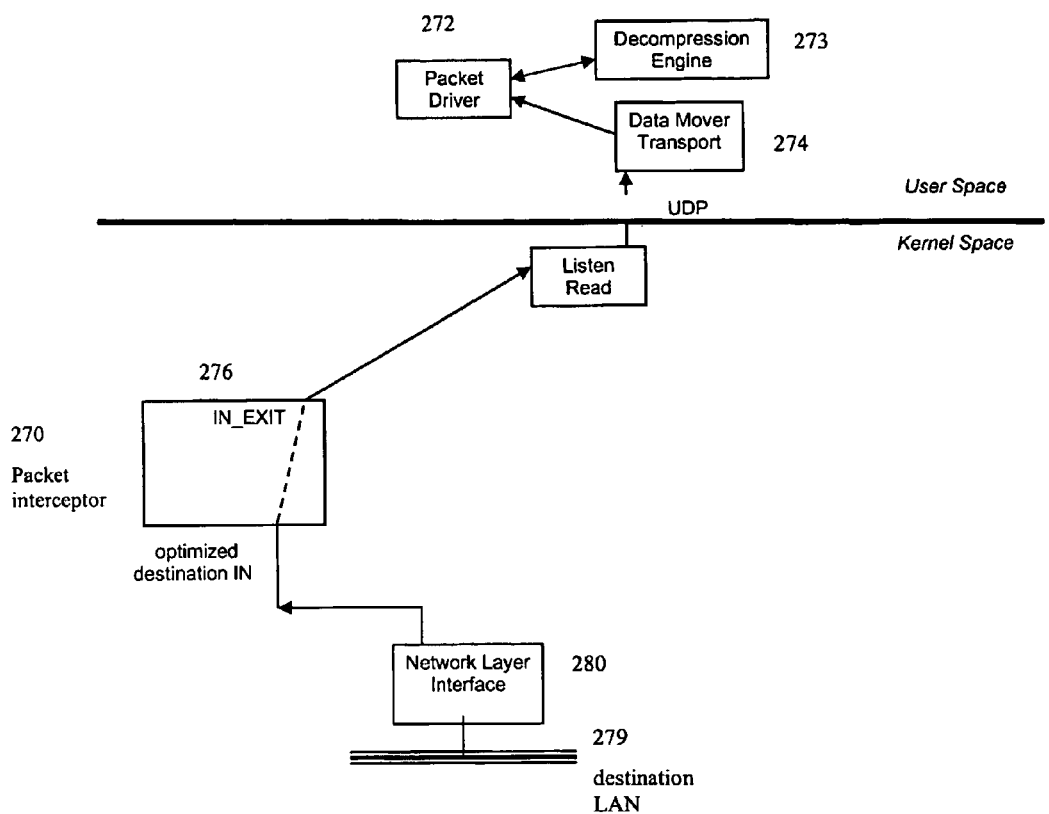

In FIG. 15, source packet driver receives intercepted packets from each of the source edge processes 271. It aggregates these data packets into more efficient buffers and passes the aggregated buffers to the compression engine 273. The compressed aggregated buffers are passed to data mover 274 for delivery over the communication link to the destination TPO. In FIG. 18, destination packet driver 272 receives compressed aggregated buffers from data mover. Destination packet driver 272 calls the compression engine 273 to decompress the packets. In FIG. 19, the disaggregated uncompressed packets are passed from packet driver 272 to the appropriate edge process 271, based on the quintuple (source IP [port], destination IP [port], protocol) associated with the packet.

Compression Engine.

The fourth of the five elements of optimizing TCP/IP applications is the compression engine 273 (FIG. 1D). The combination of the compression engine and the packet driver compresses data in order to reduce WAN bandwidth usage and effectively increase the data throughput over the network. As previously described, and illustrated in FIG. 15, the intercepted packets are aggregated and stored in a buffer by the packet driver 272. The compression engine 273 then compresses the buffer of aggregated packets prior to delivery to destination packet driver. In FIG. 18, destination packet driver 272 receives the aggregated compressed packets from data mover, and calls the compression engine 273 to decompress the aggregated packets. The combination of aggregation of data packets into buffers with subsequent compression achieves more efficient compression, as large buffers present more opportunities for the compression algorithms to detect repeating patterns of data. The compression engine compresses the data prior to transport over the network by the data mover 274 and decompresses the data after it is received by the destination packet driver, prior to delivery to the destination application.

An adaptive technique enables and disables the compression engine, depending on the level of compression achieved. If it determines that data is incompressible, it will disable the feature and then periodically re-enable it to make another determination whether the data is compressible. If it determines that data is compressible the feature will remain enabled, but the monitoring will continue. The compression engine runs in the same user space as the edge processes, packet driver, and the data mover.

An embodiment of the TPO uses compression engine software. Compression engine software is available from a number of sources. LZS compression algorithm software is available from Hi/Fn Inc., 750 University Avenue, Los Gatos, Calif. 95032. LZO compression algorithm software is available from Markus F.X.J. Oberhumer, Rudolfstr. 24, A-4040 Linz, Austria. LZW compression algorithm software is available from Unisys Corporation, Unisys Way, Blue Bell, Pa. 19424.

Data Mover.

The fifth of the five elements of optimizing TCP/IP applications is the data mover 274 (FIG. 1D). It reliably delivers the data to the destination TPO over a network communication link. Since UDP is used as the underlying IP delivery mechanism, data mover 274 handles all flow control, retransmissions, and delivery of data to the end-user application. The data mover runs in the same user space as the edge processes, packet driver, and compression engine.

The data mover protocol described in this specification is an element of an embodiment of a TPO. Other efficient data mover protocols may be available or may be written by one of ordinary skill in the art to substitute for this element. A version of a data mover protocol is available for licensing from Network Executive Software, Inc., located at 6420 Sycamore Lane North, Suite 300, Maple Grove, Minn. 55369. It is marketed under the trademark, "Netex."

The data mover is the transport delivery mechanism between TPO appliances. As illustrated in FIG. 16, data mover 274 receives the optimized/aggregated buffers from the packet driver 272 and delivers them to the destination TPO for subsequent delivery to the destination application. As illustrated in FIG. 17, destination data mover 274 receives the optimized aggregated buffers from the source packet driver. Data mover is responsible for maintaining acknowledgements of data buffers and resending buffers when required. It maintains a flow control mechanism on each connection and optimizes the performance of each connection to match the available bandwidth and network capacity. TPO provides a complete transport mechanism for managing data delivery. And it uses UDP socket calls as an efficient, low overhead, data streaming protocol to read and write from the network.

When viewed from the perspective of the Open System Interconnection (OSI) Reference Model seven layer communication stack, data mover 274 can be thought of as providing unique Layer 3 (Network), Layer 4 (Transport), and Layer 5 (Session) services. Layer 6 (Application) services are provided by packet driver 272.

The principal function of the Network layer is to establish a path between two TPOs, construct the messages needed to send data between them, and remove routing information before presenting the incoming data to the network caller (i.e., the Transport layer). The Network layer also performs all the multiplexing for the TPOs—the process of sorting out incoming messages by its unique connection identifier and passing the data to the higher level caller. The Network layer interfaces with the IP stack by using UDP socket calls and is responsible for sending and receiving network messages in and out of a Network Interface Card (NIC).

The main responsibility of the Transport layer is to provide reliable, correct data delivery to the remote TPO. It is designed to function in environments with very long propagation delays, extremely high speeds, and/or high error rates. To accomplish this, data mover 274 has: (a) the ability to negotiate transmission block sizes between both sides of the connection; (b) the ability to segment an arbitrarily large block of application data into messages suitable for transmission and to reassemble the data block for the receiving application; (c) an acknowledgement scheme so that messages lost in transit can be retransmitted; (d) a flow control facility so that the receiving TPO is not overrun with data; and (e) an alternate path retry capability where alternate routes to a destination are tried if a primary path fails. The transport layer will deliver data in the correct order at a pace no greater than that desired by the destination. It will either deliver the data successfully or it will report that communications with the destination transport layer have been lost over all possible paths to the destination TPO. In that event, the status of data not explicitly acknowledged by the destination application is not known. The transport layer will deliver data in the correct order at a pace no greater than that desired by the receiver. It will either deliver the data successfully or it will report that communications with the remote transport have been lost over all possible paths to the remote TPO. In that event, the status of data not explicitly acknowledged by the remote TPO is not known.

The Session layer is fairly similar to the services offered by the Transport layer. The major difference is that the Session layer provides the ability to address a remote application by two character string names: a "host" name (i.e., the host name of the remote TPO) and an "application" name (i.e., the application name of the remote packet driver 272).

Rerouting TCP Connections.

When a TCP connect is intercepted and it is determined that it should be rerouted (i.e. the "to" and "from" addresses are defined as an intercept), it is queued while the source TPO sends the connect request (which includes the original source and destination IP addresses and ports) to the destination TPO. The destination TPO then issues a TCP connect to the destination IP address and port. The packet interceptor on the destination TPO takes control and changes the source IP address and port from that of the source TPO to the application source IP address and port. The rerouting of the connect is thus transparent to the listening application. A connection success or failure indication is returned to the source TPO. A connect failure is propagated back to the source application. A successful connect causes TPO to reroute all subsequent messages for that connection.

If a TCP connection is not to be rerouted (i.e. the "to" and "from" addresses are not defined as an intercept), then the source TPO merely forwards the connect and all subsequent messages for that connection to the IP layer for standard IP routing.

Messages for rerouted connections are passed up via the standard IP stack to a TPO thread that is created to handle all messages for a particular connection. Each thread reads messages by issuing standard socket interface recv( ) calls and provides the interface between the intercepts and the data mover sessions. The thread becomes the source connection endpoint and is needed to maintain a timely conversation with the source application without the need to wait for transmission and acks from the real destination application.

Received messages are forwarded through the data mover protocol to the destination TPO. The original source and destination IP addresses and ports are sent along with the messages. The destination TPO also creates a thread to handle all messages for a particular connection. This thread is the destination connection endpoint that communicates with the destination application. When messages arrive from data mover, they are sent out by that connection's thread by issuing standard socket interface send( ) calls. The packet interceptor modifies the source IP address and port number on each outgoing message to match the original source IP address and port. In this way, the message rerouting is completely transparent to the source and destination applications.

TPO Data Units.

Figure 2:
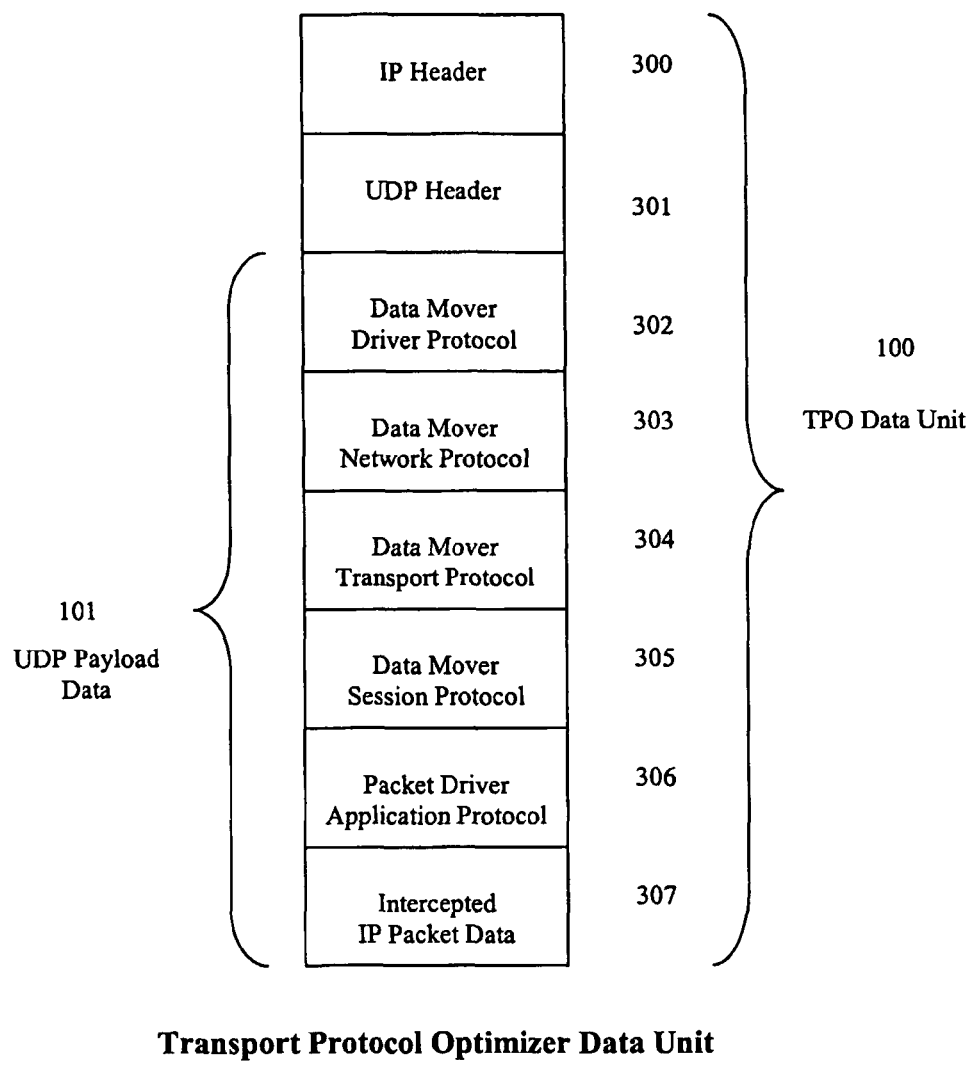
FIG. 2 is a diagram showing a transport protocol optimizer data unit.

FIG. 2 illustrates the content of TPO data units, which are comprised of an IP header field 300, a UDP header field 301, and UDP payload data 101. UDP payload data 101 consists of data mover driver protocol data 302, data mover network protocol data 303, data mover transport protocol data 304, data mover session protocol data 305, packet driver application protocol data 306, and intercepted IP packet data 307. The data associated with each layer is meaningful to the corresponding peer layer in the destination TPO.

The TPO intercepting IP packets generated from TCP/IP applications creates data units for delivery to a remote TPO and delivers the data units over a UDP connection to a destination TPO. The destination TPO then delivers the intercepted IP packet data to the remote peer TCP/IP application.

An embodiment of the TPO is implemented using IPV4 (Internet Protocol Version 4) networks. Although, a person of ordinary skill in the art of writing data communication software can implement the TPO for IPV6 (Internet Protocol Version 6) networks.

TCP Connection Establishment Packet Flow.

Figure 3A:
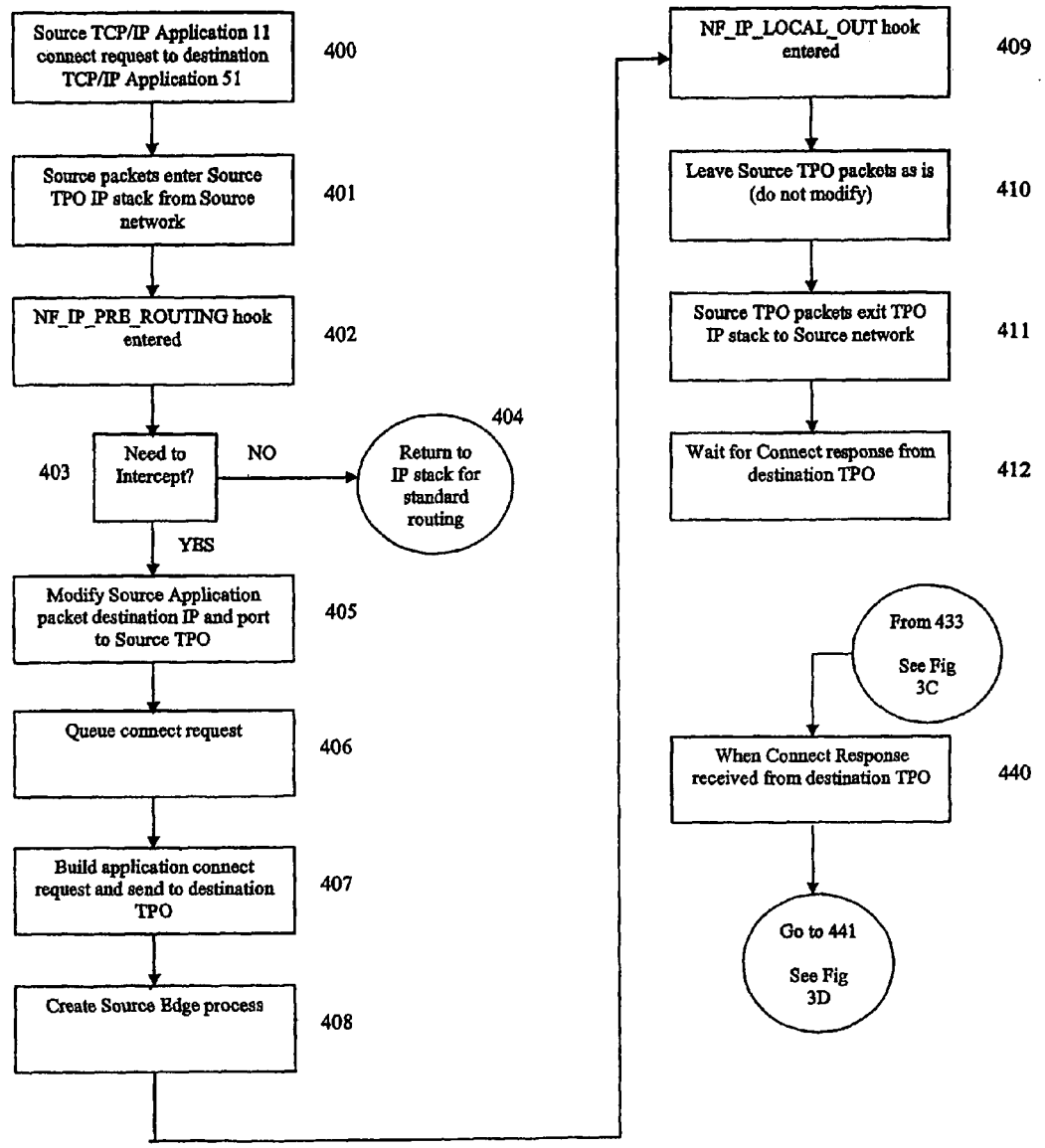
FIG. 3A is a diagram showing a TCP/IP application connection process.
Figure 9A:
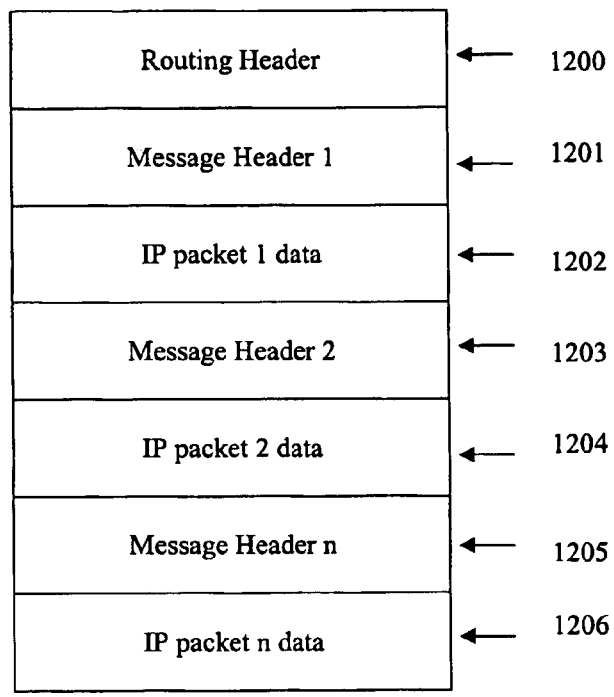
FIG. 9A is a diagram showing a packet driver protocol data.

FIG. 3A illustrates the flow on the source side of the process for establishing a TCP connection between two peer TCP/IP applications when using a TPO communication link. A TCP/IP connect request 400 is issued by TCP/IP source application 11, running on source application server 10 requesting a connection to destination TCP/IP application 51, running on destination application server 50. The connect request, in block 401, is directed to source TPO 40 by means of standard IP routing mechanisms, which results in source IP packets entering the IP stack of source TPO 40. NF_IP_PRE_ROUTING hook 402 is entered and it is determined if this packet should be selected 403, based on a set of predefined filtering rules for matching source IP address, source IP port, destination IP address, destination IP port, and protocol type. If the packet should not be intercepted, no changes are made to the packet addressing and the packet continues through the stack and follows the routing rules in effect for that IP destination address 404. If the packet should be intercepted, the packet destination IP address is changed to the source network interface of source TPO 40 and the destination port number is changed to the source port number on which source TPO 40 is listening 405. The application connect request is then queued 406. While it is queued, source TPO 40 places the application connect request, along with a message header (FIGS. 9A, 9B, and 9C), into a buffer to be sent to destination TPO 80 over the data mover UDP communication path 407. The message header comprises, among other things, the source IP address, source IP port number, destination IP address, destination IP port number, and protocol type (FIG. 9C). In this embodiment, a source edge processor is created 408 to serve as the source connection endpoint for source TCP/IP application 11. When the application connect request is sent to destination TPO 80, the hook, NF_IP_LOCAL_OUT, is entered 409. However, at this hook point nothing needs to be modified in the packet 410, since the IP addressing correctly identifies source TPO 40 and destination TPO 80 as the respective endpoints. The packets leave the stack and go onto source network 411. They then wait for a connect response 412 from destination TPO 80.

Figure 3B:
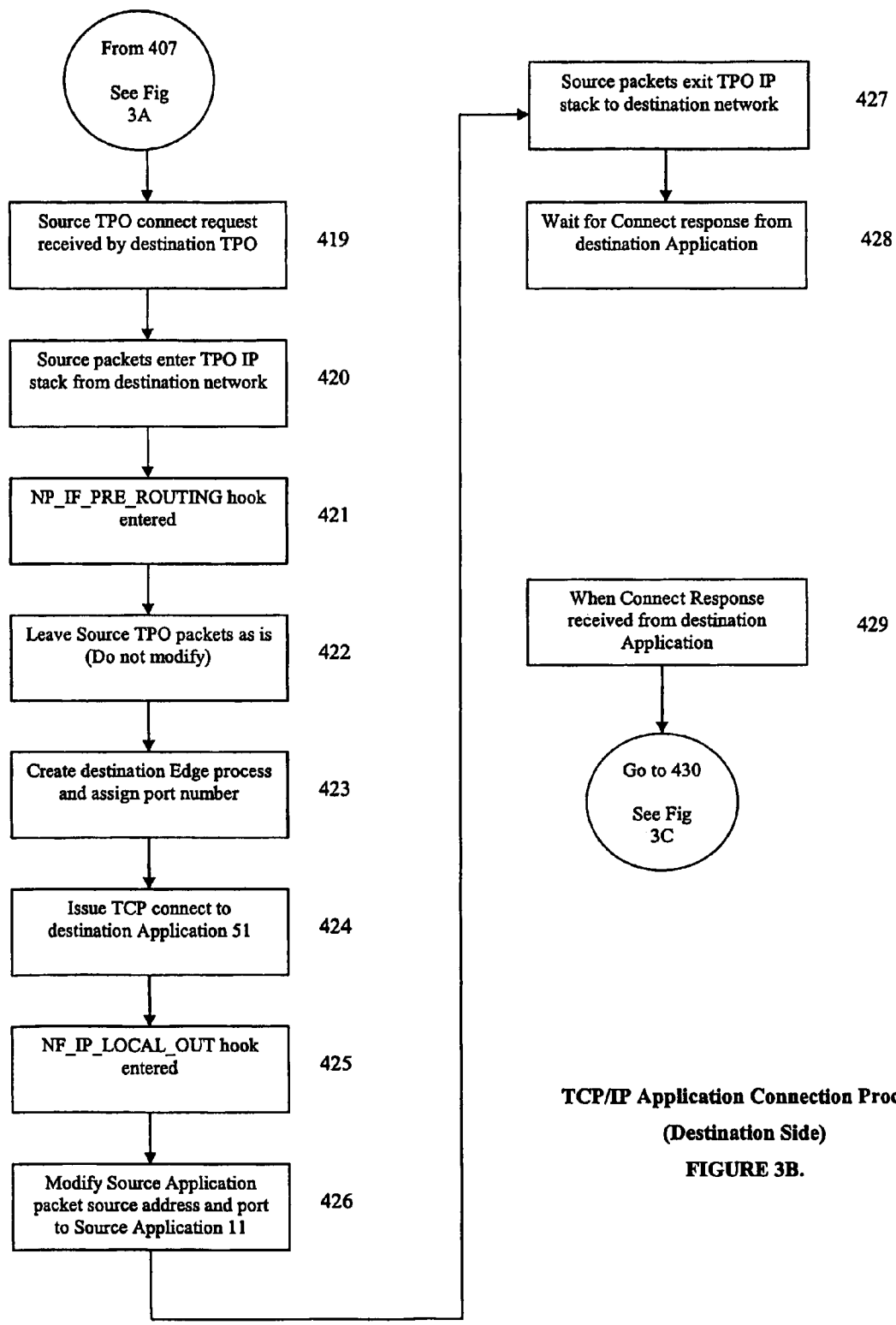
FIG. 3B is a diagram showing a TCP/IP application connection process.

FIG. 3B illustrates the flow from the destination side of the process for establishing a TCP connection between two peer TCP/IP applications when using a TPO communication link. When destination TPO 80 receives source connect request 419, the source IP packets enter the IP stack of the destination TPO from the destination network 420. The NF_IP_PRE_ROUTING hook is entered 421. At this hook point, the addresses in the source IP packet do not need to be modified 422, because the IP addressing correctly identifies TPO 40 as the source and TPO 80 as the destination. The destination edge process 423 is created and a port number is assigned for the endpoint on destination TPO 80. The destination edge process serves as the destination endpoint for the TCP/IP connection between destination TPO 80 and destination application 51. The destination edge process issues the TCP/IP connect request to destination application 51 using the destination IP address and destination port number contained in the source message header 424. The NF_IP_LOCAL_OUT hook is entered 425, which then modifies, at 426, the source IP address to be that of source application server 10 and modifies the source port number to be that of source application 11. The source packet leaves the destination TPO stack and goes onto the destination network 427, at which time this process then waits for the connection response 428 from destination application 51.

Figure 3C:
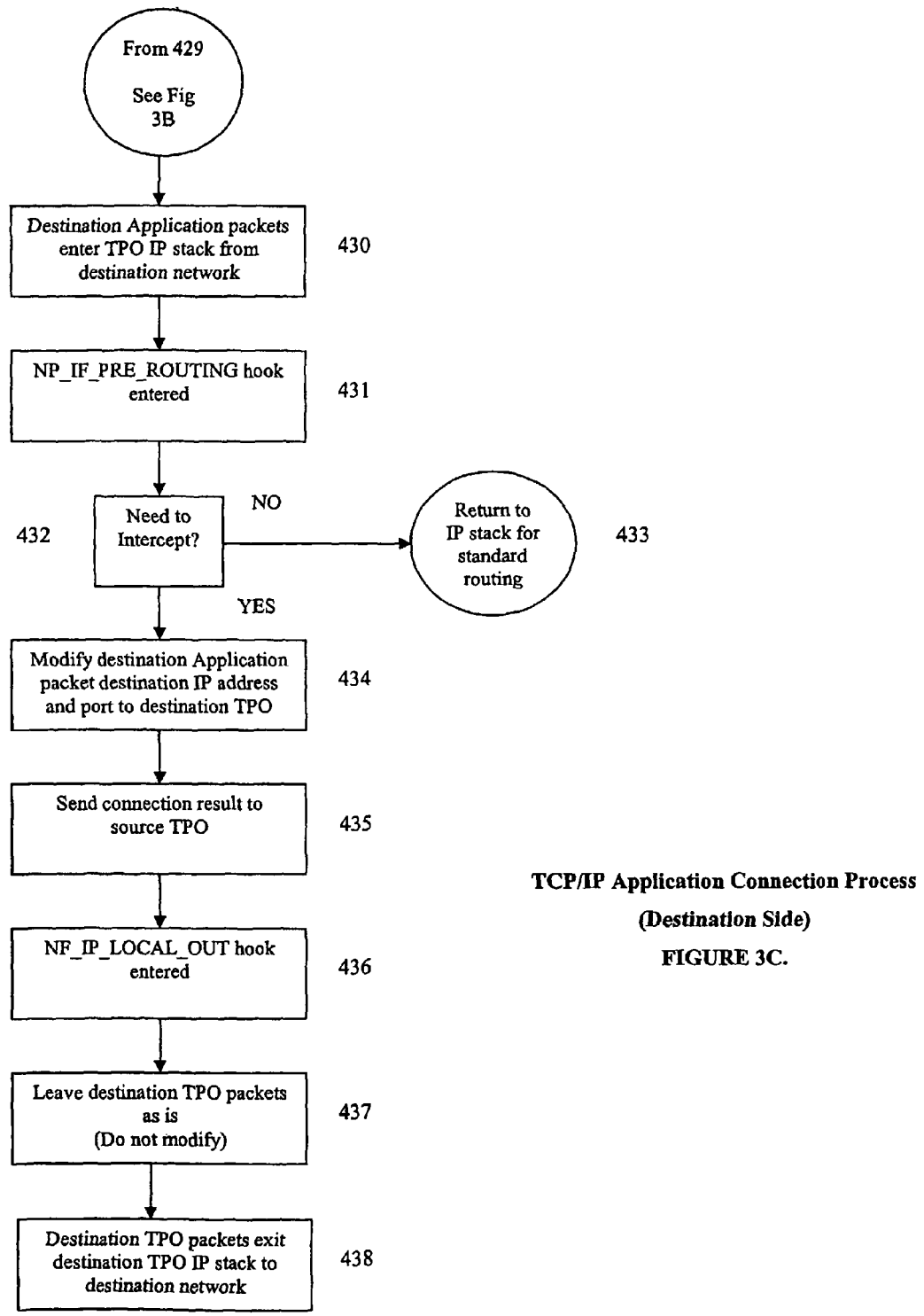
FIG. 3C is a diagram showing a TCP/IP application connection process.

FIG. 3C further illustrates the flow from the destination side of the process for establishing a TCP connection between two peer TCP/IP applications when using a TPO communication link. When the connection response is received 429 from destination application 51 the destination IP packets enter the destination TPO IP stack from the destination network 430. Then the NF_IP_PRE_ROUTING hook is entered 431 and it determines if the destination packet should be intercepted 432, based on a set of predefined filtering rules for matching source IP address, source IP port, destination IP address, destination IP port, and protocol type. If the destination packet should not be intercepted, then no changes are made to the destination packet addressing 433 and the packet continues through the destination IP stack and follows the routing rules in effect for that IP destination address. If the destination packet should be intercepted, the packet IP address is changed 434 to the destination network interface on destination TPO and the destination port number is changed to the destination port on which destination TPO is listening. Since this packet represents the connection response from destination application server 50 that is responding to the intercepted connection request from source application server 10, this destination originated packet will be intercepted by destination TPO because its IP address is destination application server 50 and source application server 10. The connection result is returned 435 to source TPO. The NF_IP_LOCAL_OUT hook is then entered 436. At this hook point, nothing needs to be modified in the packet 437, since the IP addressing now correctly identifies destination TPO as the source and source TPO as the destination.

FIG. 3D illustrates the flow from the source side of the process for establishing a TCP connection between two peer TCP/IP applications when using a TPO communication link. When the connect response is received 440 by the source TPO from the destination TPO, the destination IP packets enter the source TPO IP stack from the source network. The NP_IF_PRE_ROUTING hook is again entered 442. At this hook point nothing needs to be modified 443 in the packet because since the IP addressing correctly identifies destination TPO as the source and source TPO as the destination. If the connect request was not successful 444 on the destination TPO, then a predefined invalid port number is set in the queued connect request 445. This will cause the local connection attempt to fail. If the connect request was successful 444 on destination TPO, the predefined port number of source TPO is set in the queued connect request, which will cause the connection attempt to succeed. In either case, the previously queued application connect request is requeued 447 to attempt to establish the connection. Source TCP/IP will then process 448 the local connect request on source TPO. If the valid port number was set in the connect request (meaning the connection was successfully established on the destination TPO), the connection to the source TPO edge process will be accepted. If the invalid port number was set in the connect request (meaning the connection was not established on the destination TPO), the connection to the source TPO edge processor will fail. In either case, there is an IP packet generated that reflects the acceptance or failure of the connection request. The NF_IP_LOCAL_OUT hook is then entered for this packet 449, which then modifies 450 the source IP address to be that of destination application server, and modifies the source port number to be that of source application. The packet leaves the stack 451 and goes onto the source network to the source application, at which time the connection request is complete 452, either successfully or unsuccessfully.

Figure 3E:
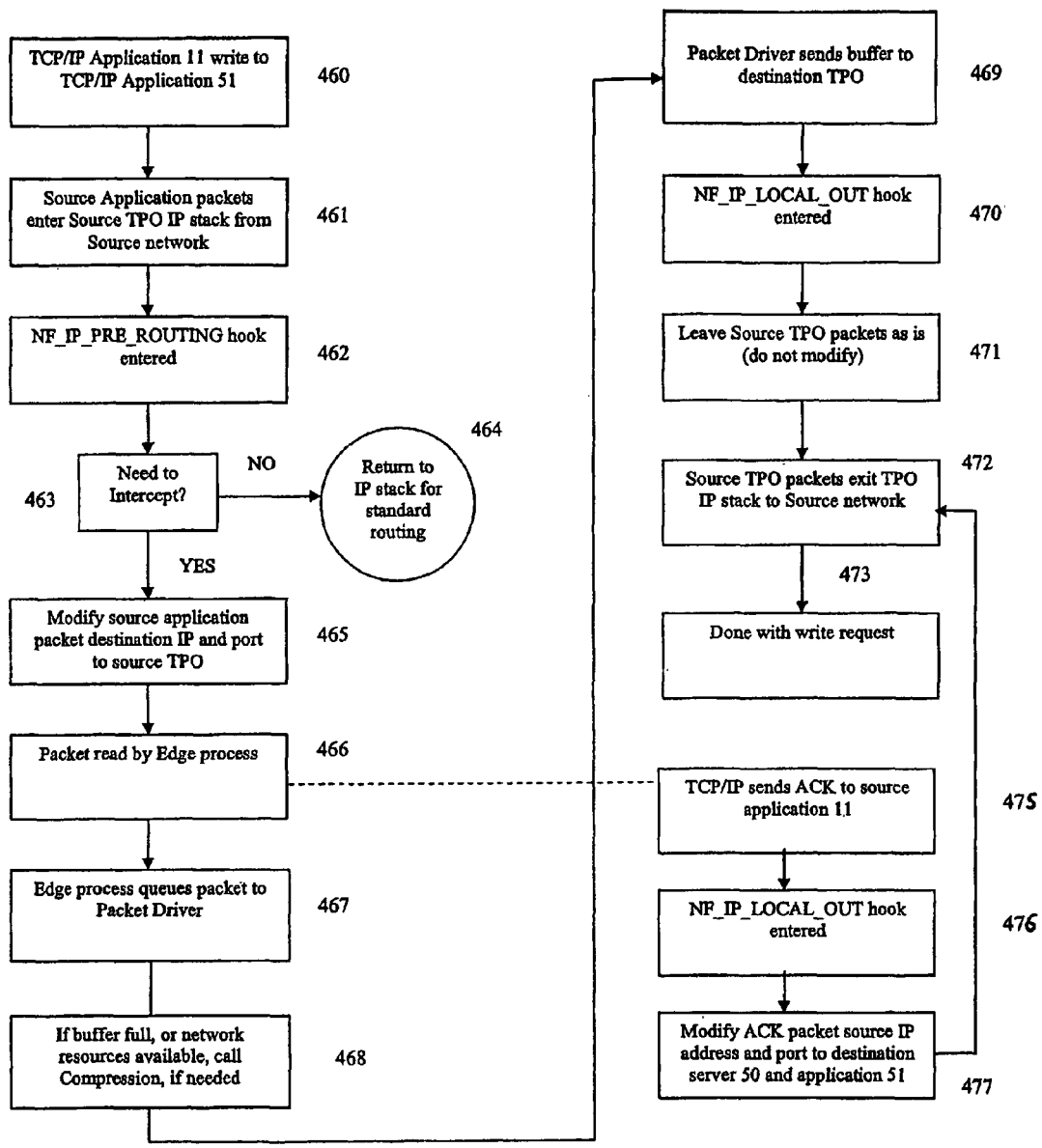
FIG. 3E is a diagram showing a TCP/IP application write process.
Figure 3F:
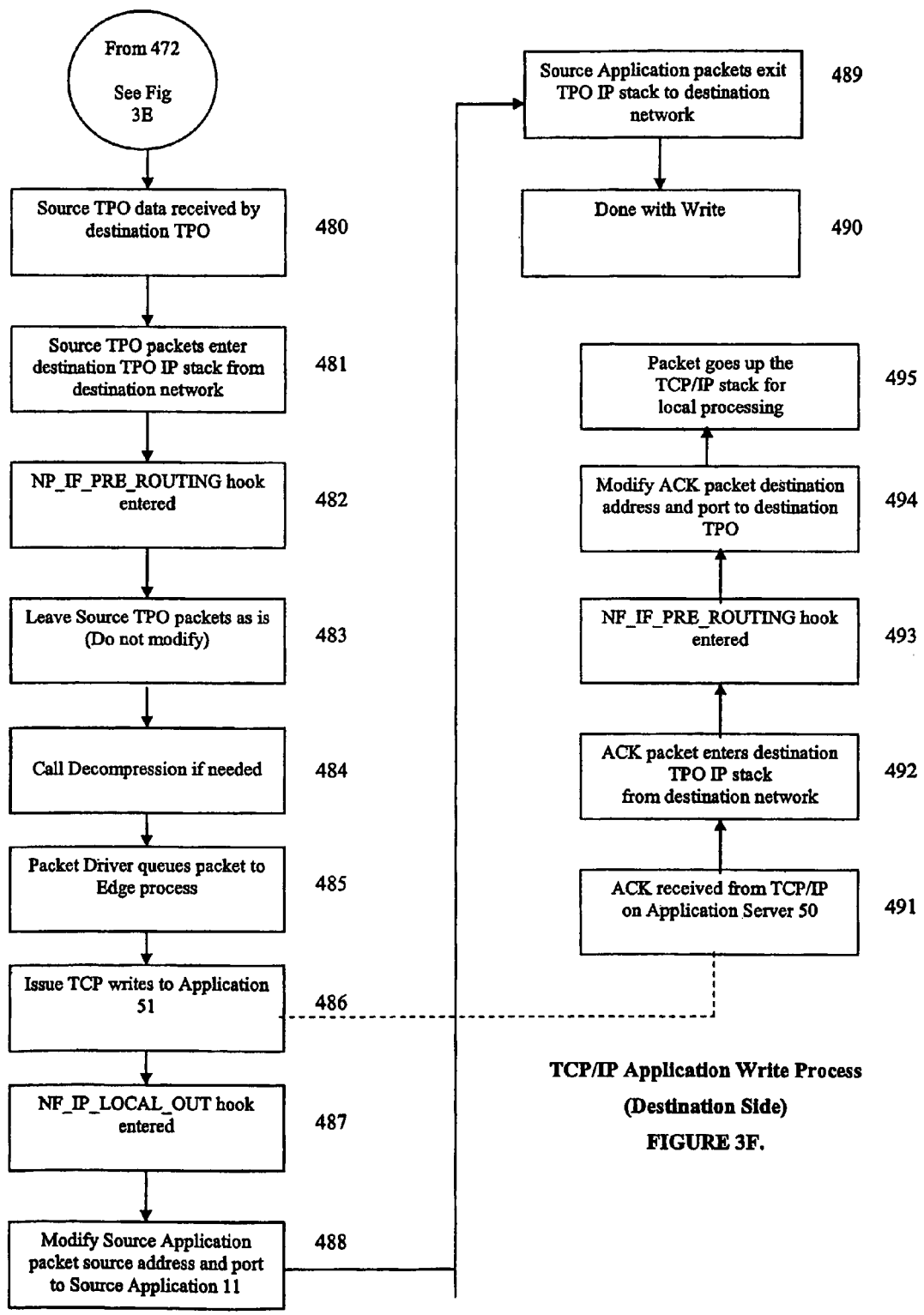
FIG. 3F is a diagram showing a TCP/IP application write process.

FIGS. 3E and 3F illustrate the process flow that occurs after the establishment of a communication link between two peer TCP/IP applications when sending data over a TPO communication link. A TCP/IP write request 460 is issued by source TCP/IP application 11 running on source application server 10 sending data to destination TCP/IP application 51 running on destination application server 50. The write request is directed to source TPO by means of standard IP routing mechanisms resulting in the IP packets entering the IP stack 461 of TPO 40. NF_IP_PRE_ROUTING hook is entered 462 and it is determined whether the packet should be selected 463, based on a set of predefined filtering rules for matching source IP address, source IP port, destination IP address, destination IP port, and protocol type. If the packet should not be intercepted, no changes are made to the packet addressing and the packet continues through the stack and follows the routing rules in effect for that IP destination address 464. If the packet should be intercepted, the packet destination IP address is changed to be that of the source network interface 465 on source TPO and the port number is changed to be the source port on source TPO on which the edge processor for this connection is listening (which was created during the connection sequence). The edge processor reads the intercepted packet 466 and queues the packet and its message header to the packet driver for subsequent insertion into the packet driver buffer 467. When the buffer at 468 is full, or as soon as data mover is able to accept additional requests from the packet driver, the packet driver calls the compression engine (if the compression feature is enabled), then passes the buffer to data mover 469 for the purpose of sending the buffer to the destination TPO over the data mover UDP communication path. The data mover is able to accept additional requests from the packet driver as soon as the previous request from the packet driver is complete, and the resources associated with sending the previous request are available. This means that the size of the buffers passed from the packet driver to the data mover can vary, and do not always contain the same number of message headers. The message header consists of the original source IP address, source IP port, destination IP address, destination IP port, and protocol type. When the UDP buffer is sent to destination TPO, the NF_IP_LOCAL_OUT hook is entered for each IP packet 470. However, at this hook point nothing needs to be modified in the packet, because the IP addressing correctly identifies source TPO and destination TPO as the source and destination endpoints 471. The packets leave the stack and go onto the network 472, at which time source TPO is done processing the write request 473.

Asynchronous to the edge processor reading the packet 466, the TCP/IP in source TPO will generate an acknowledgement message 475. The NF_IP_LOCAL_OUT hook is entered for this packet 476, which then 477 modifies the source IP address to be destination application server 50 and modifies the source port number to be destination application 51. The 472 packet leaves the stack and goes onto the source network to the source application When the destination TPO receives the sent buffer 480, the IP packets enter the IP stack from the network 481. Next hook, NF_IP_PRE_ROUTING, is entered 482. At this hook point, the addresses in the IP packet do not need to be modified 483 since the IP addressing correctly identifies source TPO and destination TPO. If the data was compressed, the decompression engine is called to decompress the data 484. The packets are removed from the incoming buffer by the packet driver and queued to the correct edge processor 485 based on the quintuple identified in the message header associated with each packet. The edge processor, serving as the local endpoint of the connection, issues the TCP/IP write request 486 to destination application 51 using the destination IP address and port number contained in the associated message header. Next hook NF_IP_LOCAL_OUT is entered 487 which modifies 488 the source IP address to be source application server 10 and the source port number to be source application 11. The packets leave the stack and go onto the network 489 at which time the destination TPO is done processing the write request 490.

Asynchronous to issuance of the TCP/IP write request 486 to application 51, but after issuance, the TCP/IP in destination application server 50 will generate an acknowledgement message 491 destined for application 11 running on application server 10. When destination TPO 80 receives the ACK, the packet enters the IP stack from the network 492. The NF_IP_PRE_ROUTING hook is entered 493, which then modifies 494 the destination IP address and port number to be that of destination TPO 80. The packet goes up the stack 495 for processing by destination TPO 80.

Figure 3G:
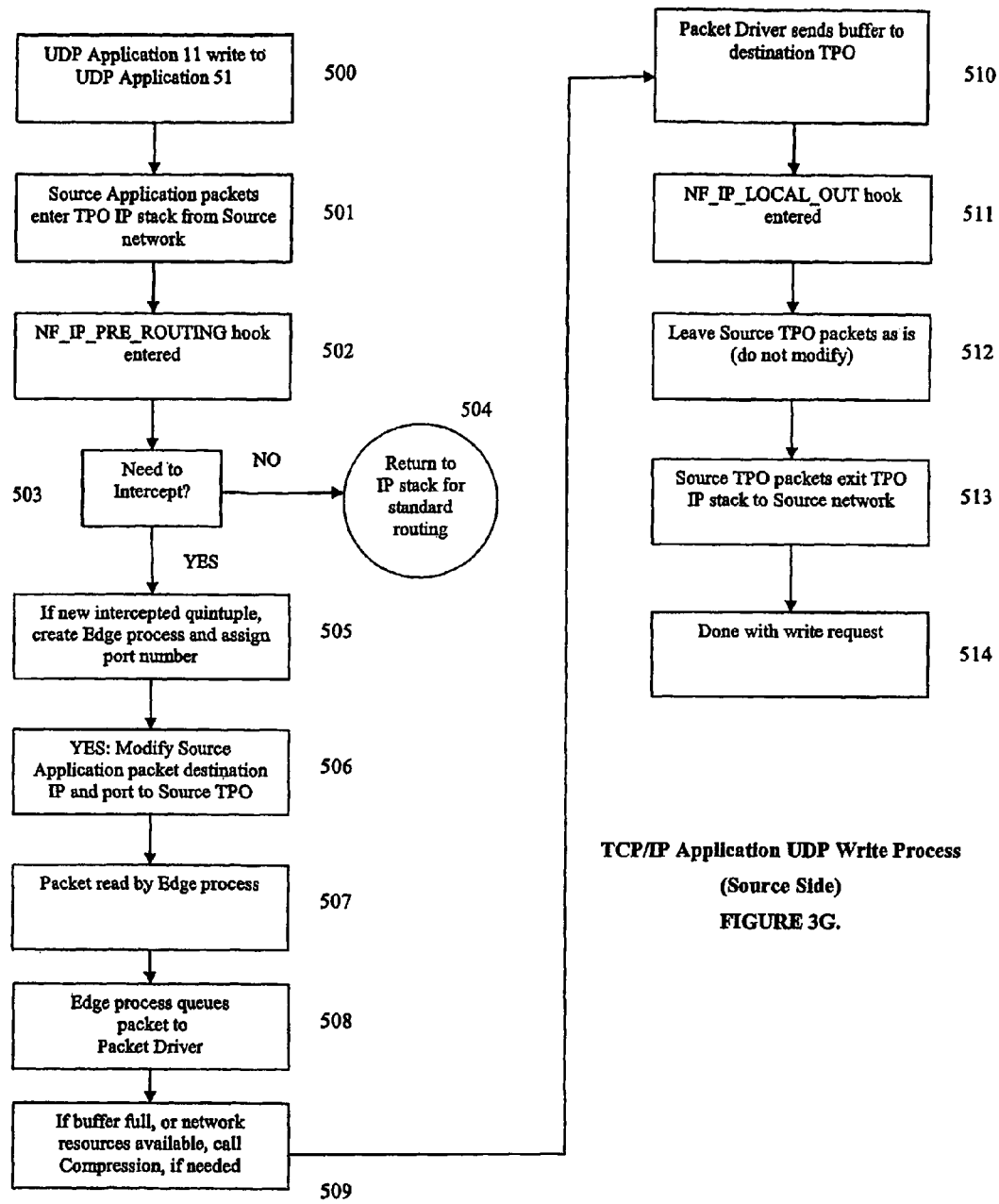
FIG. 3G is a diagram showing a TCP/IP application UDP write process.
Figure 3H:
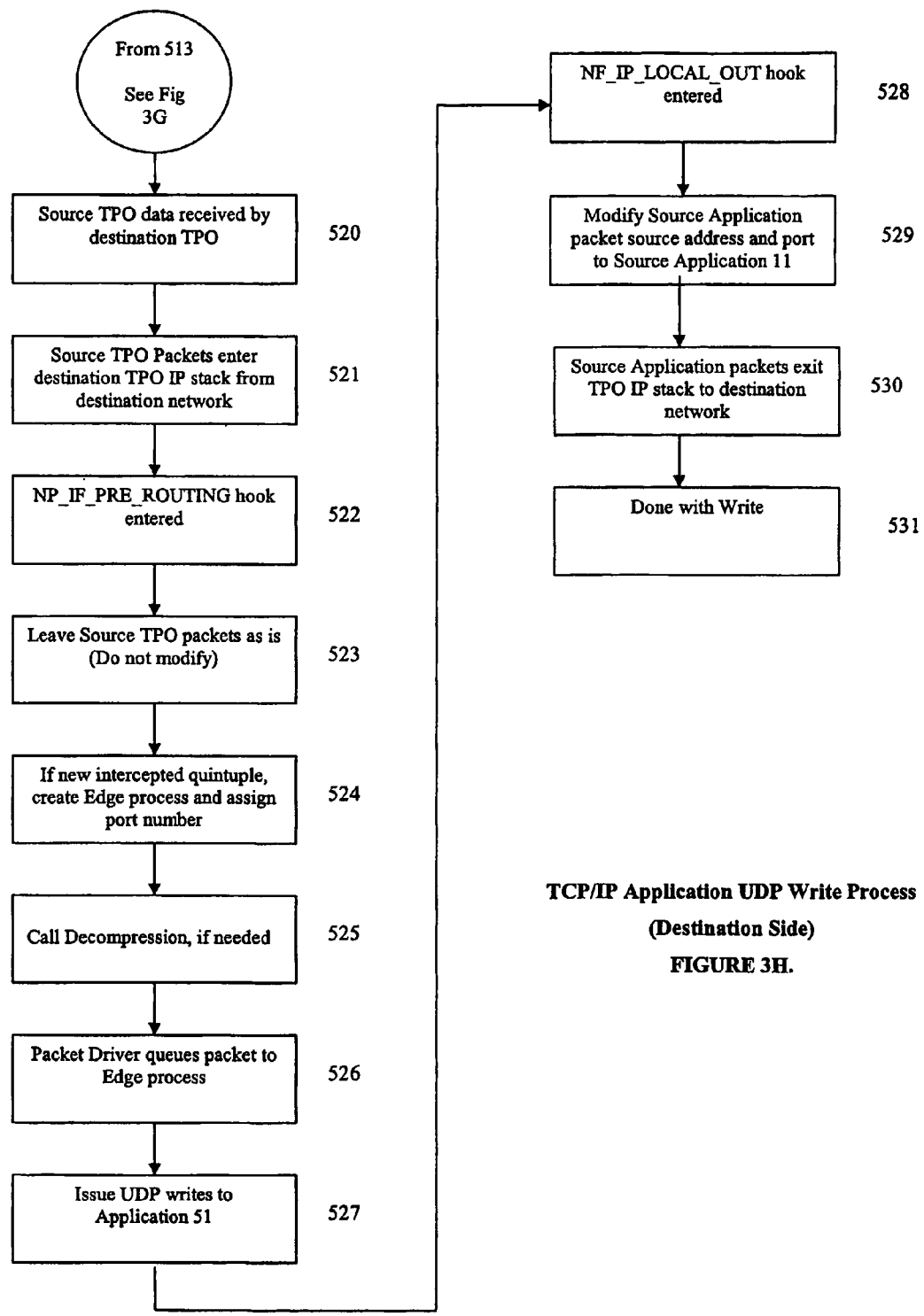
FIG. 3H is a diagram showing a TCP/IP application UDP write process.

FIGS. 3G and 3H illustrate the process flow that occurs after the establishment of a communication link between two peer UDP applications when sending data over a TPO communication link. At 500, UDP write request is issued by source UDP application 11 running on source application server 10 sending data to destination UDP application 51 which is running on destination application server 50. The write request is directed to source TPO 40 by means of standard IP routing mechanisms, which results in 501 the IP packets entering the IP stack of source TPO 40. NF_IP_PRE_ROUTING hook is entered and at 503 it is determined if this packet should be selected, based on a set of predefined filtering rules for matching source IP address, source IP port, destination IP address, destination IP port, and protocol type. If the packet should not be intercepted, then 504 no changes are made to the packet addressing and the packet continues through the stack and follows the routing rules in effect for that IP destination address. If the packet should be intercepted, a port number is assigned and the edge processor is created to serve as the local endpoint if this is the first occurrence of a UDP packet for this quintuple 505. Then at 506 the packet destination IP address is changed to be that of the source network interface on source TPO 40 and the port number is changed to be the source port on source TPO 40 on which the edge processor for this quintuple is listening. At 507 the edge processor then reads the intercepted packet and queues the packet, along with a message header, to the packet driver for subsequent insertion into the data mover buffer 508. When the buffer at 509 is full, or as soon as the data mover is able to accept additional requests from the packet driver, the packet driver calls the compression engine (if the compression feature is enabled), then passes the buffer to data mover 510 for the purpose of sending the buffer to the destination TPO over the data mover UDP communication path. The data mover is able to accept additional requests from the packet driver as soon as the previous request from the packet driver is complete, and the resources associated with sending the previous request are available. This means that the size of the buffers passed from the packet driver to the data mover can vary, and do not always contain the same number of message headers. The message header consists of the original source IP address, source IP port, destination IP address, destination IP port, and protocol type. When the UDP buffer is sent to destination TPO 80, the NF_IP_LOCAL_OUT hook is entered at 511 for each IP packet. However, at this hook point, nothing needs to be modified in the packet, since the IP addressing correctly identifies source TPO and destination TPO as the source and destination endpoints 512. At 513 the packets leave the stack and go onto the network, at which time source TPO 40 is done processing the write request 514.

When destination TPO 80 receives 520 the sent buffer, the IP packets enter the IP stack from the network 521. When hook point, NF_IP_PRE_ROUTING, is entered 522, the addresses in the IP packet do not need to be modified 523, since the IP addressing correctly identifies source TPO 40 as the source and destination TPO 80 as the destination. If this is the first occurrence of a UDP packet for this quintuple, a port number is assigned and the edge processor is created to serve as the local endpoint for this quintuple. If the data was compressed, the decompression engine is called to decompress the data 525. The packets are removed from the incoming buffer by the packet driver and passed to the assigned edge processor based on the quintuple identified in the message header associated with each packet 526.

The edge processor, at 527, serving as the local endpoint of the connection issues the UDP write request to application 51, using the destination IP address and port number contained in the associated message header. At 528, the NF_IP_LOCAL_OUT hook is entered, which then modifies 529 the source IP address to be that of source application server 10, and modifies the source port number to be that of source application 11. At 530, the packets leave the stack and go onto the network at which time destination TPO 80 is done processing the write request 531.

Figure 3I:
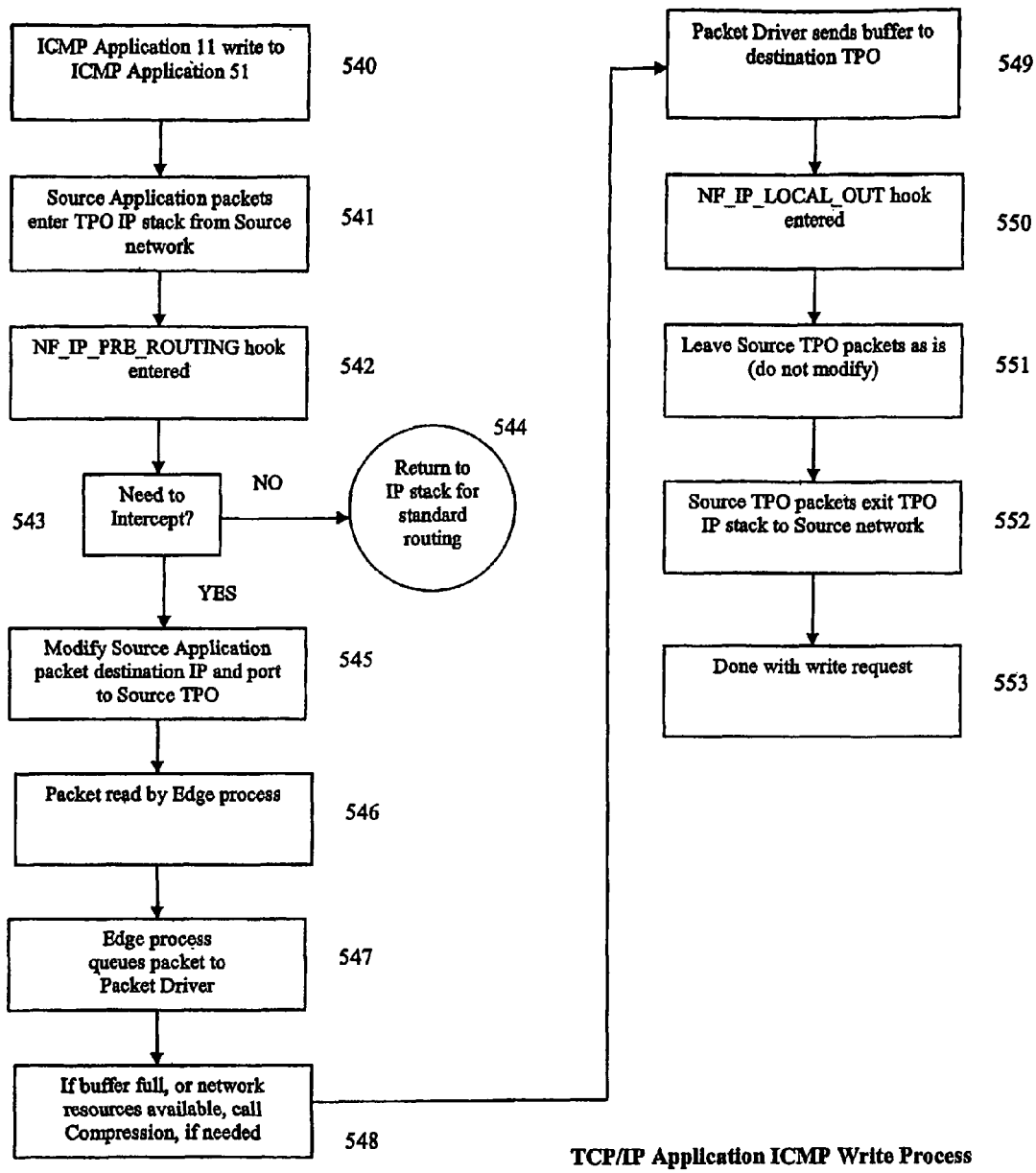
FIG. 3I is a diagram showing a TCP/IP application ICMP write process.
Figure 3J:
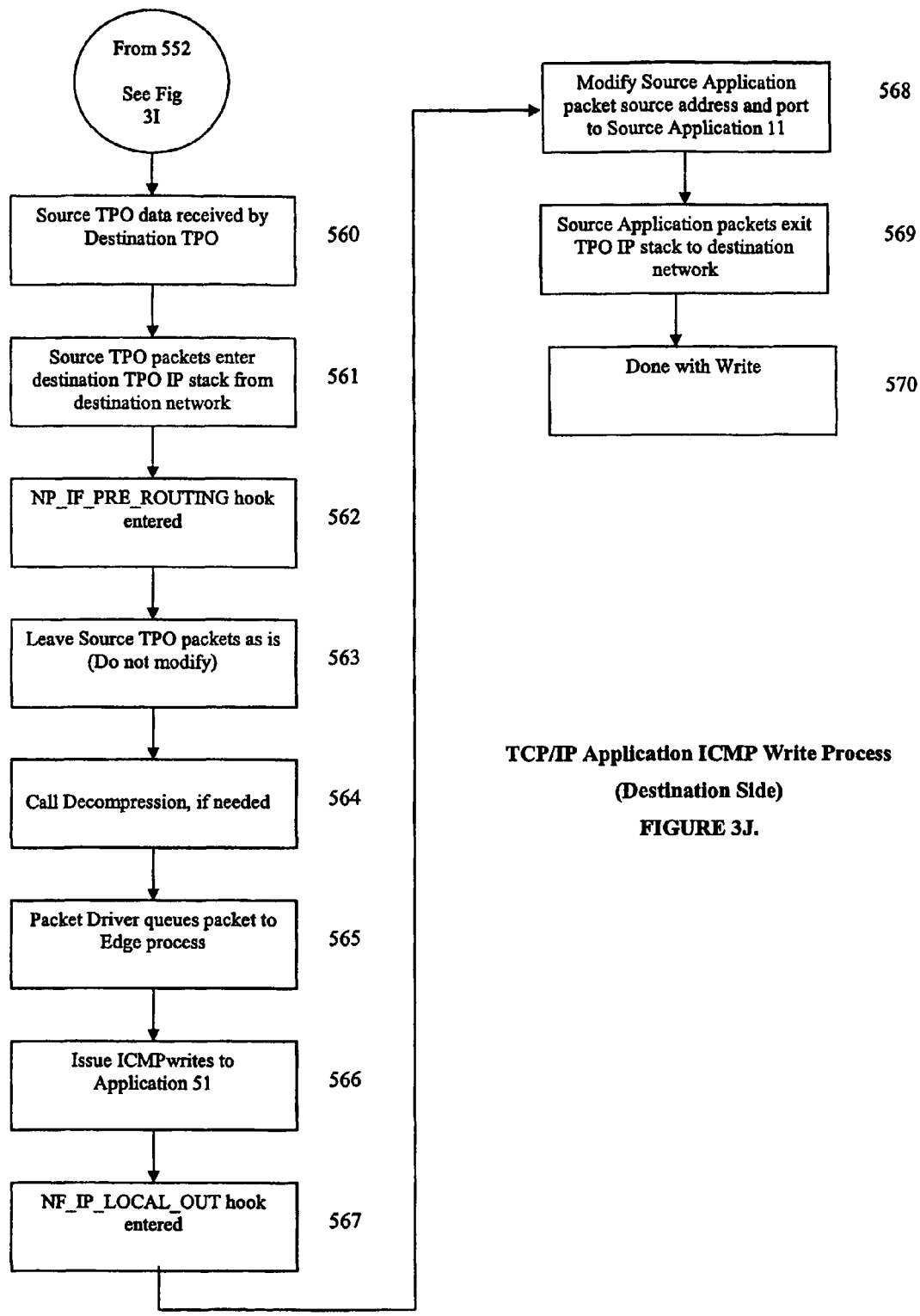
FIG. 3J is a diagram showing a TCP/IP application ICMP write process.

FIGS. 3I and 3J illustrate the process flow that occurs after the establishment of a communication link between two peer ICMP applications when sending data over a TPO communication link. The edge processors are created and port numbers assigned during TPO initialization to handle all ICMP requests. These edge processors serve as the local endpoints for ICMP requests issued by source application 11 running on source application server 10 and by destination application 51 running on destination application server 50. At 540, a ICMP write request is issued by ICMP source application 11 running on source application server 10, sending data to ICMP destination application 51 running on destination application server 50. The write request is directed to source TPO 40 by means of standard IP routing mechanisms, which results, at 541, in the IP packets entering the IP stack of source TPO 40. At 542, the NF_IP_PRE_ROUTING hook is entered and, at 543, a determination is made whether this packet should be selected, based on a set of predefined filtering rules for matching source IP address, source IP port, destination IP address, destination IP port, and protocol type. If the packet should not be intercepted, then, at 544, no changes are made to the packet addressing and the packet continues through the stack and follows the routing rules in effect for that IP destination address. If the packet should be intercepted, then at 545, the packet destination IP address is changed to be that of the local network interface on source TPO 40, and the port number is changed to be the local port on source TPO 40 on which the ICMP edge processor is listening. At 546, the edge processor then reads the intercepted packet and at 547 queues the packet, along with a message header to the packet driver for subsequent insertion into the data mover buffer. When the buffer at 548 is full, or as soon as the data mover is able to accept additional requests from the packet driver, the packet driver calls the compression engine (if the compression feature is enabled), then passes the buffer to the data mover 549 for the purpose of sending the buffer to the destination TPO over the data mover UDP communication path. The data mover is able to accept additional requests from the packet driver as soon as the previous request from the packet driver is complete, and the resources associated with sending the previous request are available. This means that the size of the buffers passed from the packet driver to the data mover can vary, and do not always contain the same number of message headers. The message header consists of the original source IP address, source IP port, destination IP address, destination IP port, and protocol type. When the UDP buffer is sent to destination TPO 80 the, the NF_IP_LOCAL_OUT hook is entered for each IP packet. However, at this hook point, 551, nothing needs to be modified in the packet since the IP addressing correctly identifies source TPO 40 and destination TPO 80 as the source and destination endpoints. At 552, the packets leave the stack and go onto the network at which time, 553, source TPO 40 is done processing the write request.

As shown in FIG. 3J at 560, when destination TPO 80 receives the sent buffer, the IP packets enter, at 561, the IP stack from the network. At 562, the NF_IP_PRE_ROUTING hook is entered. At this hook point, the addresses in the IP packet do not need to be modified 563 because the IP addressing correctly identifies source TPO 40 as the source and destination TPO 80 as the destination. If the data was compressed, the decompression engine is called to decompress the data 564. At 565, the packets are removed from the incoming buffer by the packet driver and passed to the ICMP edge processor. At 566, the edge processor, serving as the local endpoint of the connection, issues the ICMP write request to destination application 51 using the destination IP address and port number contained in the associated message header. At 567, the NF_IP_LOCAL_OUT hook is entered, which then modifies at 568 the source IP address to be that of source application server 10 and modifies the source port number to be that of source application 11. At 569, the packets leave the stack and go onto the network at which time the destination TPO 80 is done processing the write request, 570.

The data mover is comprised of Layer 3 (Network), Layer 4 (Transport), and Layer 5 (Session) services. Application Layer services (Layer 6) are provided by the packet driver. Each of the data mover layers provides a set of interface services: the Network layer uses the Driver services, which consist of UDP socket calls; the Transport layer uses the Network services; the Session layer uses the Transport services.

Application Layer services are provided by the packet driver, which interfaces with the data mover at the Session Layer. The packet driver is responsible for aggregating the data from intercepted packets along with the packet routing information into a TPO buffer. When either the buffer is full or TPO Session Services are available the local packet driver uses the S-WRITE Session Service to send this buffer over the TPO connection to the peer packet driver on the other side of the connection. This data will complete an S-READ Session Service request previously issued by the peer packet driver.

Each TPO buffer can contain intercepted IP packet data from more than one application server and can contain intercepted IP packet data that is destined to more than one application server. In other words, all of the data for the intercepted IP packets in a given TPO buffer may have different source IP addresses and/or different destination IP addresses. It is up to the receiving TPO packet driver to process the routing information received with each packet and deliver the IP packets to the correct destination.

Communication between the packet driver and the data mover takes place by sharing a data structure, referred to as the data mover network request block (NRB). This structure contains fields that are examined and updated during the course of a connection. Data mover calls consist of service requests to establish a connection, transfer data, and terminate a connection. The types of service calls available are connect, offer, confirm, write, read, close, and disconnect.

Connect is used to establish a connection to the remote packet driver through a matching Offer. It allocates the resources needed to maintain a connection at the session level and all lower levels. Data associated with each level will be delivered to the matching layer on the other end along with the Connect indication.

Offer is used when a packet driver wishes to be connected to a peer packet driver. It allocates the connection resources needed to receive connection data from the network. Successful completion of the Offer provides a Connect indication as well as the data sent by the Connect.

Confirm is issued upon completion of an Offer by the packet driver that accepted the connection. It may provide data that will be sent back to the connecting packet driver. Upon receipt of the Confirm by the connecting side, the connection is considered complete.

Write is the normal means of sending data to the other side. A Write request completes as soon as the local data mover has accepted responsibility for the data.

Read is a signal to the data mover that the packet driver is prepared to accept further data or indications from the data mover. The Read mechanism is used by the data mover to allow the packet driver to accept data from the network at a sustainable rate.

Close is used to gracefully terminate the connection. When one packet driver issues a Close no further transmissions may take place from that packet driver. When the second side issues a Close the connection is terminated.

Disconnect is used to abruptly terminate a connection. The other side receives a Disconnect indication and any data in progress will be lost.

Figure 4:
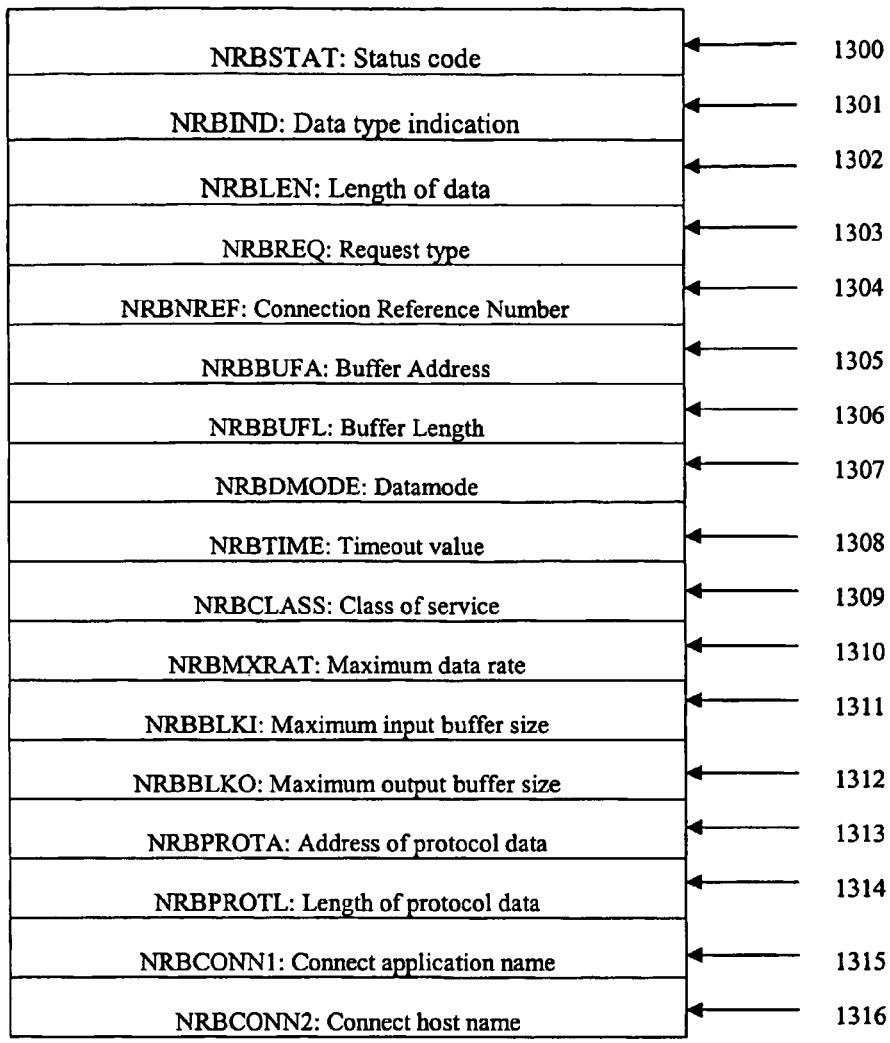
FIG. 4 is a diagram showing a data mover network request block structure.

The data mover network request block (NRB) provides the interface structure between the packet driver component and the data mover. FIG. 4 illustrates the content of the data mover network request block. The contents of the data mover network request block and an explanation of the contents are as follows:

NRBSTAT 1300 contains a status code for the request issued by the packet driver. If the request is currently in progress, the word contains a negative value. If the request completed successfully, then this word contains a zero. If the data mover detected an error, a binary value will appear in this field.

NRBIND 1301 indicates the type of data received in response to a READ or OFFER request. If any of these read type requests are issued, NRBIND receives a non-zero value. If a write type request (WRITE, CONNECT, CONFIRM, CLOSE, or DISCONNECT) is issued, the returned value of NRBIND is usually zero. If an error is returned to the write type request, the connection is broken or was never established. In that case, a Disconnect Indication will be set in NRBIND. The values returned in NRBIND are defined as (1) a Connect Indication, (2) a Confirm Indication, (3) a Normal data Indication, (5) a Close indication, and (6) a Disconnect indication. If an operation did not complete successfully, then NRBSTAT will be set to a positive, nonzero value. If NRBSTAT is nonzero, then NRBIND will have one of the following values: (a) if the error results in the loss of the connection or the connection not being established in the first place, then a Disconnect Indication (6) will be in NRBIND; (b) if the error means that the request could not be processed but the connection remains in effect, then NRBIND will be set to zero; or (c) if the data is "damaged" in input (user buffer too small, bad DATAMODE, etc.), then NRBIND will reflect the type of data received.

NRBLEN 1302 specifies the number of words that are needed to contain the input or output data. For read operations, NRBLEN reflects the amount of data received from the transmitting side and for write operations, NRBLEN specifies the length of data to send.

NRBREQ 1303 is the Request Code that is to be given to the data mover. This is a sixteen bit binary value that contains the type of request (example: SREAD) that the data mover is to perform. Another bit specifies whether the data mover is to automatically suspend program execution until the request has completed. The values of NRBREQ are split into three fields: option flags; service level; and function. Option Flags refers to optional processing that the data mover will perform on the request. The binary format of this field is: (a) 0000 indicates that this request is to be WAITed upon and that control will not return to the packet driver until this request is complete; and (b) 1000 indicates that control is to be returned to the packet driver as soon as the data mover has internally queued the request. Service level indicates whether the request is a SESSION, TRANSPORT, NETWORK, or DRIVER request. Assigned values are: (a) 0—SESSION request; (b) 1—TRANSPORT request; (c) 2—NETWORK request; and (d) 3—DRIVER request. Function indicates the specific type of request to be issued. Because of the similar nature of the data mover request codes at each of the service levels, the total request is produced by adding the Function and service level—for example, SREAD is a 0 (Service level) plus a 82 (function) for a 0082 (hex) request code. Function assignments (all numbers are in hex) are as follows: (a) 01: Connect (Valid for Session, Transport, Network and Driver levels); (b) 02: Confirm (Valid for Session, Transport, Network and Driver levels); (c) 03: Write (Valid for Session, Transport, Network and Driver levels); (d) 04: Reserved; (e) 05: Close (Valid for Session and Transport levels); (f) 06: Disconnect (Valid for Session, Transport, Network and Driver levels); (g) 07-7F: Reserved; (h) 81: Offer (Valid for Session, Transport, and Network levels); (i) 82: Read (Valid for Session, Transport, Network and Driver levels); and (g) 84-FF: Reserved.

NRBNREF 1304 contains a 16 bit internal connection identifier that distinguishes this connection from all others maintained by the data mover. If a Session Connect or Offer is made, this value should initially be set to zero, and an identifier will be assigned by the data mover and returned to the Session caller.

NRBBUFA 1305 contains the start of the data buffer to be used for either input or output requests. The packet driver supplies a valid buffer address before each input or output request. In the case of a write request, the contents of this buffer must be left unchanged until the associated data mover write type request has completed. If a read request is issued, then the contents of the buffer may be processed when the read request completes successfully.

NRBBUFL 1306 for output requests, this field is ignored. For input requests, it specifies the maximum length of data that the data mover can store in the buffer.

NRBDMODE 1307 datamode is specified by the transmitting packet driver on any write request. It is always specified as a 16 bit quantity. Datamode is forwarded through all layers of the data mover. When the receiving side receives the data, the datamode specified by the transmitter is inserted into the NRB associated with the receiving READ request. Datamode supports three basic types of conversion options. If both "source" and "destination" fields are zero (the default), then data is sent in bit stream mode. The sent bit stream pattern is precisely reproduced in the destination TPO unit. If both fields contain a "1", then the data is sent in octet mode. The octet mode is where 8 bit binary quantities are sent. Character refers to sending character information from one TPO unit to another. The datamode field is comprised of a source character set and a destination character set. Values greater than one indicate an index that specifies a certain character set. The transmitter specifies the character code used by the information in the write buffer and the character code in which the information should be received by the corresponding application. Indices for character sets are: (a) 2: ASCII (8 bit); (b) 3: EBCDIC; and (c) 4-7: reserved. The packet driver transmits all buffers in bit mode.

NRBTIME 1308 is used to specify the length of elapsed time that the associated read-type request is to remain in effect. If a time interval equal to the number of seconds in NRBTIME has elapsed and no data or connection information has arrived to satisfy the READ or OFFER, then the request will end with an error. If the value in NRBTIME is zero, then the request will wait indefinitely. The following parameters are associated with the session negotiation process. Information in these fields is updated by the data mover as their values change. These fields are initially specified during the OFFER and CONNECT requests. When the OFFERing task receives the connect, the negotiated values are set in the OFFERed NRB. When the CONFIRM is sent, the negotiated values are set in the NRB associated with the READ of the CONFIRM information. Subsequent attempts to change these fields will have no effect.

NRBCLASS 1309 specifies the type of protocol that will be used by the connection service. The values defined for class are as follows: (a) 0—use default class (4); (b) 1—reserved; (c)—use Version 2 data mover protocol; and (d)—use Version 4 data mover protocol (standard). The packet driver uses Version 4 data mover protocol.

NRBMXRAT 1310 specifies the maximum data rate possible to the connection based on the packet driver's specification or the physical characteristics of the links. Upon completion of the OFFER or READ following an CONNECT request, this field will have a nonzero value that contains the maximum throughput that is possible to the connection, based on the packet driver's original request and the characteristics of the communications link between the two units.

NRBBLKI 1311 and NRBBLKO 1312 specifies the maximum size block of data that the packet driver expects to read and write during the connection. This parameter is provided with the CONNECT and OFFER requests. During the protocol negotiation process, the NRBBLKI of one side of the connection is compared with the NRBBLKO (output maximum buffer size) specified at the other end and the lesser of the two values will be returned in the two respective fields. For the CONNECTing packet driver, the negotiated results will be returned in the NRB along with the CONFIRM data read following the CONNECT. The OFFERing packet driver will receive the negotiated values upon completion of the OFFER. Two default options are available with these fields. If a zero is specified in either one of these fields, then the value used for negotiation will be an installation supplied default that is provided at data mover installation time. If the value in this field is a −1, then the size used for negotiation will be the maximum size available for that installation, which is also a parameter specified at initialization time. Note that the value implied by the use of zero or −1 will be used for negotiation of the connection block sizes. The actual size negotiated will be supplied in these fields upon completion of the CONNECT and OFFER.

NRBPROTA 1313 and NRBPROTL 1314 fields permit the packet driver to provide Odata (octet protocol data) to the called layer of the data mover. When a write type command is issued, the Odata provided (if any) is added to the protocol message, and eventually delivered as Odata to the receiving packet driver's read-type command. As a result, this is a second buffer that is handled in a similar way to the data that is specified by NRBBUFA and NRBLEN. There are, however, some distinct differences. Odata is always sent and received in "octet mode," which means it will be represented by 8 bit binary quantities. The maximum amount of Odata that may be sent is limited to 256 bytes or less. On a write type operation, no Odata will be sent if NRBPROTL is zero. If a nonzero length is specified, then the Odata will be transmitted along with the data, if present. When the read takes place, the data will be placed in the address specified by NRBPROTA and its incoming length will be set in NRBPROTL. In all cases, NRBPROTL contains the length of the Odata in octets.

NRBCONN1 1315 and NRBCONN2 1316 fields are used to provide connection information when a CONNECT or OFFER request is issued. Their usage depends on the level of service requested.

Session Layer Services

The packet driver interfaces with the data mover at the Session Layer. Besides providing access to Transport Services, the Session Layer also provides the ability to address a remote packet driver application by two character string names: the "host" name of the TPO unit and an "application" name of the packet driver. A packet driver issues an S-OFFER request, which "advertises" the application name ("SESSION1") as being available on that "host". A packet driver component on another TPO unit that wishes to connect to this packet driver issues an S-CONNECT request, providing the "host" and "application" names. Data may be provided by the S-CONNECT, which will fill the buffers supplied by the S-OFFER request. After the Connect data has arrived, the receiving packet driver issues an S-CONFIRM which satisfies the connector's S-READ. Both sides may concurrently S-READ and S-WRITE data. The connection may be terminated with a pair of S-CLOSE requests or a single S-DISCONNECT request. Session service provides a simple means of identifying and connecting packet driver on two TPO units. To accomplish this, Session service actually performs two Transport connections during the lifetime of a single Session connection; one connection to a data mover component called Session Manager; and a second connection to perform data transfer between the two packet drivers. The purpose of the Session Manager element is to provide a unique reference number (N-ref) for each offering packet driver connection, and returning it to the packet driver from which a connection request is received. This reference number is used on all subsequent messages destined for this connection.

Figure 8A:
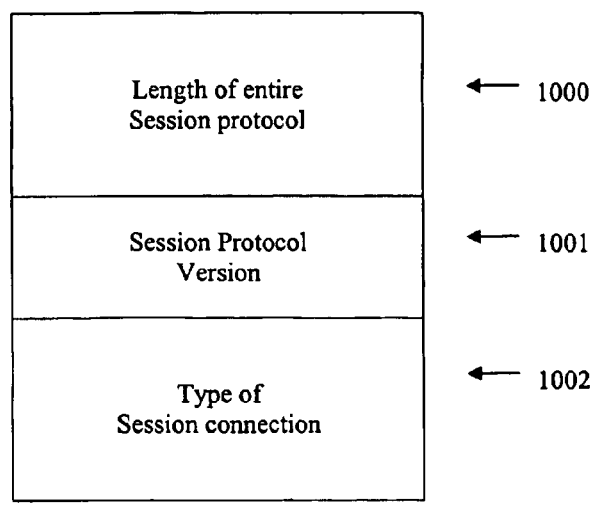
FIG. 8A is a diagram showing a data mover session manager protocol base field.
Figure 8B:
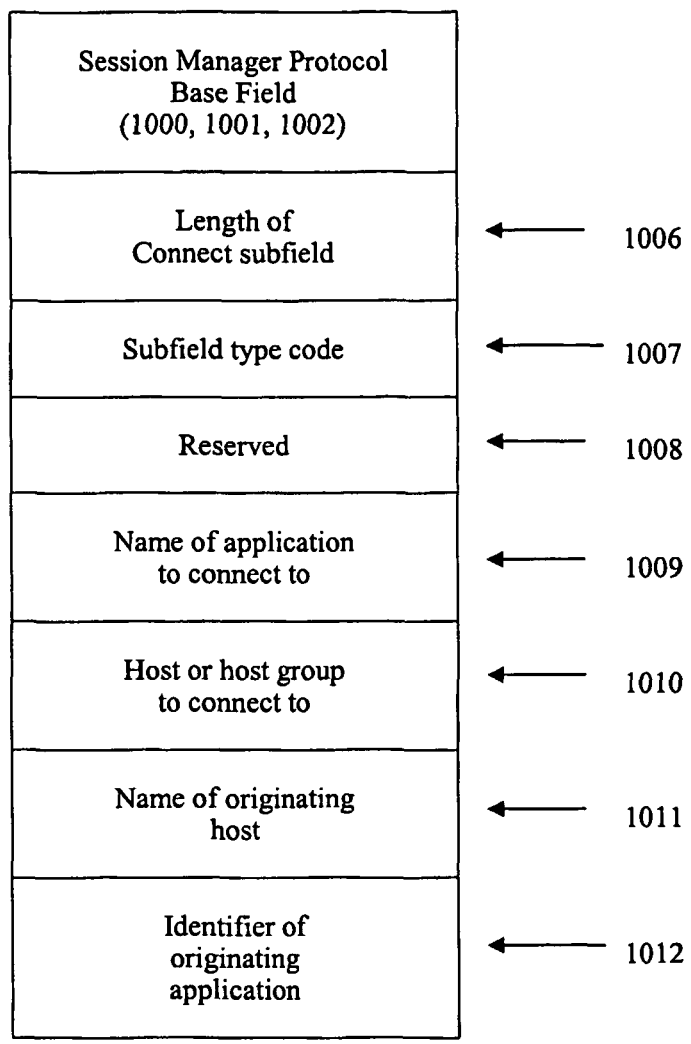
FIG. 8B is a diagram showing a data mover session manager protocol subfield.
Figure 8C:
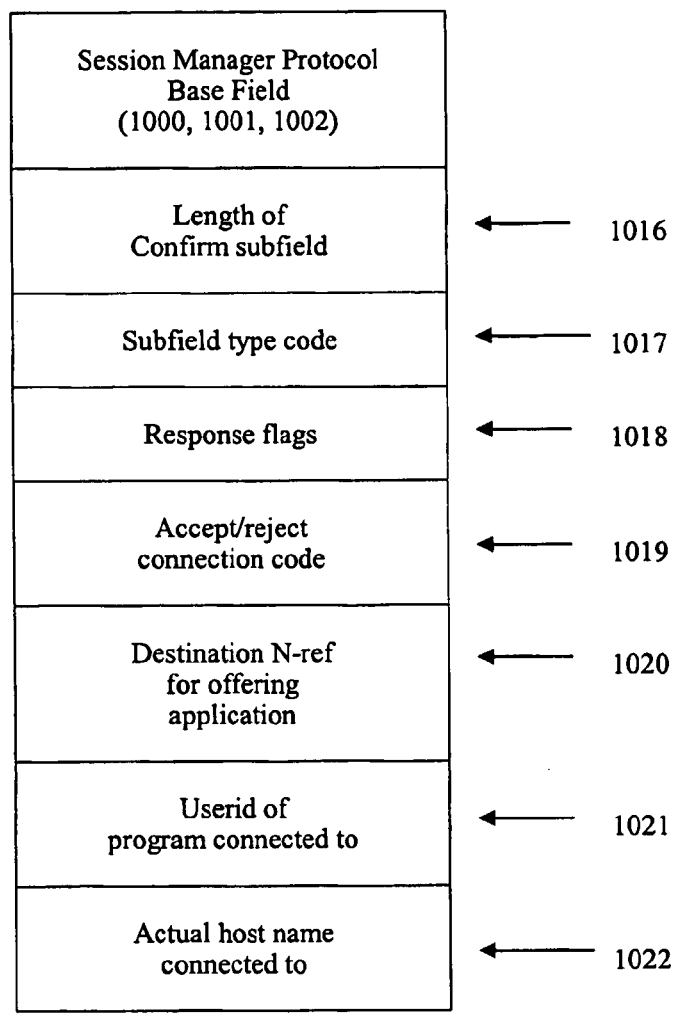
FIG. 8C is a diagram showing a data mover session manager protocol confirm subfield.
Figure 8D:
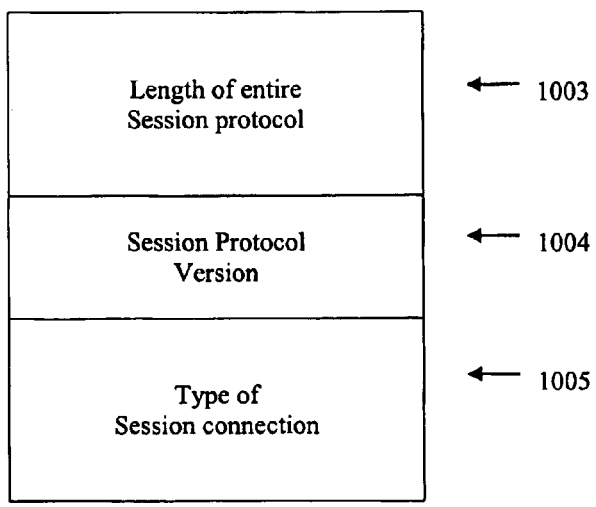
FIG. 8D is a diagram showing a data mover session protocol base field.
Figure 8E:
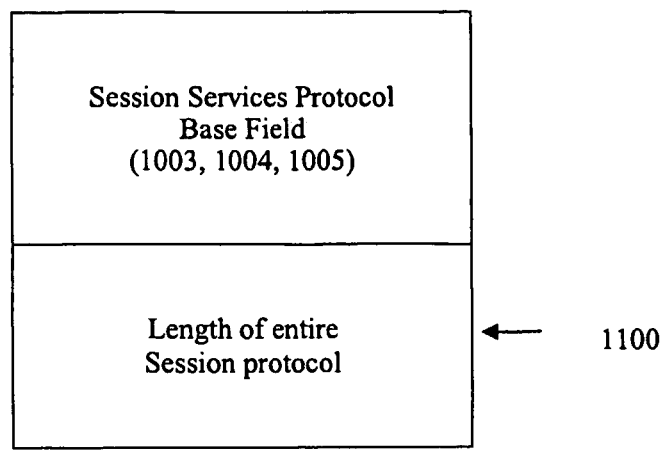
FIG. 8E is a diagram showing a data mover null session protocol subfield.
Figure 8F:
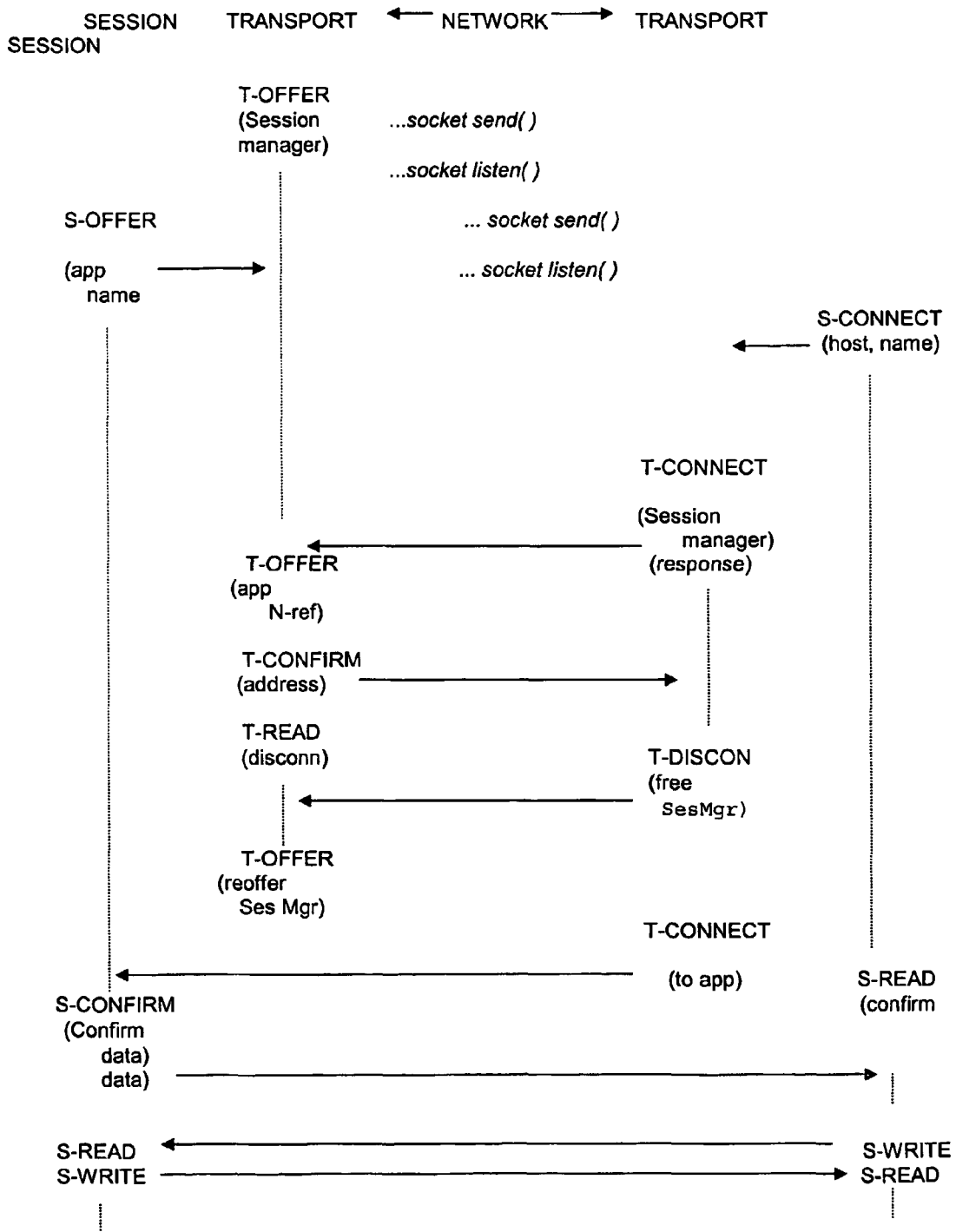
FIG. 8F is a diagram showing a data mover session connection sequence.

FIG. 8F illustrates the establishment of a communication link between packet driver components on two TPOs. The TPOs establish a packet driver connection during the TPO initialization process that remains as a persistent connection.

During TPO initialization, the Session Manager issues a T-OFFER, using a well-known network reference number. When the packet driver issues the S-OFFER request, the Session Manager receives control. It places the eight character application name (SESSION1) in an internally maintained list of applications that have "advertised" for service.

Connection establishment begins when the Session Manager's T-OFFER completes with a Connect Indication, received from a remote packet driver. The Odata associated with the Connect Indication contains information supplied by the initiation of an S-CONNECT request from a packet driver on a peer TPO. This Odata contains the application name of the process to be connected to (SESSION1), along with the application and host name of the connecting packet driver component.

The session manager responds to the connecting packet driver by issuing a T-CONFIRM with the results of the Session "match." If the application named ("SESSION1") by the connector is unknown to the Session Manager, then failure will be reported in the T-CONFIRM Odata. If the application is known, then the entry is removed from the session manager's list of offered application names. N-ref's are assigned for the local offering packet driver. A T-OFFER is issued on the behalf of the local offering packet driver by the Session manager. The N-ref's that should be used for the connection are supplied to the connecting packet driver by the T-CONFIRM request issued by the session manager.

When the remote packet driver that is processing the S-CONNECT request has the Confirm Indication returned from the Session Manager, it issues a T-DISCONNECT to free the Session Manager. The connector then issues a T-CONNECT to the N-ref specified in the Confirm data. Finally, the "direct" connection proceeds between the two packet driver components.

Once the connection is established to the remote packet driver, then Session service "drops out" in the sense that subsequent Session service calls from the packet driver simply invoke the equivalent Transport service call.

The present invention therefore contains a method of forming TPO messages that include Session Protocol data for the purpose of communicating with the peer-level Session layer on the remote side of the TPO network.

The S-CONNECT request is used to establish a Session Connection. It initiates the establishment of a connection to a remote packet driver component that has issued an S-OFFER request. When invoked, Session service will establish a Transport connection to the remote TPO and send it messages to establish the connection. It will send information that will allow data to flow in an orderly, full duplex manner between applications.

Data mover connection philosophy works with an "active" and a "passive" party for any connection. The "passive" party issues an S-OFFER request and waits for a subsequent connection to arrive. Any other TPO with network access may then connect to it. The "active" party then issues an S-CONNECT which causes the connection to be opened. If an S-CONNECT is issued to connect to a packet driver that is not yet present, then the connection will fail. Thus the S-OFFER must precede the S-CONNECT chronologically.

When the S-CONNECT is issued, the packet driver specifies two buffer lengths and addresses—one for Pdata and one for Odata. The Odata is always sent and received in "octet" (8 bit byte) format. The amount of Odata that may be sent over any connection is dependent on installation parameters specified for both the local and remote copies of the data mover.

The parameters used in the data mover Network Request Block for the S-CONNECT request are as follows:
  NRBBUFA specifies the address of the Pdata that is to be sent to the offering Packet Driver.
  NRBLEN specifies the length of the Pdata (in addressable units) that is to be sent with the S-CONNECT request.
  The amount of Pdata that may be sent with an S-CONNECT request is limited; in general, the length of the data can be no greater than the maximum associated data size supported by the Network level connection.
  NRBDMODE specifies the Datamode to be used on the Pdata during transfer.
  NRBPROTA and NRBPROTL specify the length and address of the Odata to be sent to the offering packet driver. Buffers of Odata must always be provided by the application. The maximum amount of Odata that may be sent over a Session connection is limited by installation parameters on both the local and remote copies of the data mover.
  NRBMAT is a value that may be specified to limit the rate at which data is sent on the network. Values in this field are in 1000's of bits per second. If this value is set to zero when the S-CONNECT is issued, then the maximum transmission rate possible with the active route will be used. When the S-CONNECT completes, NRBMXRAT will contain the transmission speed limit in 1000's of bits per second. If Session service finds that another route must be used because of a communications failure on the first, then NRBMXRAT will be changed to reflect the speed limit on the new route. The packet driver will receive no other notification of the change of route.
  NRBBLKO and NRBBLKI can be used to specify the maximum Pdata sizes that are acceptable to the packet driver for output and input, respectively. They will be sent to the offering packet driver, who may also provide values for these fields in the S-OFFER request. When the S-OFFER completes, or the connecting party has the S-READ complete which reads the offeror's S-CONFIRM, then these fields will contain the minimum of the two sizes specified by the two packet drivers. Once these values are negotiated, the data mover will not permit a block of Pdata greater than this maximum to be transmitted on the network. The data mover also uses this upper limit on transmission size to improve connection and buffer management. Two default values are available for these fields. If a zero is specified in either one of these fields, then an installation defined default will be used. If a "−1" is contained in this field, then the maximum size allowable by this installation will be used.
  NRBCONN1 specifies an eight character alphanumeric name of the TPO that may be running the matching S-OFFERed packet driver. This name will be an element of a TPO configuration provided when the data mover was started or generated. Session service will determine if the packet driver name provided in NRBCONN2 is an available, S-OFFERed, application.
  NRBCONN2 contains the name of the packet driver to which the connection will be made. The offering packet driver will have provided this name in NRBCONN2 of its S-OFFER request.

The results of an S-CONNECT completion are as follows: (a) NRBSTAT/success/failure code; (b) NRBIND/set to zero; (c) NRBNREF/S-ref (Session ID) assigned; (d) NRBBLKO/maximum transmission Pdata size; (e) NRBBLKI/maximum reception Pdata size; and (f) NRBMXRAT/max transmission speed of path.

The S-OFFER request is used to solicit an incoming Session Connection. It is used by a packet driver that wants to establish a "passive" connection, that is, to wait for another. Or it is used by an "active" packet driver to request that the connection be completed. It is a read-type request in the sense that it remains outstanding until an incoming S-connect indication arrives, and that data sent by the remote S-CONNECT will be used to fill buffers specified by the S-OFFER.

The parameters used in the data mover Network Request Block for the S-OFFER request are as follows:

NRBBUFA contains the address of the buffer to be used to store the Pdata with the incoming S-connect.

NRBBUFL contains the length of the buffer provided to receive the incoming Pdata. If the data that arrives exceeds this length, then the buffer will be filled up to NRBBUFL, NRBLEN will contain the amount of data that could have been received, and NRBSTAT will contain an error indicating that Pdata was truncated.

NRBPROTA and NRBPROTL contain the address and length of a buffer to hold the incoming Odata. As with Pdata, only NRBPROTL octets of data will be placed in the buffer if a greater amount of information arrives. When the S-OFFER completes successfully, NRBPROTL will contain the number of octets of Odata actually received.

NRBTIME contains the time interval that the S-OFFER is to remain outstanding. If this period of time elapses and no successful S-connection is made to satisfy, then the S-OFFER will terminate with an error code in NRBSTAT. The value in NRBTIME is measured in seconds.

NRBNREF contains the N-ref that is to be used for this session connection.

NRBBLKO and NRBBLKI contain the maximum size block that the packet driver wishes to send with a single write or read-type request, respectively. When the S-OFFER completes with the connect information, these fields will contain the minimum of the two values specified by the offering and connecting applications. Attempts to transmit more data than the maximum in NRBBLKO will be rejected as an error. Two default values are available for these fields. If a zero is specified in either one of these fields, then an installation defined default will be used. If a −1 is contained in this field, then the maximum size allowable by this installation will be used.

NRBMXRAT contains the fastest data rate that may be used for transmission from the offering packet driver. If this field is set to zero when the S-OFFER is issued, then it will contain the maximum rate that can be supported by the communications path in use when the connection is established. If a nonzero value is provided, then completion will result in the minimum of the user specified and communications link speeds. This rate specified only applies to transmission; the connecting end of the connection has its own NRBMXRAT that may be used to limit transmission speed in the other direction.

NRBCONN1 is ignored when the S-OFFER request is made. If the S-OFFER request completes successfully, it will have the eight character alphanumeric name of the TPO from which the S-CONNECT originated.

NRBCONN2 contains the name of the packet driver which is to be offered. The connecting packet driver must supply a matching name in NRBCONN2 of its S-CONNECT request for the connection to succeed.

The results of the completion of the S-OFFER are as follows: (a) NRBSTAT/success/failure code; (b) NRBIND/contains Connect Indication; (c) NRBLEN/length of incoming Pdata; (d) NRBPROTL/length of Odata received; (e) NRBNREF/S-ref assigned this connection; (f) NRBBLKO/maximum transmission Pdata size; (g) NRBBLKI/maximum reception Pdata size; (h) NRBMXRAT/max transmission speed of path; (i) NRBCONN1/name of host where S-conn originated; and (j) NRBCONN2/user-id of program originating S-conn.

S-CONFIRM indicates completion of a Session connection. It is issued by the offering packet driver in response to a successfully completed S-OFFER. It signals the intent of the offering packet driver to go ahead with the connection, and to have data sent back to the originating packet driver. Either S-CONFIRM or S-DISCONNECT must be issued in response to a successful S-OFFER; any other request will be rejected. An S-CONFIRM is not valid at any time other than immediately after the S-OFFER. S-CONFIRM is a write type command and both Odata and Pdata may be sent back to the connecting Packet Driver.

The parameters used in the data mover Network Request Block for the S-CONFIRM request are as follows:

NRBBUFA contains the address of Pdata to be sent to the receiving packet driver.

NRBLEN contains the length of the transmitted Pdata in addressable units. The length of data must be less than or equal to NRBBLKO.

NRBDMODE contains the Datamode to be used for the transmission of the Confirm Pdata.

NRBPROTA and NRBPROTL contain the address and number of octets of Odata to be sent to the connecting packet driver.

The results of the S-CONFIRM completion are: (a) NRBSTAT/success/failure code; and (b) NRBIND/set to zero.

The S-READ solicits an indication for additional data or a connection status Indication. It is a request that informs the data mover that the packet driver is ready to process additional input from a Session connection. In general, such input will be a data indication of some type, indicating that data has arrived from the remote packet driver. However, it can also be a disconnect Indication indicating that the connection has been lost for some reason. One of the purposes of the S-READ is to allow the packet driver to accept incoming data at a constrained rate. However, it is essential that an S-READ be issued to service incoming data on a timely basis. The data mover Transport service places a time interval limit (referred to as READTO) which causes a connection to be terminated if no S-READ is issued to receive an incoming indication within READTO seconds of elapsed time. In addition to Odata and Pdata, the S-READ request will complete with an "indication" in NRBIND, which indicates the type of Session request that was issued to send this data. A Confimm, Data, Close, or Disconnect indication may be received along with its associated Odata and Pdata.

The parameters used in the data mover Network Request Block for the S-READ request are as follows:

NRBBUFA contains the address of the buffer that will hold the incoming Pdata.

NRBBUFL is used to specify the maximum length of the packet driver buffer to hold Pdata.

NRBPROTA and NRBPROTL are used to specify a buffer for incoming Odata. If more than NRBPROTL octets of data arrive, the Odata will be truncated, NRBSTAT will contain an error, and NRBPROTL will contain the length that was received.

NRBTIME specifies the maximum length of elapsed time that the S-READ is to remain outstanding. If this interval passes and there is no indication to give to the packet driver, then the S-READ completes with an error code in NRBSTAT. The connection is not terminated; subsequent S-READ's and S-WRITE's may be issued at any time. If zero is present in this field, the read will remain outstanding indefinitely. The value of this field is in seconds.

The results of the completion of the S-READ are as follows: (a) NRBSTAT/success/failure code; (b) NRBIND/contains Connect Indication; (c) NRBLEN/length of incoming Pdata; and (d) NRBPROTL/length of Odata received.

The S-WRITE request is used to send data to a remote packet driver. It is used when a connection is fully established to send Odata and Pdata to the remote packet driver. When issued, the S-WRITE completes as soon as session has accepted responsibility for the data. The data will be delivered correctly and in order so long as the connection remains intact.

The parameters used in the data mover Network Request Block for the S-WRITE request are as follows:

NRBBUFA contains the buffer address of Pdata to be sent to the remote packet driver.

NRBLEN contains the length of the transmitted Pdata in addressable units. The length of data must be less than or equal to NRBBLKO.

NRBDMODE contains the Datamode to be used for the transmission of the Pdata.

NRBPROTA and NRBPROTL contain the address and number of octets of Odata to be sent to the remote packet driver.

The results of the completion of an S-WRITE are as follows: (a) NRBSTAT/success/failure code; and (b) NRBIND/set to zero.

S-CLOSE gracefully terminates a Session Connection. When either side of a connection determines that it has only one block or no more data to send, it may issue an S-CLOSE request. The S-CLOSE is a write type request and may have data associated with it, following the same rules as WRITE requests. After the CLOSE is issued, the issuer may not issue any more WRITE type requests except DISCONNECT. The issuer may continue to read data indefinitely. All pending written data is provided to the remote packet driver, in order of transmission. The last data item received will have a Close Indication associated with it. No further reads will be accepted for this connection. The remote packet driver may issue any number of WRITEs to the originating packet driver. When the remote packet driver has no more data to send, it issues a CLOSE (with optional data). At that time, the connection is terminated from the vantage point of the remote packet driver. The originating application will receive all data written by the remote packet driver in proper order. The last data received will contain a Close Indication. When the Close Indication is read, the connection is terminated from the viewpoint of the originating packet driver.

The parameters used in the Data Mover Network Request Block for the S-CLOSE request are as follows:

NRBBUFA contains the address of the last buffer of Pdata to be sent to the remote packet driver.

NRBLEN contains the length of the transmitted Pdata in addressable units. The length of data must be less than or equal to NRBBLKO.

NRBDMODE contains the Datamode to be used for the transmission of the Close Pdata.

NRBPROTA and NRBPROTL contain the address and number of octets of Odata to be sent to the remote packet driver.

The results of the completion of the S-CLOSE are as follows: (a) NRBSTAT/success/failure code; and (b) NRBIND/set to zero.

The S-DISCONNECT request aborts a Session Connection. When either side of the packet driver connection determines that the connection must be abruptly terminated, it may issue the S-DISCONNECT request. S-DISCONNECT is a preemptive service in that all reads, writes, and data buffers "in progress" are discarded. If the packet driver issues an S-DISCONNECT, then the S-READ request (if any) that is outstanding will terminate with an error in NRBSTAT. Any further attempts to issue requests against the connection will be rejected. The remote packet driver will continue to receive any data in progress until the remote packet driver's Session service detects the incoming Disconnect Indication. Any connection indications waiting to be delivered to the packet driver will be discarded. The next S-READ will complete with a Disconnect Indication, a normal status in NRBSTAT, and the Odata and Pdata supplied by the originator of the S-DISCONNECT. Disconnect service is different from other requests in that delivery of the Disconnect Odata and Pdata is not guaranteed. Such data may be lost in such a way that the local Session service cannot be sure if it was delivered or not. The S-DISCONNECT is valid at any time in the lifetime of the connection that a Write-type request (Confirm, Write, Close) may be issued. It is also valid following an S-CLOSE request. In that case data may not be sent to the remote packet driver but the connection will be terminated.

The parameters used in the Data Mover Network Request Block for the S-DISCONNECT request are as follows:

NRBBUFA contains the address of Pdata to be sent to the remote packet driver. Delivery of data is not guaranteed with Disconnect service.

NRBLEN contains the length of the transmitted Pdata in addressable units. The length of Pdata sent is limited to the minimum of the internal data mover buffer size and the maximum buffer size supported by the Network connection in use between the two Packet Drivers.

NRBDMODE contains the Datamode to be used for the transmission of the Disconnect Pdata.

NRBPROTA and NRBPROTL contain the address and number of octets of Odata to be sent to the remote packet driver.

The results of the completion of the S-DISCONNECT are: (a) NRBSTAT/success/failure code; and (b) NRBIND/set to zero.

Transport Layer Services.

The Transport Protocol contained in the data mover is used by the packet driver connections. The packet driver components interface with the data mover at the Session Layer. However, all Session Layer services internally make use of the services provided at the Transport Layer. Transport service is distinct from the Session Layer in that connections can only be made to other applications whose exact physical address on the network is known, and the application connected to must be present and soliciting input at the time. Transport service uses the lower Network service to establish connections on the network and to frame data for delivery on the network.

The data mover protocol is designed to function in environments where very long propagation delays, extremely high speeds, and high error rates are all concurrently encountered. Most conventional protocols do not function well in such an environment. In order to resolve the long delay and high error rate problem, the data mover Transport uses a "continuous" type of protocol—one in which only blocks received in error are retransmitted, rather than "backing up" to the point where the erroneous block was sent and sending all subsequent blocks. The data mover Transport uses a dual numbering scheme for blocks. There is a "physical block number" which is incremented by one each time Transport issues an N-CONNECT or N-WRITE request. In addition, there is a "logical block number" which is incremented by one each time the Transport application issues a write type Transport service request.

The primary functions to be performed by Transport are those of retransmission, flow control, and message segmenting. The data mover works under a wide variety of network configurations, but it is particularly well suited to operate effectively in high bandwidth networks over long distances; and over clean networks as well as over networks experiencing moderate to high rates of packet loss. To accomplish this, the data mover dynamically calculates round-trip times, bandwidth capacity, and rate control and in general is more adaptive to dynamic network conditions. Assuming there are adequate resources available on both the sending and receiving side, this protocol allows the data mover to be extremely efficient in bandwidth utilization. It is designed to operate in either a "closed network" environment, where maximizing usage of bandwidth is not an issue, or in an "open network" environment, where the protocol needs to be aware of co-usage of the network. The dynamic adaptive rate control mechanisms implemented in this protocol allows it to operate in this environment, and to co-exist with other applications.

A T-OFFER request allocates the resources so that an explicit path to the transport application (packet driver) through the lower network layers is established. At that time, the T-OFFER waits for a matching T-CONNECT request. T-CONNECT accepts an (optional) buffer of data to be sent to the OFFERing receiver, and a list of routes (addresses) that specify the network path or paths that may be used to contact the receiver. When the CONNECT data arrives at the receiver, it completes the OFFER and presents the connect data to the receiving packet driver. The receiving packet driver responds with a T-CONFIRM request which indicates the intent to complete the connection. If the connection is not desired, the receiver may issue T-DISCONNECT instead. T-CONFIRM may have data sent along with it. The connecting packet driver will receive the data with a T-READ request that completes with a Confirm Indication. After the connection is established, data transfer proceeds in a full duplex manner, with flow control, segmenting, and retransmission taking place concurrently in both directions. So long as the connection remains in effect, a T-WRITE request by one of the packet drivers will place the data in a transmission queue so that it will eventually satisfy a T-READ issued by the peer packet driver. When the connection is complete, either side may begin connection termination by and sending all subsequent blocks. The data mover Transport uses a dual numbering scheme for blocks. There is a "physical block number" which is incremented by one each time Transport issues an N-CONNECT or N-WRITE request. In addition, there is a "logical block number" which is incremented by one each time the Transport application issues a write type Transport service request.

The primary functions to be performed by Transport are those of retransmission, flow control, and message segmenting. The data mover works under a wide variety of network configurations, but it is particularly well suited to operate effectively in high bandwidth networks over long distances; and over clean networks as well as over networks experiencing moderate to high rates of packet loss. To accomplish this, the data mover dynamically calculates round-trip times, bandwidth capacity, and rate control and in general is more adaptive to dynamic network conditions. Assuming there are adequate resources available on both the sending and receiving side, this protocol allows the data mover to be extremely efficient in bandwidth utilization. It is designed to operate in either a "closed network" environment, where maximizing usage of bandwidth is not an issue, or in an "open network" environment, where the protocol needs to be aware of co-usage of the network. The dynamic adaptive rate control mechanisms implemented in this protocol allows it to operate in this environment, and to co-exist with other applications.

A T-OFFER request allocates the resources so that an explicit path to the transport application (packet driver) through the lower network layers is established. At that time, the T-OFFER waits for a matching T-CONNECT request. T-CONNECT accepts an (optional) buffer of data to be sent to the OFFERing receiver, and a list of routes (addresses) that specify the network path or paths that may be used to contact the receiver. When the CONNECT data arrives at the receiver, it completes the OFFER and presents the connect data to the receiving packet driver. The receiving packet driver responds with a T-CONFIRM request which indicates the intent to complete the connection. If the connection is not desired, the receiver may issue T-DISCONNECT instead. T-CONFIRM may have data sent along with it. The connecting packet driver will receive the data with a T-READ request that completes with a Confirm Indication. After the connection is established, data transfer proceeds in a full duplex manner, with flow control, segmenting, and retransmission taking place concurrently in both directions. So long as the connection remains in effect, a T-WRITE request by one of the packet drivers will place the data in a transmission queue so that it will eventually satisfy a T-READ issued by the peer packet driver. When the connection is complete, either side may begin connection termination by issuing a T-CLOSE request. T-CLOSE may have data associated with it. Following the first T-CLOSE, the issuing packet driver may not write any more data on that connection (except a T-DISCONNECT). The other side will receive the Close data with a Close Indication following the normal reception of all normally written data. It may write as much data to the originating connection as it chooses, but it will not be able to receive any more data from the originator. Connection termination completes when the second packet driver issues its own T-CLOSE request. The connection is terminated when the originating party receives the T-CLOSE request following the reception of all normal data preceding the CLOSE.

Transport also offers a T-DISCONNECT service for use in abruptly terminating a connection at any time. Either party may issue a T-DISCONNECT request. Data may be included with the T-DISCONNECT, but delivery of the data is not guaranteed. Disconnect is preemptive in that it will be presented to the receiver as soon as it arrives at the receiving side. Data controlled by transport, regardless of the direction in which it is sent, will be lost.

The foregoing embodiments of the TPO describe a method of forming data mover messages that include Transport Protocol data for the purpose of communicating with the peer-level Transport layer on the remote side of the TPO network.

Transport Dynamic Adjustments.

In order to dynamically make adjustments to the data mover protocol to meet the conditions of the network, periodic adjustments are made to rate control, latency time, and bandwidth capacity. Rate control is established by the sending side of the data mover matching the speed at which the remote packet driver, running on the remote TPO, is receiving the data. The rate at which the remote server application is receiving the data is returned in the TMSGRSPD value in the Transport Protocol Acknowledgement Subfield (820 in FIG. 7D). The latency time represents the additional time incurred for the act of transmitting data over a network. Longer network distances result in higher latency times. The latency times are determined by the sending side of the data mover, by calculating the round trip times for the transmission and acknowledgement of messages. The bandwidth capacity represents the total amount of data that can be on the network at any point in time. The data mover makes adjustments to its bandwidth capacity value by periodically calculating a new value as the values for "rate" and "latency time" change. The formula used for this calculation is: Capacity bandwidth (bits/sec)×round-trip time (sec).

Transport Timers and Timeouts.

Three time intervals are used by Transport Services to continuously monitor the state of the connection. They are:

Idletime. The time interval since the last message was sent to the remote packet driver. If IDLETIME increases to the point where it equals TMSGITO (805 in FIG. 7B) as last received from the remote packet driver, then an idle message must be sent to the remote Transport process.

Deadtime. The time interval since the last message of any description was received from the remote transport process. If this interval reaches a maximum time interval, TMSGTTO (806 in FIG. 7B) received from the remote side, then communications on the connection is assumed to be lost and another path will have to be retried.

Contime. An abbreviated version of DEADTIME that is used immediately after a new Network Connection (N-Connection) has been established. The new N-connection could take place either during Transport connection establishment or just after a new path has been selected due to loss of communications. It is the time interval since the N-CONNECT was issued. If a maximum time interval, CONTO (connect timeout), elapses with no response of any description returned in response to the Transport message sent with the N-CONNECT, then this path is assumed to be not functional and another path will be tried. The value of CONTO should be large enough to allow several attempts to send the connect message and receive a confirmation. The connect is attempted every IDLETO (idle timeout) until a response is received or CONTO is exceeded.

If either end of a Transport connection has its DEADTIME reach DEADTO (dead timeout), then it will conclude that communications are lost. Alternate Path Retry will then take place or the connection will be terminated.

Transport Connection Sequences.

Figure 8G:
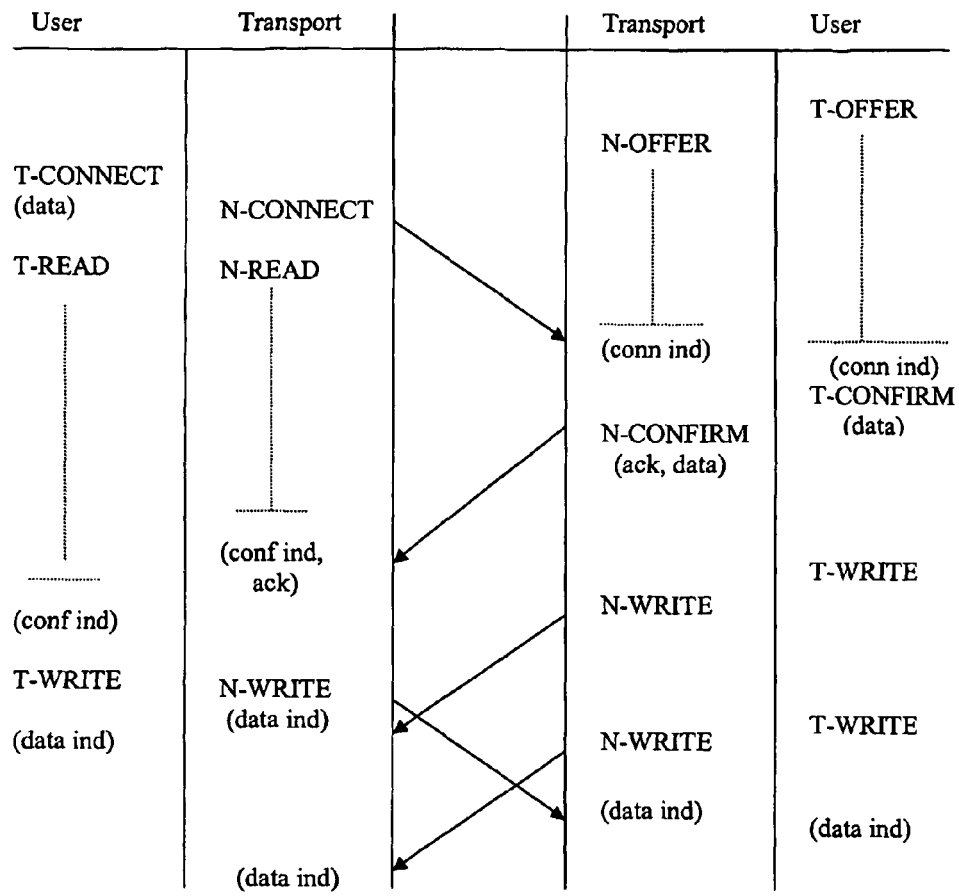
FIG. 8G is a diagram showing a data mover transport connection sequence.

FIG. 8G illustrates the data mover transport connection sequence. The Transport Connection process basically takes place in the T-OFFER-T-CONNECT-T-CONFIRM sequence. The "ack credit" field sent with the Connect protocol data will dictate if an Idle message will be sent by the offering side in response to receipt of a Connect Indication. If the Ack Credit is 0 or 1, an Idle message will be immediately returned. If it is 2 or higher, then it can be returned with the Confirm Information unless the offering packet driver takes more than IDLETO seconds to generate a T-CONFIRM response. The connection is "half duplex" until the T-CONFIRM is sent or the Confirm Indication is read. After that time, T-WRITEs may overlap in any way on a full duplex connection.

Connection Timeout and Alternate Path Retry.

One of the capabilities provided by the Transport Service is the ability to divert traffic over a totally independent Network connection without causing a loss of service to the Transport user. If Transport detects that all communications have ceased on the existing Network connection, it will N-Disconnect the failing connection and attempt to N-Connect using the next PAM (Physical Address Map) provided in that list of PAM's passed to Transport at T-Connect time. If the N-Connection succeeds, then the transport connection will continue as normal. If it does not, then all PAM's in the list will be tried until the end is reached. If the last entry fails, then the Transport user will receive a Disconnect Indication indicating that the connection has been lost.

Alternate path retry is basically the responsibility of the Transport entity that first initiated the connection by accepting a T-CONNECT request from the packet driver. It is the responsibility of the connecting side to try all possible Network connections to the destination Transport process. It is the responsibility of the other (offering) side to simply wait until sufficient time has elapsed for all paths to be tried, or until input arrives from the connecting side.

The explicit actions taken by alternate path retry on the offering side and the connecting side are:

Offering Side.

If a transport process originally began with a T-OFFER, it will continue to transmit Idle messages every IDLETO seconds (if it is not sending data messages), and will not take other action until TMSGTTO (FIG. 7B, 806) seconds expire with no response of any type from the destination side. At that point, the connection has been lost; the Transport Service informs its local packet driver of the loss with a 2400 NRB-STAT error code. If a Network message containing a Connect Indication does arrive during that time, it considers retry to have succeeded. It then sends a Transport message (either an Idle or some data) using the N-CONFIRM service. Transport will continue to send N-CONFIRM responses until a message with a normal Data Indication arrives. At that point, it will N-WRITE all subsequent Transport messages.

Connecting Side.

The initiating Transport service will continue to send Idle messages every received TMSGITO (FIG. 7B, 805) seconds and will not take action until DEADTO seconds have elapsed with no response whatsoever from the destination Transport Service. Then Transport will N-DISCONNECT the original Network path and N-CONNECT on the next PAM entry. The N-CONNECT data will contain a Transport Idle message or possibly Transport Data. Once the new path is selected, the Transport process will continue to try this new path for CONTO seconds, sending Idle messages with an N-CONNECT request every IDLETO seconds. During this whole time, it leaves an N-READ outstanding. If data arrives with a Network Confirm Indication within CONTO seconds, it considers the new path to be good. If no data is received from this new path within CONTO seconds, then the next path in the list of PAM's is selected. Once again an N-DISCONNECT and a new N-CONNECT is issued and the Transport service waits CONTO seconds for the connection to complete. Transport will continue to try new paths until all paths in the PAM list originally provided with the T-CONNECT have been tried with no response whatsoever from the destination side. Transport is able to "wrap around" a PAM list and retry earlier paths in the list if successful alternate path retry took place earlier in the history of the connection.

Figure 8H:
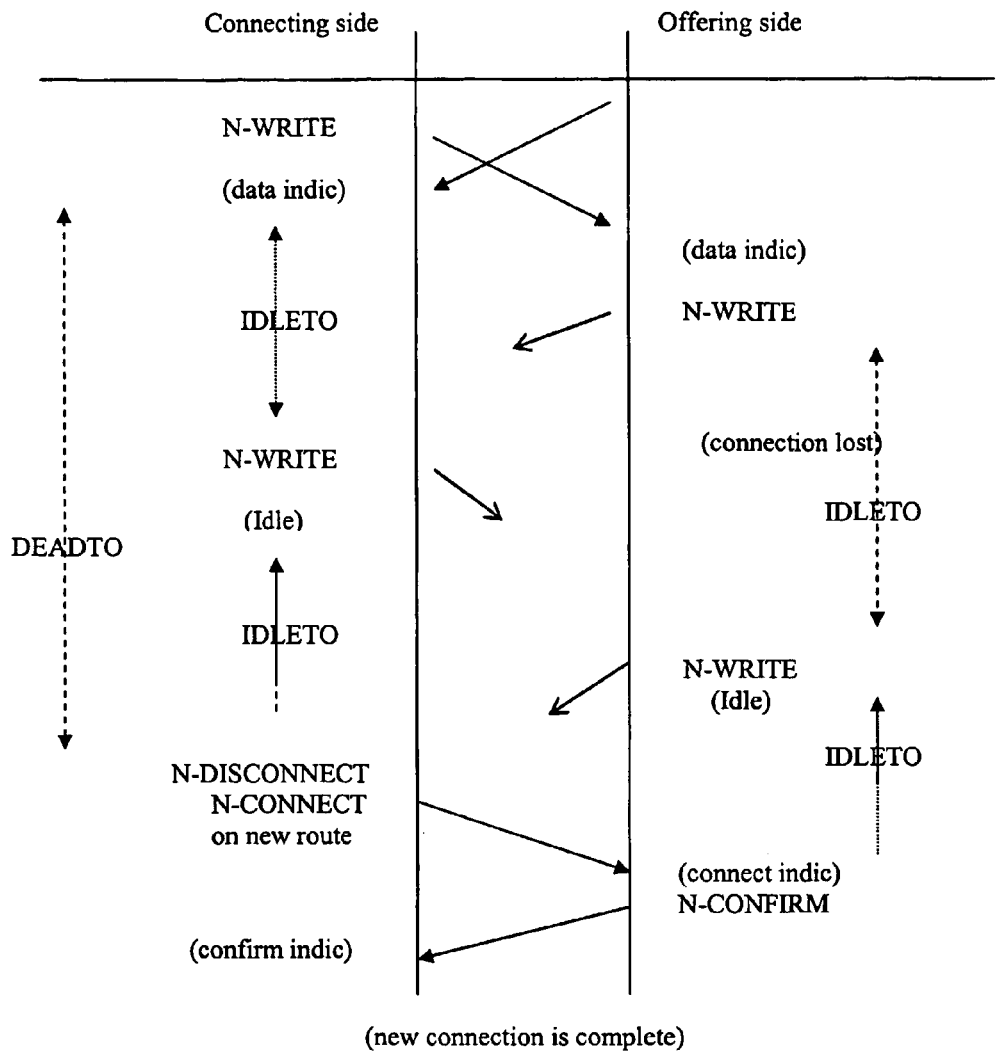
FIG. 8H is a diagram showing a data mover transport reconnection sequence.

FIG. 8H illustrates the connection re-establishment sequence that occurs after a network outage. Both sides lose proper connection at about the same time. The offering side is prepared to receive a new connection at any time. The connecting side waits DEADTO seconds for a response, then tries a connection on a new Network path.

Message Size Negotiation.

It is the responsibility of the Transport service to determine the maximum size of data that should be sent over the network at any one time. Most of these functions are performed by the Network service.

There are four factors that determine the maximum amount of data that may be sent with any single transmission initiated by the Transport service. They are: (a) any physical limitations on size posed by the network media; (b) the maximum amount of data acceptable by the destination Network service; (c) the maximum amount of data acceptable by the local Network service; and (d) the "voluntary" declaration of transmission input and output maximums by the Transport packet drivers.

Although the Network service will determine the actual maximum sizes that may be transmitted based on these four factors, it is the responsibility of the Transport service to observe these size limitations and segment the data accordingly. When the connection is first being established (T-CONNECT and T-CONFIRM requests are being serviced), the amount of data is limited to what can fit in a single Network Write request; after that point, data sent with T-WRITE and T-CLOSE requests must be segmented by the Transport Service and reconstructed on the destination side.

Segmentation of User Data.

There is no inherent limit on the amount of data that a Transport user may send and receive with a single request. It is the responsibility of the Transport service to break a large buffer into several "segments" that are suitable for transmission over the media controlled by the Network Service. To accomplish this, the data is broken into "segments", each of which is small enough to be delivered by the Network service. Each segment contains a new, incrementing Logical Block Number as discussed earlier. The last segment of a buffer contains an "end" flag which indicates that the buffer is to be delivered to the user. When all segments have arrived, they are presented to the destination packet driver. Segmentation of data is only supported with the WRITE and CLOSE services. Data sent with CONNECT, CONFIRM, and DISCONNECT requests must be smaller than or equal to the maximum block size determined by the Network service. Segmentation applies only to the Pdata provided by the Transport user; Odata is not segmented.

Transport Close Facility.

Either party of a connection may issue a T-CLOSE request at any time that a T-WRITE is valid. Once a T-CLOSE is issued to the local data mover, only a T-READ or T-DISCONNECT may be issued. The data provided with a T-CLOSE may be of indefinite length, just like the T-WRITE; thus the Transport Service must perform block segmenting on a T-CLOSE request.

When it is the appropriate time to present the block of data written with the T-CLOSE to the destination packet driver, it is presented with a Close Indication in the data mover NRB. At that time, the destination packet driver knows that it will receive no further data (with the possible exception of a Disconnect Indication) from the packet driver that originally issued the T-CLOSE. The destination packet driver continues to leave a T-READ outstanding in the event that a Disconnect Indication may need to be presented.

After the Close Indication is received, then the destination packet driver may continue to T-WRITE blocks of data to the packet driver that sent the T-CLOSE indefinitely. The T-CLOSE transmitter will continue to issue T-READ requests to accept the data. When the T-CLOSE destination has reached the point of sending all relevant data to the transmitter, it will issue a T-CLOSE of its own, which may contain data in the same manner as the previous T-WRITEs. When the T-CLOSE is marked complete, then the connection is terminated from the destination's point of view. If a T-READ is outstanding at the time that the second T-CLOSE is issued by the destination, then it will terminate with no indication in NRBIND, 0 status in NRBSTAT, and no data received.

When the side that transmitted the original T-CLOSE receives a Close Indication, then the connection is fully closed from its vantage point. No other requests against that connection, including a T-DISCONNECT, will be accepted.

T-CONNECT.

The T-CONNECT request is used to establish a transport connection. It initiates the establishment of a connection to another destination Transport application (packet driver) that has issued a T-OFFER request. When invoked, Transport service will establish a Network connection to the destination TPO and send it messages to establish the connection. It will send information that will allow data to flow in an orderly, full duplex manner between the sending and receiving packet drivers.

When the T-CONNECT is issued, the packet driver specifies two buffer lengths and addresses—one for Pdata and one for Odata. The Odata is always sent and received in the "octet" (8 bit byte) format. The maximum amount of Odata that may be sent is dependent on values generated during system generation on both the local and destination copies of the data mover.

The parameters used in the data mover Network Request Block for the T-CONNECT request are as follows:

NRBBUFA specifies the address of the Pdata that is to be sent to the offering packet driver.

NRBLEN specifies the length of the Pdata (in addressable units) that is to be sent with the T-CONNECT request. The amount of Pdata that may be sent with a T-CONNECT request is limited; in general, the length of the data can be no greater than the maximum data size supported by the Network level connection.

NRBDMODE specifies the Datamode to be used on the Pdata during transfer.

NRBPROTA and NRBPROTL specify the length and address of the Odata to be sent to the offering packet driver. Buffers of Odata must always be provided by the application. The size of Odata is limited to the maximum data size supported by the Network connection.

NRBNREF contains the N-ref that is associated with the Network connection on this TPO unit. An explicit N-ref must be requested; if the one requested is already in use, then the connection request will be rejected. The destination application must supply the same N-ref in the NRBNREF field of its T-OFFER request.

NRBMXRAT is a value that may be specified by the user to limit the rate at which data is introduced to the network. Values in this field are in 1000's of bits per second. If this value is set to zero when the T-CONNECT is issued, then the maximum transmission rate possible with the active route will be used. When the T-CONNECT completes, NRBMXRAT will contain the transmission speed limit in 1000's of bits per second. If Transport service finds that another route must be used because of a communications failure on the first, then NRBMAT will be changed to reflect the speed limit on the new route. The Transport application will receive no other notification of the change of route.

NRBBLKO and NRBBLKI can be used to specify the maximum Pdata sizes that are acceptable to the packet driver for output and input, respectively. They will be sent to the offering packet driver, which may also provide values for these fields in the T-OFFER request. When the T-OFFER completes, or the connecting packet driver has the T-READ complete which reads the Offeror's T-CONFIRM, then these fields will contain the minimum of the two sizes specified by the two sides. Once these values are negotiated, the data mover will not permit a block of Pdata greater than this maximum to be transmitted on the network. The data mover also uses this upper limit on transmission size to improve connection and buffer management. Two default values are available for these fields. If a zero is specified in either one of these fields, then an installation defined default will be used. If a −1 is contained in this field, then the maximum size allowable by this installation will be used.

NRBCONN1 contains a list of PAM's that represent possible routes to the same host. Transport will attempt to establish and use an N-connection for the first of the entries in this list. If loss of communication is detected during the connection or at any later time in the lifetime of the connection, then Transport will establish another N-connection with the next PAM in the list and attempt to continue the connection. This switching of N-connections will take place without affecting the packet driver component. If the entire list of PAM's is tried and none of the paths result in the re-establishment of communications, then the T-connection will fail with a Disconnect Indication. NRBCONN1 itself contains an address pointing to the start of a PAM list. The format of this PAM list is illustrated in FIG. 6C; the format of a PAM list entry is illustrated in FIG. 6D; the format of a PAM route is illustrated in FIG. 6E. The entire PAM list is in octet format. The first two octets 720 contain the length of the PAM list, including the length field. The third octet 721 contains the number of individual PAM's in the PAM list. Following that are the individual PAM's, 722 packed together so that adding an individual PAM length to its start will generate the address of the next individual PAM.

NRBCONN2 contains the N-ref that the destination, offering Transport application (packet driver) has requested in its NRBNREF when the T-OFFER was issued. The packet driver knows this value through the use of Session services.

The results of the completion of the T-CONNECT are: (a) NRBSTAT/success/failure code; (b) NRBIND/set to zero; (c) NRBBLKO/maximum transmission Pdata size; (d) NRBBLKI/maximum reception Pdata size; and (e) NRBMXRAT/maximum transmission speed of path.

T-OFFER.

The T-OFFER request is used solicit and incoming Transport connection. It does this by a process that wants to establish a "passive" connection—to wait for another or "active" party to request that the connection be completed. It is a read-type request in the sense that it remains outstanding until an incoming T-connect indication arrives, and that data sent by the destination T-CONNECT will be used to fill buffers specified by the T-OFFER.

The parameters used in the data mover network request block for the T-OFFER request are as follows:

NRBBUFA contains the address of the buffer to be used to store the Pdata with the incoming T-CONNECT.

NRBBUFL contains the length of the buffer provided to receive the incoming Pdata. If the data that arrives exceeds this length, then the buffer will be filled up to NRBBUFL, NRBLEN will contain the amount of data that could have been received, and NRBSTAT will contain an error indicating that Pdata was truncated.

NRBPROTA and NRBPROTL contain the address and length of a buffer to hold the incoming Odata. As with Pdata, only NRBPROTL octets of data will be placed in the buffer if a greater amount of information arrives. When the T-OFFER completes successfully, NRBPROTL will contain the number of octets of Odata actually received.

NRBTIME contains the time interval that the T-OFFER is to remain outstanding. If this period of time elapses and no successful T-connection is made to satisfy, then the T-OFFER will terminate with an error code in NRBSTAT. The value in NRBTIME is measured in seconds.

NRBNREF contains the N-ref that is to be used for this transport connection. The application issuing the T-CONNECT will have to supply a matching N-ref in its NRBNREF. If the N-ref requested is already in use, then the request will be aborted with an error in NRBSTAT.

NRBBLKO and NRBBLKI contain the maximum size block that the Transport packet driver application wishes to send with a single write or read-type request, respectively. When the T-OFFER completes with the connect information, these fields will contain the minimum of the two values specified by the offering and connecting packet drivers. Attempts to transmit more data than the maximum in NRBBLKO will be rejected as an error. Two default values are available for these fields. If a zero is specified in either one of these fields, then an installation defined default will be used. If a −1 is contained in this field, then the maximum size allowable by this installation will be used.

NRBMXRAT contains the fastest data rate that may be used for transmission from the offering packet driver. If this field is set to zero when the T-OFFER is issued, then it will contain the maximum rate that can be supported by the communications path in use when the connection is established. If a nonzero value is provided, then completion will result in the minimum of the user specified and communications link speeds. This rate specified only applies to transmission; the connecting end of the connection has its own NRBMXRAT that may be used to limit transmission speed in the other direction.

NRBCONN1 specifies the address of a buffer that will hold the incoming PAM. This PAM will be the one that first established successful communications between the two Transport facilities.

NRBCONN2 contains the N-ref used by the destination TPO unit whose T-CONNECT will cause this offer to complete. If a Connect Indication specifying the proper local N-ref arrives which does not contain the proper destination N-ref, then the incoming message will be ignored. If a zero is specified in NRBCONN2, then any destination N-ref will be acceptable. In that case, NRBCONN2 will contain the destination N-ref when the T-OFFER completes.

The results of the completion of the T-OFFER are: (a) NRBSTAT/success/failure code; (b) NRBIND/contains Connect Indication; (c) NRBLEN/length of incoming Pdata; (d) NRBPROTL/length of Odata received; (e) NRBNREF/N-ref assigned to this connection; (f) NRBBLKO/maximum transmission Pdata size; (g) NRBBLKI/maximum reception Pdata size; (g) NRBMXRAT/maximum transmission speed of path; (h) NRBCONN1/first PAM used to connect; and (i) NRBCONN2/connector's N-ref.

T-CONFIRM.

T-CONFIRM is issued to complete the transport connection. The offering Packet driver does this in response to a successfully completed T-OFFER. It signals the intent of the offering packet driver to go ahead with the connection, and to have data sent back to the originating packet driver. Either T-CONFIRM or T-DISCONNECT must be issued in response to a successful T-OFFER; any other request will be rejected. A T-CONFIRM is not valid at any time other than immediately after the T-OFFER. T-CONFIRM is a write type command and both Odata and Pdata may be sent back to the originating packet driver.

The parameters used in the data mover Network Request Block for the T-CONFIRM request are as follows:
   NRBBUFA contains the address of Pdata to be returned to the originating packet driver.
   NRBLEN contains the length of the transmitted Pdata in addressable units. The length of data must be less than or equal to NRBBLKO.
   NRBDMODE contains the Datamode to be used for the transmission of the Confirm Pdata.
   NRBPROTA and NRBPROTL contain the address and number of octets of Odata to be sent to the originating packet driver.
   NRBBLKO is ignored when the T-CONFIRM request is issued.

The results of the T-CONFIRM completion are: (a) NRBSTAT/success/failure code; (b) NRBIND/set to zero; (c) NRBBLKO/maximum transmission size for connection; (d) NRBBLKI/maximum received size for connection.

T-READ.

The T-READ is a request that solicits an indication data or for a connection status Indication. It does this by informing the data mover that the packet driver is ready to process additional input from a Transport connection. In general, such input will be a Data Indication of some type, indicating that data has arrived from the destination packet driver. However, it can also be a Disconnect Indication indicating that the connection has been lost. One of the purposes of the T-READ is to allow the application to accept incoming data at a constrained rate; however, it is essential that a T-READ be issued to service incoming data on a timely basis. The data mover Transport service places a time interval limit (read timeout, referred to as READTO) which causes a connection to be terminated if no T-READ is issued to receive an incoming indication within READTO seconds of elapsed time. In addition to Odata and Pdata, the T-READ request will complete with an "indication" in NRBIND, which indicates the type of Transport request that was issued to send this data. A Confirm, Data, Close, or Disconnect indication may be received along with its associated Odata and Pdata.

The parameters used in the Data Mover Network Request Block for the T-READ request are as follows:
   NRBBUFA contains the address of the buffer that will hold the incoming Pdata.
   NRBBUFL is used to specify the maximum length of the buffer to hold Pdata.
   NRBPROTA and NRBPROTL are used to specify a buffer for incoming Odata. If more than NRBPROTL octets of data arrive, the Odata will be truncated, NRBSTAT will contain an error, and NRBPROTL will contain the length that could have been received.
   NRBTIME specifies the maximum length of elapsed time that the T-READ is to remain outstanding. If this interval passes and there is no indication to give to the packet driver, then the T-READ completes with an error code in NRBSTAT. The connection is not terminated; subsequent T-READ's and T-WRITE's may be issued at any time. If zero is present in this field, the read will remain outstanding indefinitely. The value of this field is in seconds.

The results of the T-READ completion are: (a) NRBSTAT/success or failure code; (b) NRBIND/contains Connect Indication; (c) NRBLEN/length of incoming Pdata; and (d) NRBPROTL/length of Odata received.

T-WRITE

The T-WRITE request is used to send data to the destination packet driver. It is used when a connection is fully established to send Odata and Pdata to the destination packet driver. When issued, the T-WRITE completes as soon as transport has accepted responsibility for the data. The data will be delivered correctly and in order as long as the connection remains intact.

The parameters used in the Data Mover Network Request Block for the T-WRITE request are as follows:
   NRBBUFA contains the address of Pdata to be returned to the originating packet driver.
   NRBLEN contains the length of the transmitted Pdata in addressable units. The length of data must be less than or equal to NRBBLKO.
   NRBDMODE contains the Datamode to be used for the transmission of the Pdata.
   NRBPROTA and NRBPROTL contain the address and number of octets of Odata to be sent to the destination packet driver.

The results of the completion of T-WRITE are: (a) NRBSTAT/success or failure code; and (b) NRBIND/set to zero.

T-CLOSE

When either side of a connection determines that it has only one block or no more data to send, it may gracefully terminate a Transport Connection. To do this it issues a T-CLOSE request. The T-CLOSE is a write type request and may have data associated with it. The T-CLOSE follows the same rules as WRITE requests. After the CLOSE is issued, the issuer may not issue any more WRITE type requests except DISCONNECT. The issuer may continue to read data indefinitely.

All pending written data is provided to the destination packet driver in order of transmission. The last data item received will have a Close Indication associated with it. No further reads will be accepted for this connection. The destination packet driver may issue any number of WRITEs to the originating packet driver. When the destination packet driver has no more data to send, it issues a CLOSE (with optional data). At that time, the connection is terminated from the vantage point of the destination packet driver. The originating packet driver will receive all data written by the destination packet driver in proper order. The last data received will contain a Close Indication. When the Close Indication is read, the connection is terminated from the viewpoint of the originating packet driver.

The parameters used in the data mover Network Request Block for the T-CLOSE request are as follows:
   NRBBUFA contains the address of Pdata to be returned to the originating packet driver.
   NRBLEN contains the length of the transmitted Pdata in addressable units. The length of data must be less than or equal to NRBBLKO.
   NRBDMODE contains the Datamode to be used for the transmission of the Close Pdata.
   NRBPROTA and NRBPROTL contain the address and number of octets of Odata to be sent to the destination packet driver.

The results of completion of a T-CLOSE are: (a) NRBSTAT/success or failure code; and (b) NRBIND/set to zero.

T-DISCONNECT

When either side of the connection determines that the transport connection must be abruptly aborted, it may issue the T-DISCONNECT request. The T-DISCONNECT is a preemptive service in that all reads, writes, and data buffers in progress are discarded. If a packet driver issues a T-DISCONNECT, then the T-READ request (if any) that is outstanding will terminate with an error in NRBSTAT. Any further attempts to issue requests against the connection will be rejected. The destination packet driver will continue to receive any data in progress until the destination packet driver's Transport service detects the incoming Disconnect Indication. Any connection indications waiting to be delivered to the packet driver will be discarded; the next T-READ will complete with a Disconnect Indication, a normal status in NRBSTAT, and the Odata and Pdata supplied by the originator of the T-DISCONNECT. Disconnect service is different from other requests in that delivery of the Disconnect Odata and Pdata is NOT guaranteed. Such data may be lost in such a way that the local Transport service cannot be sure if it was delivered or not. The T-DISCONNECT is valid at any time in the lifetime of the connection that a Write-type request (Confirm, Write, Close) may be issued. It is also valid following a T-CLOSE request. In all cases data may not be sent to the destination packet driver but the connection will be terminated.

The parameters used in the data mover Network Request Block for the T-DISCONNECT request are as follows:
  NRBBUFA contains the address of Pdata to be returned to the originating packet driver.
  NRBLEN contains the length of the transmitted Pdata in addressable units. The length of Pdata sent is limited to the minimum of the internal data mover buffer size and the maximum buffer size supported by the Network connection in use between the two packet drivers.
  NRBDMODE contains the Datamode to be used for the transmission of the Disconnect Pdata.
  NRBPROTA and NRBPROTL contain the address and number of octets of Odata to be sent to the destination packet driver.

The results of the completion of a T-DISCONNECT: (a) NRBSTAT/success or failure code; and (b) NRBIND/set to zero.

Network Layer Services

The Network service interface is designed to supply a means of transmitting datagrams over any Internet Protocol (IP) media. It is responsible for establishing a communication path between two TPOs, constructing the messages that are needed to send data between them, and remove routing information before presenting incoming data to the Network caller. The network layer also performs all the multiplexing for the TPOs—the process of sorting out incoming messages by unique identifier (N-ref), and passing the information to the Network caller (i.e. Transport level).

The Network Layer interfaces with the Driver Layer, which subsequently interfaces with the IP stack by issuing UDP socket calls. Network service includes connection negotiation parameters, as well as a Read/Write and a Disconnect facility. Network service is distinguished from the higher layers of communications software in that it is simply a delivery facility for "datagrams" and makes no promises of successful delivery of any data.

The function of the network level protocols is to package a read or write type request containing Pdata and Odata into one or more network messages. In addition, it issues the messages required to establish a point to point connection between two TPO units.

The Network user packet driver issues an N-OFFER or N-CONNECT, depending on whether it is the requester or server in a connection. The N-OFFER packet driver supplies data buffers to hold incoming data sent with the connecting packet driver's N-CONNECT. The N-CONNECTing packet driver may specify data to be delivered to the OFFERing packet driver. The N-CONNECT caller provides a data structure (the Physical Address Map, refer to FIGS. 6C, 6D, and 6E) containing the particulars of the route to be followed to reach the OFFERing packet driver. The Network layer issues whichever Driver network messages are needed to establish the N-connection and analyzes their response (if any). The Network layer then transmits the data provided.

When the N-OFFERing side receives an N-CONNECT indication, it responds with an N-CONFIRM request that completes the connection. This CONFIRM request may contain data that can be read by the connecting side.

An N-WRITE request results in the construction of a network message that is sent along the path established by the N-CONNECT. The Network caller only provides the data to be delivered; the packaging of the data into network messages is handled by the Network Layer. An N-WRITE request completes as soon as it is signaled complete by the Driver Layer. Errors detected by the driver will be reported as equivalent Network errors. Data delivery by the Network layer is not guaranteed; Network completes responsibility for transmissions as soon as it leaves the local network interface.

An N-READ request is a request to accept data issued by a matching N-WRITE. Upon completion of the N-READ, buffers will be filled with the data provided by the N-WRITE caller.

An N-DISCONNECT will cause the network resources acquired to maintain the connection to be freed. Any pending messages in the network will be lost. No indication is provided to the Network user on the other side—it is assumed that the corresponding packet driver will issue its own N-DISCONNECT.

The embodiments of the TPO therefore contains a method of forming TPO messages that include Network Protocol data for the purpose of communicating with the peer-level Network layer on the destination side of the TPO network.

N-CONNECT

The N-CONNECT request is used to establish a Network Connection path to another TPO, in other words, to a process that has issued a corresponding N-OFFER request. Network service will issue whatever protocol messages are needed to establish the paths needed to communicate between the two TPOs. When the path is established, it delivers the data provided by the packet driver to the destination packet driver, and the Network connection is then fully established.

The parameters used in the Data Mover Network Request Block for the N-CONNECT request are as follows:
  NRBBUFA specifies the address of the Pdata that is to be sent to the offering side.
  NRBBUFL specifies the length of the Pdata (in addressable units) that is to be sent with the N-CONNECT request. The amount of Pdata that may be sent with an N-CONNECT request is limited; in general, the length of the data can be no greater than the maximum data size supported by the Network level connection.
  NRBDMODE specifies the Datamode to be used on the Pdata during transfer.
  NRBPROTA and NRBPROTL specify the length and address of the Odata to be sent to the offering packet driver. Buffers of Odata must always be provided by the packet driver. The size of Odata is limited to the maximum size of Data transmission that is supported by the Network connection in use.
  NRBNREF contains the N-ref that is to be associated with the Network connection that is to be used by Transport service on this host. An explicit N-ref must be requested. If the one requested is already in use, then the connection request will be rejected. The destination Packet Driver must supply the same N-ref in the NRBNREF field of its T-OFFER request.

NRBBLKO and NRBBLKI can be used to specify the maximum Pdata sizes that are acceptable to the packet driver for output and input, respectively. They will be sent to the offering packet driver, which may also provide values for these fields in the N-OFFER request. When the N-OFFER completes, or the connecting side has the N-READ complete which reads the Offeror's N-CONFIRM, then these fields will contain the minimum of the two sizes specified by the two sides. Once these values are negotiated, the data mover will not permit a block of Pdata greater than this maximum to be transmitted on the network. The data mover also uses this upper limit on transmission size to improve connection and buffer management. Two default values are available for these fields. If a zero is specified in either one of these fields, then an installation defined default will be used. If a −1 is contained in this field, then the maximum size allowable by this installation will be used.

NRBCONN1 contains the address of a PAM that represents a physical route to the destination TPO unit. Transport will attempt to establish and use an N-connection for the first of the entries in this list.

NRBCONN2 contains the N-ref that the destination, offering Network application (packet driver) has requested in its NRBNREF when the N-OFFER was issued. The packet driver knows this value through the use of Session services.

The connecting Network level user may specify two buffers of data to be sent to the destination application. Odata is intended for protocol use and should be 256 octets or less in length.

A field in the NRBREQ word specifies if control should be returned to the caller as soon as any required message transmission is begun, or if control is to be returned only after the connect is complete.

The address of the process on the network that it is to be connected to is provided in NRBCONN1. The NRBCONN1 field is the address of a data structure provided by the Network user called the "Physical Address Map" or PAM. This PAM is a description of all the physical paths to be followed to reach the desired destination, as well as the characteristics of the nodes and links between the two hosts.

The Network connection is matched with a specific other N-connection through the use of two N-ref (connection identifier) fields. Each of these two fields is sixteen bits in length. Both the connecting parties place the connection identifier N-ref of their own local process in the NRBNREF field of the NRB. They place the N-ref of the destination side in the NRBCONN2 field of the NRB. Normally for the connection to take place, both sides must specify a matching, complementary pair of N-ref's. The side issuing the N-OFFER has the option of specifying a zero in NRBCONN2, which implies that an N-Connect with any incoming destination N-ref is acceptable. In that case, the N-ref received will be placed in NRBCONN2 when the request completes. The value of the local connection N-ref in NRBNREF must be unique within the entire local data mover.

Two fields are used to inform the Network layer of the maximum amounts of Odata and Pdata that are to be used to send and receive data in this connection. These limits are dependent on many things: the buffer capacities generated in both the local and destination copies of the data mover, and the physical limitations of the media connecting the two TPO units. When a following N-READ completes with a Confirm Indication, then these fields will have the actual limits for Odata and Pdata size in the connection sent to them. The Network Service will return the maximum that is available if the caller's size request is not available. It is then the responsibility of the caller to scale its buffer sizes downward accordingly.

The maximum size of Pdata is specified in addressable units; the maximum amount of Odata is specified in octets.

When invoked by an N-CONNECT, the Network layer will issue whatever lower level messages and functions are needed to establish a communication path through the intermediate nodes specified by the PAM. Once a clear path to the destination TPO unit exists, it will transmit the Pdata, Odata, and PAM provided by the user to the destination TPO unit. The N-CONNECT completes as soon as this data transmission completes locally. Delivery of the connect data is not guaranteed. To determine successful delivery of the connect data, network applications should specify a timeout on the first N-READ following the N-CONNECT to verify that the Network application on the destination TPO unit has sent a response within a reasonable time. If no such response is received, then the local Network application should issue an N-DISCONNECT to free the connection resources followed by another N-CONNECT to the same destination. This process may continue until it is reasonably certain that the destination TPO unit or an intermediate node is "down" or does not have a matching N-OFFER request.

On completion, NRBMXRAT will contain the maximum data transmission rate that can be sustained through the connection. Generally this will be the speed of the slowest link. The speed is expressed in 1000's of bits per second.

The results of completion from an N-CONNECT are: (a) NRBSTAT/success or failure code; (b) NRBIND/set to zero; and (c) NRBMXRAT/maximum transmission speed of path.

N-OFFER

The N-OFFER request solicits an incoming N-Connection. It results in the allocation of device resources needed to take part in an N-connection and causes the appropriate device driver to wait for incoming data. An N-OFFER completes when an N-CONNECT request from another TPO unit arrives or the N-OFFER request times out. Initiation of an N-OFFER request begins with the caller providing two buffers for input—a feature that will be continued in the higher data mover layers. If the length of either or both of the buffers specified is zero, then incoming data for that buffer type will be discarded and NRBSTAT will contain an error code reflecting the loss of data.

The parameters used in the data mover Network Request Block for the N-OFFER request are as follows:

NRBNREF specifies local N-ref of the side issuing this connection. The destination side must provide an identical value in NRBCONN2 of the T-CONNECT request in order for a "match" to occur during the connection. Mechanisms outside of the network protocol must be used to agree on a suitable N-ref before the connection is established.

NRBTIME contains the number of seconds the N-OFFER is to remain in effect. If that real time interval elapses and no N-CONNECT message has been successfully received, then the N-OFFER will complete with an error in NRBSTAT indicating that the offer has timed out.

NRBBLKO and NRBBLKI fields are used to inform the Network layer of the maximum amounts of Odata and Pdata that are to be used to send and receive data on this connection. These limits are dependent on many things: the buffer capacities generated in both the local and destination copies of the data mover and the physical limitations of the media connecting the two TPO units. When this N-OFFER completes with a Connect Indication, then these fields will have the actual limits for Odata and Pdata size in the connection sent to them. Unlike other layers of data mover service, the Network Service will return the maximum that is available if the caller's size request is not available. It is then the responsibility of the caller to scale its buffer sizes downward accordingly. The maximum size of Pdata is specified in addressable units; the maximum amount of Odata is specified in octets.

NRBIND will, when the N-OFFER successfully completes, contain the code for a Connect Indication to indicate the incoming event.

NRBBUFA will point to the incoming Pdata. The Datamode of the incoming Pdata will have been placed in NRBDMODE.

NRBMXRAT, on completion, will contain the maximum data transmission rate that can be sustained through the connection. Generally this will be the speed of the slowest link. The speed is expressed in 1000's of bits per second.

NRBBLKO contains the maximum amount of Pdata that may be sent or received on this Network connection. It is specified in addressable units.

NRBBLKI contains the maximum amount of Odata that may be sent or received on this Network connection. It is specified in octets.

NRBCONN1: On completion of the N-OFFER, the buffer pointed to by NRBCONN1 will contain the Physical Address Map used by the connecting process to complete the N-OFFER. This Physical Address Map is a complete description of a network path that will allow communications to take place between both sides of the connection. The Network layer will already have processed this incoming addressing information so that it will automatically return any subsequent N-WRITE's on this connection back to the originating side. This incoming PAM may be examined by the OFFERing application to determine the identity of the party that is contacting it. The size of this buffer should be 64 octets.

NRBCONN2 will contain the N-ref that will be used by the destination side. This value contains the value that the destination side specified in the NRBNREF field of its T-CONNECT. If a zero is specified in this field by the N-OFFER, then the first incoming N-CONNECT that specifies the correct local N-ref specified in NRBNREF will cause the N-OFFER to complete. In that case, the destination side's N-ref will be supplied in NRBCONN2.

The results of the completion of an N-OFFER are: (a) NRBSTAT/success or failure code; (b) NRBIND/has Connect Indication; (c) NRBLEN/length of Pdata received; (d) NRBDMODE/-datamode of Pdata received; (e) NRBMXRAT/maximum transmission speed of path; (f) NRBBLKO/maximum send/receive Pdata size; (g) NRBBLKI/ maximum send/receive Odata size; (h) NRBPROTL/length of Odata received; (i) NRBCONN1/PAM information from connector; and (j) NRBCONN2/incoming N-ref from destination TPO unit.

N-CONFIRM

Whenever an N-OFFER or N-READ has been successfully completed and so indicated by a Connect Indication, the Network Connection must be completed. The N-CONFIRM request is issued to accomplish completion of the network connection. The N-Confirm request is very similar to the Write request. If the local Network caller does not wish to communicate with the connecting side, then it may issue an N-DISCONNECT to avoid further conversation with that side. Note that whenever data is read, a Connect Indication may arrive. Generally, this will be due to the fact that the other side detected a complete failure in the path between the two TPO units and issued another N-CONNECT over a different route. The party receiving the Connect Indication must respond with an N-CONFIRM before proceeding.

The parameters used in the data mover Network Request Block for the N-CONFIRM request are as follows:

N-CONFIRM is supplied with two data buffers, as with an N-CONNECT.

NRBBUFA, NRBLEN, and NRBDMODE specify the Pdata.

NRBPROTA and NRBPROTL specify the Odata to be sent.

The Network layer will construct a message or messages to be introduced on the network and will transmit them. The request is complete when all data associated with the N-CONFIRM has been successfully sent on the network.

The results of completion of N-CONFIRM are: (a) NRBSTAT/success or failure code; and (b) NRBIND/set to zero.

N-WRITE

After a Network connection is established (either side has either issued an N-CONFIRM or has received a Confirm Indication), either end of the connection may transmit data to one another through an N-WRITE request.

The parameters used in the data mover Network Request Block for the N-WRITE request are as follows (as with N-CONNECT, two data buffers are supplied with N-WRITE):

NRBBUFA, NRBLEN, and NRBDMODE specify the Pdata.

NRBPROTA and NRBPROTL specify the Odata to be sent.

The Network layer will construct a message or messages to be introduced on the network and will transmit them. The request is complete when all data associated with the N-WRITE has been successfully sent on the network. Any number of N-WRITE requests per connection may be outstanding at one time, although the Network layer may opt to force the application to wait for some to complete before accepting any more write requests.

The results of the completion of an N-WRITE are: (a) NRBSTAT/success or failure code and (b) NRBIND/set to zero.

N-READ

The N-READ request is used to solicit an indication from the Network. It signals the Network layer that the Network application is prepared to accept additional data (and indications) from the connection. It is the responsibility of the Network software to achieve maximum effectiveness of the use of the communications hardware, so the data may often be "read" before the application requests it. The N-READ request also provides a mechanism for the Network layer to signal special events such as connection termination to the network application. For example, if the Network layer detects an unrecoverable communications loss in the connection, then it will schedule a Disconnect Indication to be "read" by the next N-READ after all correctly received data has been delivered.

The data mover Network Request Block for the N-READ request works as follows:

The application provides a set of data buffers and a timeout value for the N-READ request.

If the Network layer has data ready to present to the Network application, then the request completes more or less immediately with the data supplied by the oldest received message for that data. Not all data that is written is necessarily received by the destination packet driver; data that does arrive is not guaranteed to arrive in the order of transmission.

If no data is currently available for the application, then the request will wait until data arrives. If no data arrives to satisfy the N-READ request in the time specified by NRBTIME, then the request will complete abnormally. If such a timeout occurs, the connection will remain complete; subsequent N-READs may be issued against the connection.

Any number of N-READs may be outstanding against a single connection. If the total number of N-READs outstanding becomes excessive, the Network layer may force the Packet Driver to wait until some of those read requests become complete. Any number of N-WRITE's may be issued while the N-READ remains outstanding, allowing full duplex communications to take place.

Since a disconnection is not signaled to both ends of a Network connection, it is possible for one side (generally the one that issued the original N-CONNECT) to issue an N-DISCONNECT followed by an N-CONNECT to the same N-ref. In that case, the inactive side will not see the disconnect indication; when the N-CONNECT arrives, the current N-READ will end with a Connect Indication in NRBIND, the new PAM used to reach this destination in a buffer pointed to by NRBCONN1, and connect data. This allows one side to establish a new communications path in the event of a failure without involving the other side. Note that when this subsequent connect takes place both the local and destination N-ref's must match on the destination end; otherwise the data will be discarded.

If the Network layer detects loss of communications, then it will do so by completing an N-READ with a Disconnect Indication. All data successfully received will be used to satisfy previous N-READs before the Disconnect Indication is presented to the Network application. If the Network Layer is the one that originally issued the N-Connect, then it will make a best efforts attempt to free the network resources allocated to the connection before returning the Disconnect Indication to the packet driver. After the Disconnect Indication is provided, all resources for the connection are freed and no further requests against that connection will be satisfied.

The results of completion of an N-READ are as follows: (a) NRBSTAT/success or failure code; (b) NRBIND/incoming Indication type; (c) NRBLEN/length of Pdada received; (d) NRBDMODE/datamode of Pdata received; (e) NRBPROTL/length of Odata received; and (f) NRBCONN1/new PAM if connect arrived.

N-DISCONNECT

When a Network application determines that no further communications with the destination application is desired, it may terminate the connection with an N-DISCONNECT request. N-DISCONNECT simply frees the resources that were originally allocated by the N-CONNECT/N-OFFER originally issued by each side. If the issuer of an N-DISCONNECT was the application that originally issued the N-CONNECT, then the Network layer will free the network path that was allocated during the connection process. Any N-WRITE messages that have not yet been received by the destination TPO unit may be lost. After the network resources have been freed, the Network layer will free the local resources needed to maintain the connection; when this is done, the N-DISCONNECT will complete. Any further requests against that connection will be rejected. Any requests against that connection which were outstanding at the time the N-DISCONNECT was issued will complete with an error. If the issuer of an N-DISCONNECT was the application that originally issued the N-OFFER, then the Network layer will only free the local resources needed to maintain the connection; the N-DISCONNECT will then complete. Any further requests against that connection will be rejected. Any requests against that connection which were outstanding at the time the N-DISCONNECT was issued will complete with an error.

The parameter used in the Data Mover Network Request Block for the N-DISCONNECT request is NRBNREF.

The result of the N-DISCONNECT is contained in NRBSTAT/success or failure code.

Driver Services

The driver layer interfaces with the IP stack by issuing UDP socket calls and is used for sending and receiving network messages in and out of a Network Interface Card. Connecting to the driver establishes a "path" from the data mover to the network interface hardware. Since the packet driver interfaces with the data mover at the Session Layer, the usage of the Driver Layer only occurs as the result of packet driver Session calls going down the protocol stack from Session to Transport, then to Network, and finally to the Driver Layer.

Protocol Message Descriptions

Driver Protocol Format

Figure 5:
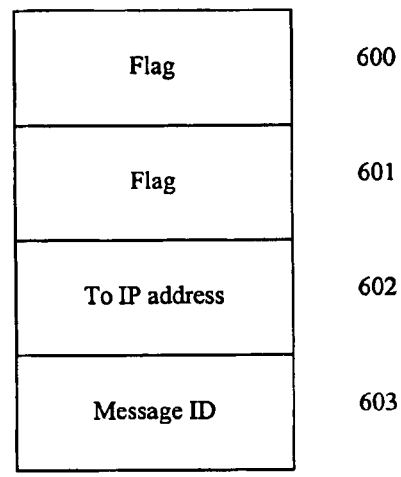
FIG. 5 is a diagram showing a data mover driver protocol data.

The Driver Protocol fields are located at the start of the data mover protocol data. FIG. 5 illustrates the format of the Driver protocol message. It consists of the following fields:

Flag1: 600 is reserved for flags.
Flag2: 601 is reserved for flags.
To IP Address: 602 contains the destination IP address.
Message ID: 603 contains the message-ID (fixed F2 value).

Network Protocol Format

Network protocols are located immediately following the Driver addressing information. The F2 message ID is the indication to the Network layer of the start of Network Data. Network level protocol consists of a fixed field, followed by an optional Connect field that is sent when connections are first made. All of these fields are present in every Network level network message.

Figure 6A:
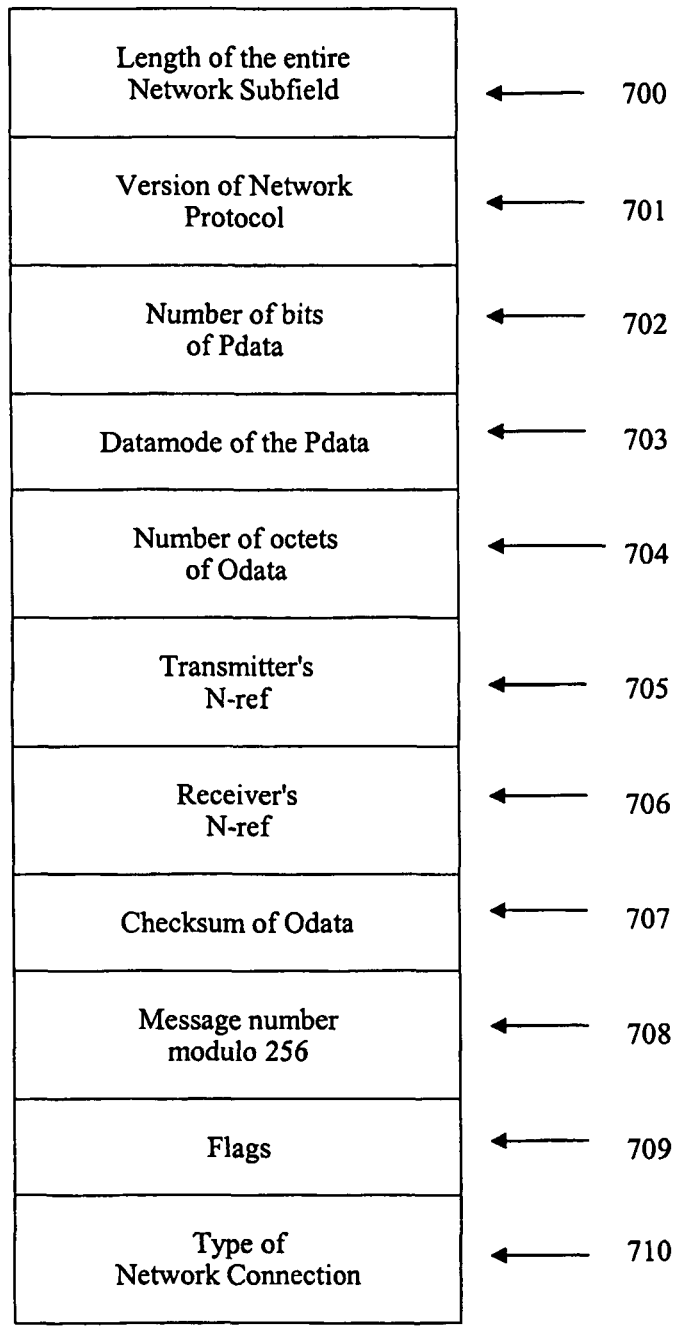
FIG. 6A is a diagram showing a data mover network message header.

FIG. 6A illustrates the format of the Network message header. It consists of the following fields:

N-length: 700 contains the total number of octets of Network protocol in this particular network message. If N-connect data is included (discussed below) this field will not include the length of the N-connect data; that data will be part of the Odata. If the Odata is to be found in the message, then the first byte of Odata can be found by adding N-length to the start of the Network protocol.

N-level: 701 contains the version number of the Network protocol.

N-Plength: 702 contains the number of bits of Pdata. When the Network application presents a write type (N-CONNECT or N-WRITE) request to Network service, it supplies a length and datamode in the NRB. Network service then calculates the number of bits that will be placed on the network. The Network service on the destination side places the Pdata length in the N-READ NRB. If no Pdata is associated with the Network request, then N-Plength should be set to zeroes. If Pdata is present, the 24 bit field allows up to 16M−1 bits or 2,097,151 8-bit bytes to be sent with a single request.

N-datamode: 703 Datamode is used to define the Code Conversion requirements. It is the responsibility of both the Network layer and the Device Driver to examine this field and modify it if changes are made to the data during transmission. It is also the responsibility of the Network layer software to perform software code conversion on incoming data before it is delivered to the Network application. When such software conversion is performed, the Network service should update the Datamode field showing that the conversion is performed before placing the final Datamode field in the user's NRB.

N-Olength: 704 contains the number of octets of Odata that are associated with this Network request. If N-connect data is present, it will be incorporated into the Odata and the O-length will reflect the additional Odata. This field does NOT include the length of the N-protocol data that is discussed in this section. This field is treated as an unsigned 16 bit binary number, allowing up to 65,535 (64K−1) octets of Odata to be sent with a single Network request. If no Odata is associated with the Network request then this field will be set to zero.

N-TNref and N-RNref: 705 and 706 are used to identify a particular N-connection for incoming data. It uses the "socket" concept, in that both transmitter and destination contribute a field to the 32 bit "socket" that must match the destination's version of the entire field before it is accepted as a connection. When the originating Network application issues an N-CONNECT, it must provide (in NRBCONN2) the 16 bit value that is the destination's N-ref, as well as its own transmitter's Nref in NRBNREF. In that connect message and all subsequent messages associated with that connection, Network service fills N-TNref and N-RNref with the values in NRBNREF and NRBCONN2 respectively. When a message is returned back in the opposite direction on the same connection, then the values in these two fields will be reversed as the roles of transmitter and destination have changed. The destination application also supplies a destination's N-ref in the NRBNREF field of the N-OFFER, as well as the transmitter's N-ref in NRBCONN2. If an incoming network message does not match the 32 bit "socket" of any outstanding network connection, then the message is discarded. This comparison to match incoming messages with network connections is done strictly on the basis of the 32 bit composite N-ref. Incoming messages from the driver, regardless of their point of origin, route, or incoming hardware interface, are considered to be for the same connection if the N-ref's match. Uniqueness of the N-ref on both machines is ensured as each copy of the data mover will only permit one connection to exist with a given local N-ref.

N-Ochecksum: 707 The N-Ochecksum field is generated by adding the 8 bit binary values found in each byte of the first 64 octets of the each Message, excluding the value of the N-Ochecksum field itself, and storing the result modulo 256. If the checksum field of an incoming network message does not match, then the entire message is discarded.

N-sequence: 708 is used to assure that composite messages are correctly reassembled upon reception by the destination. When each side of a network message initiates its first transmission to the other end, it places a binary 1 in this field. Each subsequent Network transmission sees this value incremented by one. Composite messages have the same sequence number for both parts of the message. Composite messages are assumed to arrive at the destination in order, with the Odata segment of the Network message first. If the destination Network service is waiting for a Pdata second segment of a composite message, and another message with a different sequence number arrives, then the Odata message is discarded and it is up to higher level protocols to arrange retransmission of the lost data. Similarly, if the sequence numbers indicate that only the Pdata segment of a Network data unit has arrived, then it will also be discarded.

N-flags: 709 is used to indicate optional N-protocol fields that may be present with the message and control the segmenting of a Network request into several network messages. The high order three bits are used to control segmentation of the message (reserved). The fourth bit is ON if connect information is included in the message. If such information is present, it will be included in the Odata and removed from the Odata before the Odata is presented to the N-READ or N-OFFER request. Basically, this connect data consists of the PAM that was used to route a message to the destination application. When the originating side of an N-connection establishes the connection, it will specify that connect data is present (and include the data) for every message written until a Network level message successfully arrives back to the originator. Thus it is possible that the connect data may be sent several times before an acknowledgement from the other end indicates reception of the connect data and turns the option off. Since the higher level data mover protocols require a protocol "handshake" before the connection is fully open, in practice this means that the N-connect information is only sent until the destination data mover successfully reads a connect message. The non-originating side of the connection examines this data (if present) and uses it as the route for all information to be returned to the originator. If connect data has already been successfully received when N-connect information arrives, then the destination network service will examine the new N-connect information and use it as the return route if the value of N-host code matches the originally received value (see N-host code, below). The purpose of this logic is to permit new routes to be established if the original one is lost. If a higher level protocol on the originating end detects failure to deliver data, it can issue an N-DISCONNECT followed by an N-CONNECT specifying the same N-ref as the old. PAM information associated with the new N-CONNECT route will be sent to the destination. Without breaking the connection from the destination's side, new routing information arrives and is used for all later responses. This permits higher level protocols to gracefully reroute information while maintaining the integrity of the connection.

N-type: 710 contains the type of indication that is to be presented to the destination Network user. The value of this field is the same low order four bits as is found in the NRBREQ field of the transmitter's request; thus: 1 Connect (N-CONNECT) indication, 2 Confirm (N-CONFIRM) indication, and 3 Data (N-WRITE) indication. The other Network request (N-DISCONNECT) does not result in message traffic and hence other values will not appear in the N-type field.

N-CONNECT, N-CONFIRM Protocol Data

Figure 6B:
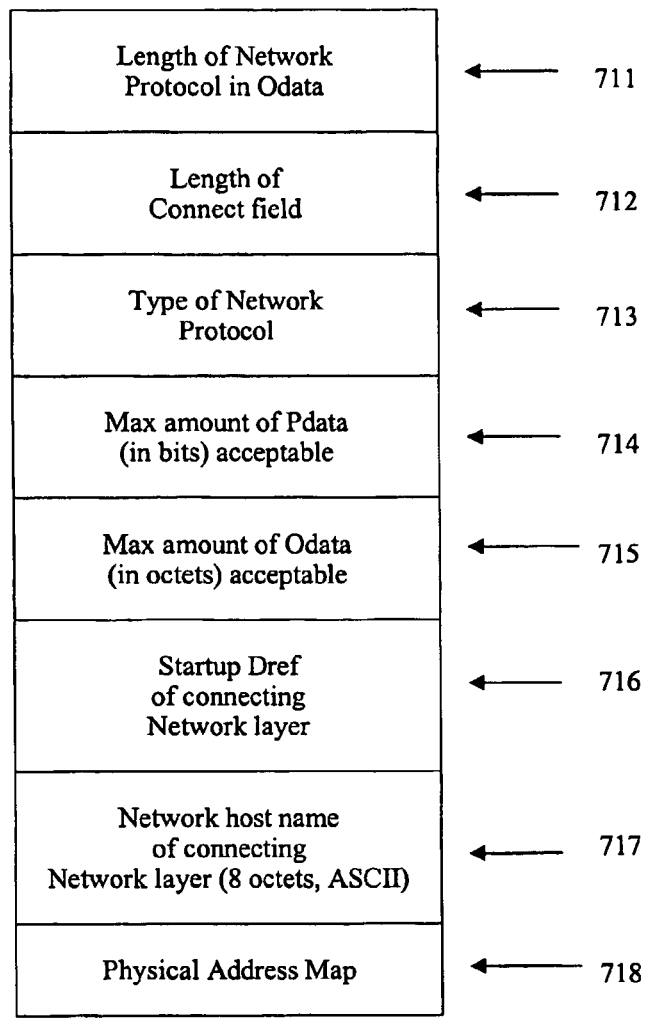
FIG. 6B is a diagram showing a data mover network connect/confirm protocol data.
Figure 6C:
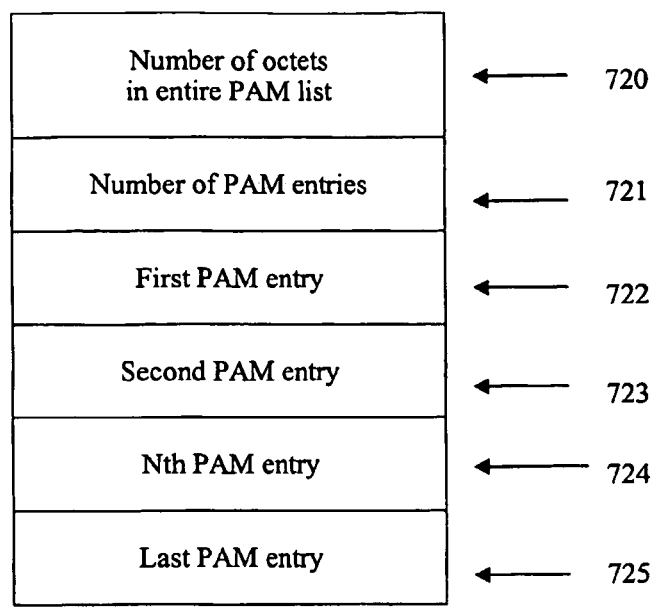
FIG. 6C is a diagram showing a data mover physical address map list.
Figure 6D:
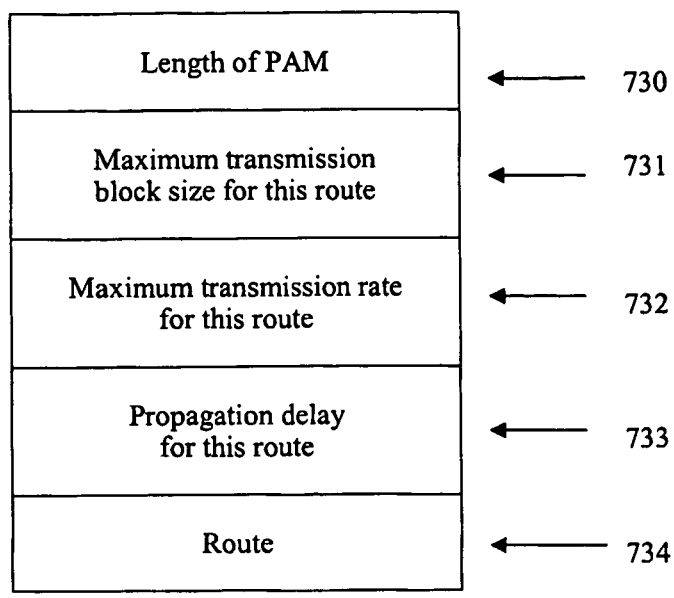
FIG. 6D is a diagram showing a data mover physical address map entry.
Figure 6E:
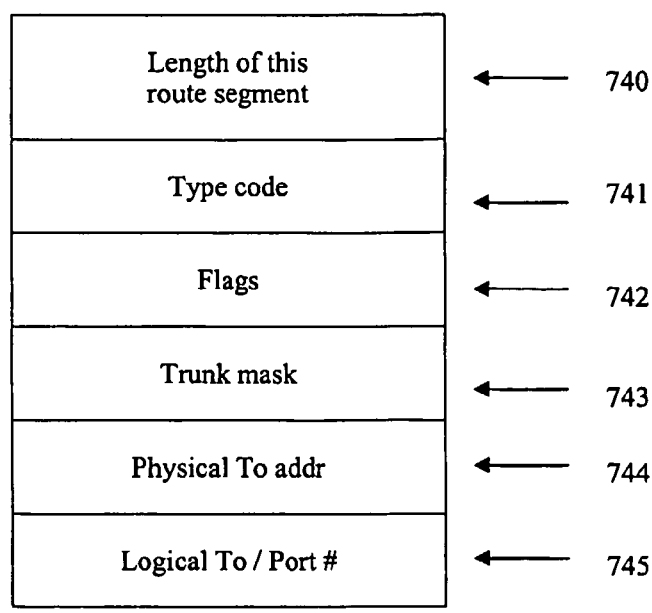
FIG. 6E is a diagram showing a data mover physical address map route.

FIG. 6B illustrates the content of the Network Connect subfield of the TPO Network protocol data.

N-OPlength: 711 contains the total number of octets of N-protocol information that is to be found in the Odata.

The start of the Odata provided by the user may be found by adding the value of N-OPlength to the starting address of the Odata.

N-OConlen: 712 contains the number of octets to be found in the N-connect field. This separate length field is designed to support the presence of other N-protocol information than N-connect data in the Odata area. If only N-connect data is present, it will generally be one less than N-OPlength.

N-Otype: 713 Indicates that the data following is N-connect information. The following values are valid:

01—N-connect protocol follows
02—N-confirm protocol follows; this is identical to the N-connect protocol except there is no PAM.

N-PDsize: 714 In this field, the sender of the Connect data declares the maximum amount of Pdata that it is prepared to receive in a message issued by the sender. Generally this value is a software limitation on the part of the transmitter; it wishes to receive Network messages of a certain maximum size so that it can anticipate storage requirements before reading data. This value may be either greater than or less than the media message size limitations as specified in the PAM later in the connect data; it is the responsibility of the destination Network service to send messages no greater in size than the minimum of both fields.

N-ODsize: 715 allows the transmitter to inform the destination of the maximum amount of Odata that may be sent with any particular network message. The maximum Odata amount is a software limitation that may be independent of the Pdata maximum size or the physical limitations of the connection as specified in the PAM. It is the responsibility of the destination Network service to send messages no greater in size than the minimum of the received N-ODsize and the local max size.

N-HostDref and N-HostNane: 716 and 717 (collectively referred to as N-HostID) accompany the Network Connect field to prohibit Incoming Network Connect Indications from interfering with a new connection. When the offering Network Service receives an initial Network Connect Indication (the one that completes the initial N-OFFER), it saves the value of N-HostID with the parameters of the Network connection. If a subsequent Connect Indication comes in with the same pair of N-ref's before any N-DISCONNECT has occurred on this side, then it compares the value of N-HostID with the value supplied on the initial connection. If N-HostID does not match, then the message is discarded. If a Network service that issued the initial N-connect receives an N-connect message from the network, it is always ignored. The purpose of this field is to prevent connections from being preempted by other hosts that happen to have matching pairs of N-Ref's. Although matching N-ref's will prevent most cases of an inadvertent reconnection at the Network layer, it is not satisfactory in a data mover environment for two reasons:

1) OSI standard protocols use the concept of a "reference timer"—an interval in which a given N-ref on a host cannot be reused. This time is specified as being longer than the maximum lifetime of a packet in the network. The high speed networking environment of the data mover makes it unacceptable for a service on a known N-ref to be out of action for the maximum lifetime of a message in the network, which could be many seconds.

2) Since a new Network Connect Indication causes all returned data on the N-connection to be rerouted via the route specified in the PAM, an incorrect connect message will not simply be ignored—it can cause loss of the entire Network connection that will require recovery by higher layers of software.

Although the only real requirement for N-hostID is that there is reasonable assurance that each copy of the data mover in the network generates a unique N-hostID, a specific algorithm is needed. When the Network services establishes contact with the network by establishing its own D-connection, it saves the first D-ref it acquires after initialization.

Physical Address Map: 718 is a data structure that specifies a route to a particular host. FIG. 6C illustrates the content of entries in the Physical Address Map list.

Number of octets in PAM list: 720 specifies the entire length of the PAM list.

Number of PAM entries: 721 specifies the number of PAM entries in the list.

First PAM: 722 contains the first PAM entry.

Second PAM: 723 contains the second PAM entry.

Last PAM: 72*x* contains the last PAM entry.

FIG. 6D illustrates the content of entries in each of the Physical Address Map entries.

Length of PAM: 730 contains the length of this PAM.

Maximum transmission block size: 731 contains the maximum transmission block size for this route.

Maximum transmission rate: 732 contains the maximum transmission rate for this route.

Propagation delay: 733 contains the propagation delay for this route.

Transport Protocol Format

Transport protocol consists of two types of fields of Odata. Present in every message sent between Transport services is a Transport Base field, which contains information common to all Transport transactions, and Transport Subfields which contain information specific to a certain Transport activity such as connection, data transfer, acknowledgement, etc. Any number of subfields may be found in a single Transport message. The types of subfields encountered are:

CONNECT. This contains information so that the two transport processes can begin a connection and exchange information about the other that will be common throughout the lifetime of the connection. Generally (though not always) this field will be sent with user T-CONNECT and T-CONFIRM requests.

DATA. This field describes the data that is being delivered to the destination application. It contains such information as the amount of application Odata, block numbering information, segmenting information, and the like.

ACK. The ACK field is a mechanism for exchanging information about the "state" of the destination transport mechanism. It contains information on blocks received and flow control information. It is present in all messages, and is also sent as an "idle" message if the connection is unused for awhile.

CLOSE is a special form of the Data subfield that indicates a T-CLOSE has been issued by the application.

DISCONNECT indicates that a disconnection is to be performed. This may be caused by the application issuing a T-DISCONNECT or a data mover detected termination condition (such as user program termination.)

Transport Fields

Transport Base

Figure 7A:
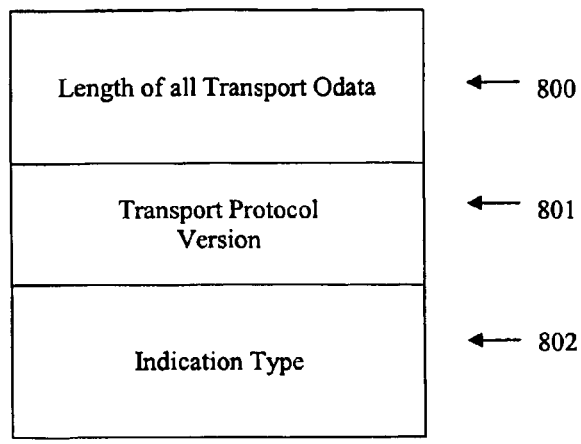
FIG. 7A is a diagram showing a data mover transport protocol base field.

FIG. 7A illustrates the content of the Transport Base subfield. It is present in every message sent by Transport service. The content of the Transport Base subfield is:

TLENGTH: 800 contains the length of all Transport Odata, including the length field itself. Adding TLENGTH to the start of the Transport Odata will give the address of the first octet of Transport application (Session) Odata.

TLEVEL: 801 contains the version of the protocol. This contains either a value of 2 (decimal) for Type2 protocol, or 4 (decimal) for Type4 protocol.

TMSGTYPE: 802 contains the indication type that is to be delivered to the destination application. Its contents will also dictate the types of subfields that may follow in the Transport Odata. The values that may be placed in this field are:

0—IDLE. This transport message is only used to verify and report the continued existence of both Transport processes. No indication is to be delivered to the Transport application as a result of this message.

1—CONNECT. The Transport application has issued a T-CONNECT request.

A data field associated with this message will contain the data supplied with the T-CONNECT. A Connect transport subfield will be present. A Connect Indication will be placed in NRBIND of the destination application's T-OFFER request.

2—CONFIRM. The transmitting Transport application has issued a T-CONFIRM request. A data field associated with this message will contain the data supplied with the T-CONFIRM. A Connect transport subfield will be present. A Confirm Indication will be placed in NRBIND of the destination application's T-READ request.

3—DATA. The transmitting Transport application has issued a T-WRITE request. A data subfield will be present. A Data Indication will be placed in NRBIND of the destination application's T-READ request.

4—EXPEDITED DATA. (Reserved).

5—CLOSE. The transmitting Transport application has issued a T-CLOSE request. A data subfield will be present. A Close Indication will be placed in NRBIND of the destination application's T-READ requests. Only DISCONNECT and IDLE message types may follow this Transport message on this connection.

6—DISCONNECT. Either the application or Transport service has initiated a T-Disconnect. A Disconnect subfield will be present and a Data subfield may be present. A Disconnect Indication will be placed in NRBIND of the destination application's T-READ request. This is the last Transport message that will be sent in this direction by Transport service.

Connect Subfield

Figure 7B:
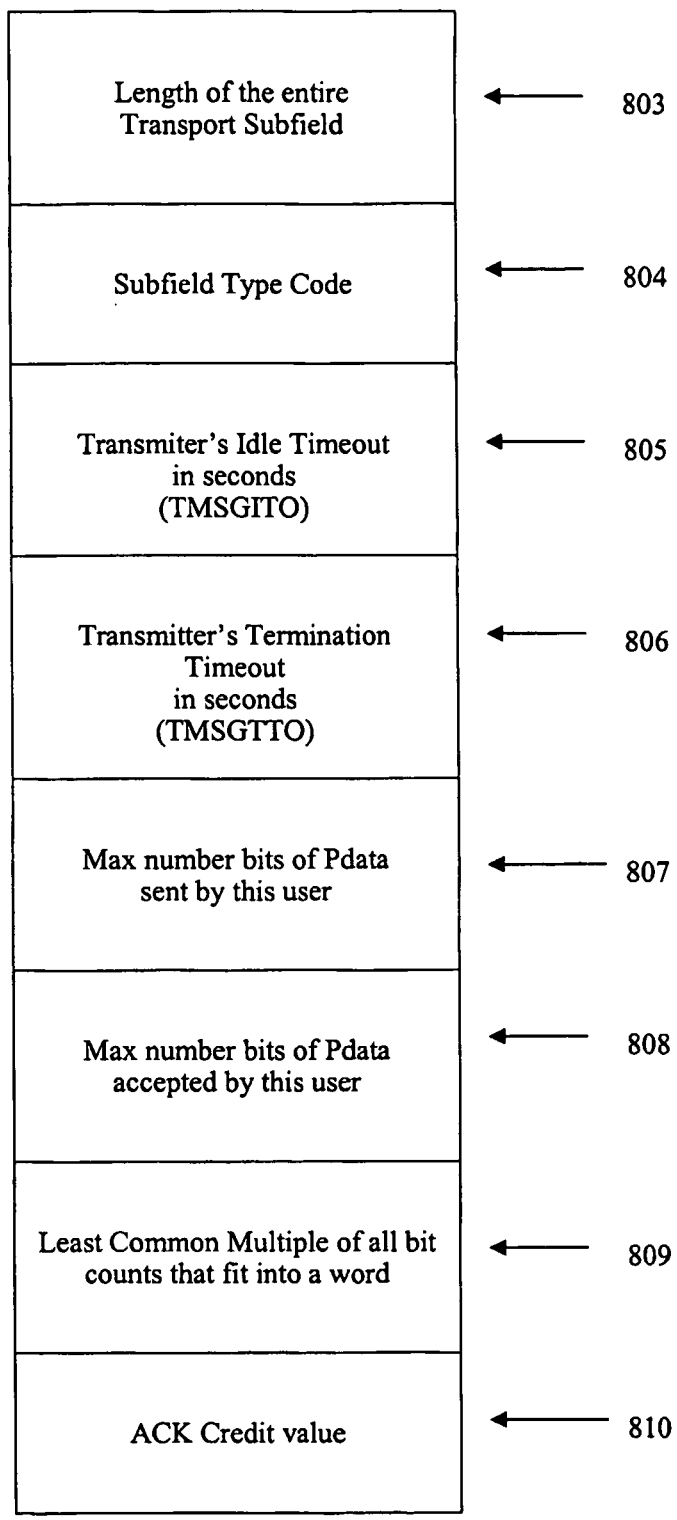
FIG. 7B is a diagram showing a data mover transport protocol connect subfield.

FIG. 7B illustrates the content of the Transport Connect subfield that is located in a TPO message. This subfield contains the information needed to correctly exchange information between the two Transport processes for the lifetime of the connection. It covers such things as timeout thresholds, segmenting information, and maximum user block sizes. The content of the Transport Connect subfield is:

TSLEN: 803 gives the length of the connect subfield, including itself. Adding the value in TSLEN to the address of the Connect subfield will give the start of the next Transport subfield.

TSTYPE: 804 identifies the type of subfield and hence the nature of the information to follow. A Connect subfield has a 3 (binary) in this octet.

TMSGITO: 805 is used to inform the destination how often it should send "idle" messages back to the transmitter to keep the connection open. An idle message is then sent whenever TMSGITO seconds have elapsed without the Transport process having anything to send. The reception of an idle message alerts the destination side that blocks may have been lost in transmission. Such an idle message will contain an ACK subfield which informs the other side what information has or has not been received. Each side can have a different threshold for its idle timeout. Note that each side tells the other how often the messages should be sent; a side has no control over the interval in which it should transmit idle messages. In order to process such idle timeouts, the Transport process will have to continue interval timing even though no work is in progress. If a Transport process does not receive an idle message or other response within a larger interval (referred to as dead timeout–DEADTO), then it will consider that communications have been lost and abandon the Network connection in use.

TMSGTTO: 806 In this field, the two processes exchange the number of seconds the other should wait for an attempt to re-establish a Transport connection over a different path. The connecting side sends the calculated value: (# PAM entries*CONTO)+DEADTO. The offering side sends: DEADTO. CONTO and DEADTO are connection timeout values assigned by Transport service; their meaning is explained in detail later in this specification. "# PAM entries" is simply the number of usable paths that have been supplied to reach the destination by the user of Transport service. This field is used when it is associated with an initial T-CONNECT to a Transport user who has issued a T-OFFER. If the offering side must wait for Alternate Path Retry to take place by the T-CONNECTING side, it gives the maximum amount of time that the offering side should wait for a connect attempt to succeed.

TMSGBLKO: 807 is used to pass the NRBBLKO supplied by the user with a T-CONNECT or T-OFFER request. This field is the largest size block that the Transport application will wish to send for the lifetime of the connection. This field will be forwarded to the destination user along with the indication type of the message. Transport does not place an inherent limit on the size of data blocks moved; however, transport applications may wish to do so. Transport software can use the values in BLKO and BLKI to better manage buffer and network resources.

TMSGBLKI: 808 contains the maximum input Pdata size acceptable to the Transport application as specified in NRBBLKI of the T-CONNECT or T-OFFER request.

TLCM: 809 contains the Least Common Multiple of the number of bits required to fill a machine addressable word on the transmitting host. It can be used to ensure that when user data is segmented that the segments always end on a word boundary when received. See the section on "Segmentation" for more information on the use of this field.

TMSGACKC: 810 contains the "Ack Credit" of the Transport process that is sending the Ack subfield. It specifies how many blocks the transmitting process is prepared to have outstanding before the destination process must return a message containing an Ack subfield. If a 0 or 1 is in this field, then the transmitter of this Ack subfield desires that an Ack subfield be returned every time a message is received by the destination transport process. If the destination process has no data ready to be sent on which an Ack subfield may be "piggybacked," then the destination process will have to generate an "idle" message to immediately respond to the incoming message. This low value should only be used by highly constrained data mover implementations that have very limited buffer space or only function in a simple, one-thing-at-a-time communications environment. If a value greater than 1 is in this field, then the Transport process destination this subfield may allow that many incoming data messages to arrive without generating a responding message with an Ack subfield. A value of 2 or greater is particularly valuable in inquiry/response applications because the block containing the inquiry can be acknowledged by the transmission containing the response; the response can be acknowledged in the block containing the next inquiry, etc.

Transport Protocol Data Subfield

Figure 7C:
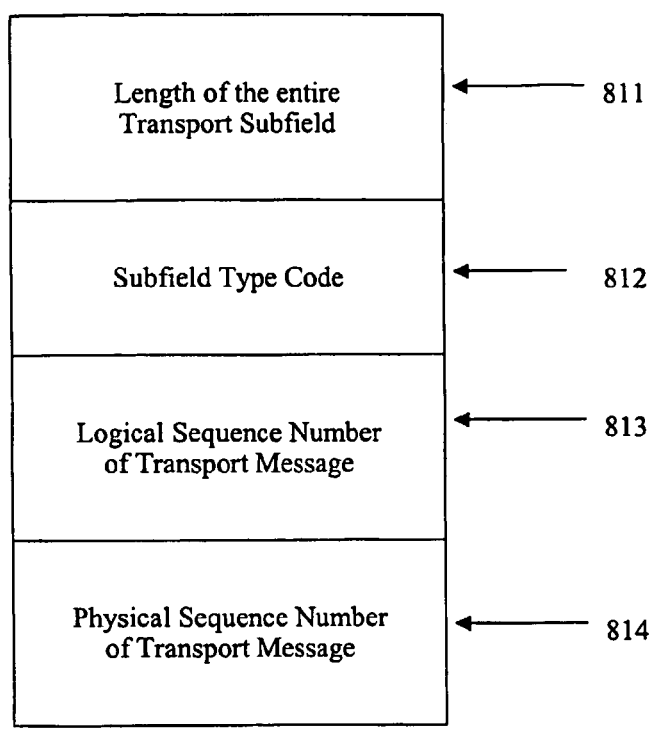
FIG. 7C is a diagram showing a data mover transport protocol data subfield.

FIG. 7C illustrates the content of the Transport Protocol Data subfield. This subfield describes the Odata and Pdata supplied by the transmitting Transport application. The content of the Transport Connect subfield is:

TSLEN: 811 gives the length of the data subfield, including itself. Adding the value in TSLEN to the address of the Data subfield will give the start of the next Transport subfield.

TSTYPE: 812 identifies the type of subfield and hence the nature of the information to follow. The Data subfield may have one of two values: (a) 4-indicates that the data herein is the last segment (or only segment) of a block of data provided by a Transport user and (b) 7—indicates that the data is a segment other than the last of a user provided block. Therefore a large block provided by a transport user would consist of several blocks with TSTYPE 7 followed by a last block with TSTYPE 4. Since each segment of the user's block has its own physical and logical sequence number, reassembly of the user data on the destination side is quite straightforward.

TMSGLNO: 813 represents a thirty-two bit unsigned binary quantity that increases by one each time a new segment of transmitted data (a Transport Protocol Data Unit) is first transmitted on the network. This number will be the order in which transport messages and indications will be delivered and data reassembled for the destination application. Therefore, data is ordered by Logical number in the order it was provided in write-type transport requests. The purpose of this field is to permit flow control from transmitter to destination and reassembly of incoming data by the destination. The first block of transport application data (which will be T-CONNECT data) will have a TMSGLNO of 1. This number will increase by 1 until "2 Gigabyte-1" blocks have been sent; then it will wrap around to 0 and continue incrementing.

TMSGPNO: 814 is a thirty-two bit unsigned binary quantity that is incremented by one each time a Transport message is given to Network service for transmission over the network. This field is used to coordinate the acknowledgements of data received. The first transmission by Transport service (which will contain the T-CONNECT data) will have a TMSGPNO of 1. This number will increase by 1 until "2 Gigabyte-1" N-CONNECT or N-WRITE requests have been made; then it will wrap around to 0 and continue incrementing.

Transport Protocol Acknowledgement Subfield

This field is used to report to the opposite party the "state" of the transport process what has been sent before and what has been received. By examining this field, the other transport party can determine what has been successfully sent, whether the other party can accept more data (flow control), and if blocks were recently sent which did not arrive at the destination (lost block detection). This field is present in every Transport message, whether or not the Ack credit is exhausted. This allows the transmitter of information to free storage for successfully transmitted blocks on a more timely basis, and improves network performance in environments where acknowledgements can be lost.

Figure 7D:
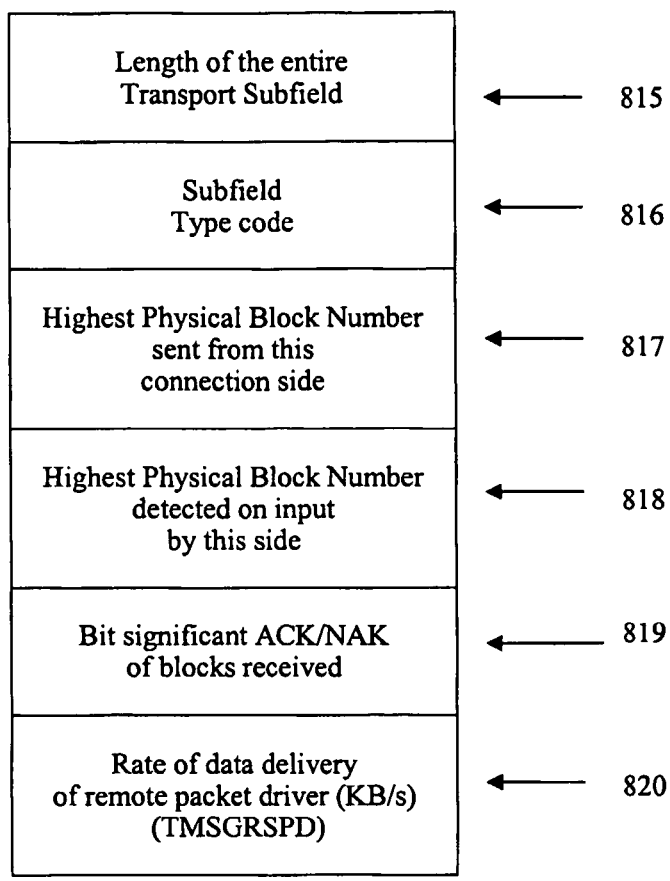
FIG. 7D is a diagram showing a data mover transport protocol acknowledgement subfield.

FIG. 7D illustrates the content of the Transport Acknowledgement subfield located in the Transport portion of a TPO message. the content of the Transport Acknowledgement subfield is:

TSLEN: 815 gives the length of the acknowledgement subfield, including itself. Adding the value in TSLEN to the address of the Ack subfield will give the start of the next Transport subfield.

TSTYPE: 816 identifies the type of subfield and hence the nature of the information to follow. An Ack subfield has a 2 (binary) in this octet.

TMSGMAXO: 817 contains the highest Physical Block number (thirty-two bit number) that has been sent by this side of the Transport connection. In most cases, where a Data subfield is also included in the message, this field will be equal to TMSGPBN in the data subfield. In messages without a Data subfield (typically Idle messages), it will contain the highest value of TMSGPBN introduced on the network. When received in an "idle" message, this allows the opposite Transport process to detect the fact that an extra block or blocks has been sent by the destination party but not received locally. The local transport process can then generate a Transport message of its own with an Ack subfield that negatively acknowledges TMSGMAXO back to the last block successfully received.

TMSGMAXI: 818 contains the highest value Physical Block Number (thirty-two bits) that is known to have been transmitted by the destination Transport process. It will contain the highest value of TMSGMAXO known to have been correct on an incoming message, whether or not the data was successfully received. This highest known value is returned back to the destination transport process so it can use the Ack/Nak information in TMSGACKI to retransmit data.

TMSGACKI: 819 consists of sixteen bits of Ack/Nak information. It informs the destination Transport process A of the status of the last sixteen blocks of information that Transport process B knows A has tried to send. The high order bit of this two octet field contains the Ack/Nak status of the Physical Block Number in TMSGMAXI. If this bit is off, then process B has successfully received Physical block number TMSGMAXI; if on, then it is not been successfully received and that particular block should be immediately scheduled for retransmission (with a new, higher Physical Block Number). The next most significant bit contains the Ack/Nak status for block TMSGMAXI-1; the next for block number TMSGMAXI-2 and so forth until the oldest block covered in this field, TMSGMAXI-15, is reached. This bit significant information is designed to be redundant; in this manner, the loss of one or more messages containing acknowledgment subfields is not sufficiently serious that the processes have to "time out" and exchange idle messages to resynchronize themselves. Therefore, a transport processing an Ack subfield need only process the Ack/Nak information for those blocks not reported upon in the previous Ack subfield received. Since retransmitted blocks acquire a new Physical Block Number (while retaining their original Logical Block Number), multiple retransmissions of the "same" block do not present any problems. If a sufficient number of Ack subfields were lost that TMSGMAXI-15 is greater than TMSGMAXI of the previous Ack subfield received, then all blocks without definite positive acknowledgement below the newer TMSGMAXI should be retransmitted—the Nak'ed blocks between new TMSGMAXI and new TMSGMAXI-15 and the unreported blocks between new TMSGMAXI-15 and old TMSGMAXI, as well as continuing retransmission of all Nak'ed blocks at or below old TMSGMAXI. A destination Transport process must be prepared to discard any incoming blocks with a Logical Block Number of a block already received successfully. When the Transport process is just beginning, not all sixteen bits will contain the status of an actual block. Bits showing the "status" of Physical Block Numbers below 1 (the first message) should be set to zero.

TMSGRSPD: 820 contains the rate of delivery of data to the destination application.

Idle Messages

An "idle message" is defined as a message containing no application data which is exchanged between the two transport processes. It contains only a single Transport protocol subfield, the Ack subfield. Its purpose is to inform the destination transport process of the continued presence of the connection, and to permit the retransmission of any data that may have been lost. There are three main circumstances where a Transport process should send an idle message:

When data is arriving from the destination Transport process and the Ack Credit supplied with the last Ack subfield provided by the destination party is exhausted. Furthermore, the local Transport process has no data to send. In "one-way" applications such as file transfer, the destination Transport process will generate an idle message every "ack credit" times an incoming data message is received.

When the local Transport process has not had occasion to transmit anything (including another idle message) for the time interval that was specified by TMSGTO in the last Connect subfield received from the destination transport. Since both sides of the connection are performing this transmission, they can detect loss of communications with the other side of the connection by the failure to receive idle messages for an extended time. In addition, a burst of errors or a small Ack credit may cause both sides to think all is well when in fact one or more recent transmissions may have been lost. The exchange of timed idle messages will inform the transmitter that data was lost so that retransmission may take place.

When the flow control mechanism implemented by TMSGPROC must be used to tell a transmitting process that a "buffer full" condition in the destination has been relieved. If a pair of applications work so that the transmitter is faster than the destination, then the destination Transport process' buffers will fill and a value in TMSGPROC will be returned so that the transmitting Transport process will introduce no new data on the network. At a later time, the destination application will free buffers on the destination side by accepting data. When the number of buffers holding data drop below a threshold determined by the destination Transport process, then it will send an idle message back to the transmitter with a higher TMSGPROC value. The transmitting Transport process can then send several more blocks and the process will continue.

Transport Protocol Disconnect Subfield

Figure 7E:
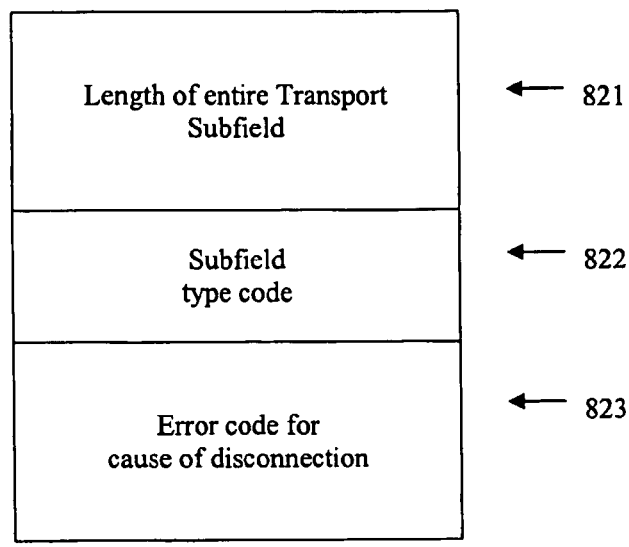
FIG. 7E is a diagram showing a data mover transport protocol disconnect subfield.

FIG. 7E illustrates the content of the Disconnect subfield located in the Transport portion of a TPO message. The Disconnect Subfield is sent whenever a Transport process is unilaterally shutting down and wishes to inform the destination Transport process of the fact. It will be the last message transmitted by the side initiating the Disconnect. Any subsequent messages arriving at the Disconnecting side will be discarded. The purpose of this subfield is to inform the Disconnected (destination) Transport process of the reason for the disconnect. The content of the Disconnect subfield is:

TSLEN: 821 gives the length of the disconnect subfield, including itself. Adding the value in TSLEN to the address of the Disconnect subfield will give the start of the next Transport subfield.

TSTYPE: 822 identifies the type of subfield and hence the nature of the information to follow. An Ack subfield has a 1 (binary) in this octet.

TMSGWHY: 823 gives the sixteen bit error code that should be placed in NRBSTAT of the next T-READ request to be provided by the Transport application. Consequently, it should be an error code that indicates to the application error conditions detected in the destination host (such as destination Transport application abnormal termination). If the message containing the Disconnection subfield is the result of a T-DISCONNECT request issued by the destination Transport application, then TMSGWHY will contain a binary zero. The next local T-READ request will complete with a Disconnect Indication and an NRBSTAT of zero, indicating a normal, successfully executed Disconnect. Note that since the Disconnect message is not acknowledged, no further communications will take place if the message is lost. As a result, some sessions that would end with a normal message may end with NRBSTAT 2400 (communications lost) instead of the intended error code.

Transport Message Construction

All communications between Transport processes will contain one or more of these Transport subfields. Table 1 shows what sort of subfields can be expected with the various types of Transport messages and indications.

TABLE 1

| | Transport Subfields | | | | |
|---|---|---|---|---|---|
| Message Type | Connect | Data | Ack | Disc | Segment |
| CONNECT | Req'd | Req'd | Req'd | Never | Never |
| CONFIRM | Req'd | Req'd | Req'd | Never | Never |
| DATA | Option | Req'd | Option | Never | Option |
| CLOSE | Option | Req'd | Option | Never | Option |
| DISCONN | Never | Option | Option | Req'd | Never |
| IDLE | Option | Never | Option | Never | Never |

Table 1 contains several elements that should be noted:
1) The Connect subfield may optionally be included with most normal Transport messages. It may be sent at any time by a Transport process that wishes to work with new block size, timeout, or segment size values. Most typically it would be used by the connecting Transport process when aNetwork connection was lost and a new one was established. The offering Transport process would then get a Connect Indication on its N-Read, along with a Transport message containing normal data and possibly a new Connect subfield to reflect changing parameters in the new Network connection.
2) Segmentation of data (Data messages without the End flag indicating that more data is needed before a T-READ is to be marked complete) is only permitted with Data and Close indications. It is not supported while the connection is being opened, as maximum Transport block sizes have not yet been negotiated.
3) Although it is a very good idea to include an Ack subfield along with a Transport message containing data, its presence is not required.
4) An idle message may contain a Connect subfield, and it may also not contain an Ack subfield. (However, there seems to be no benefit and several problems possible if it is omitted). If neither subfield is supplied, then the only effect of the Transport message is to reset the Connection lost timeout counter (see "Transport Timeouts" below).
5) Disconnect messages may contain Data subfields to describe data associated with a normal T-DISCONNECT service request. They may also contain Ack subfields, although these can be ignored by the destination Transport process. A Disconnect subfield will only be seen with a Disconnect indication.
6) Incoming messages that violate these rules may be treated as "protocol errors" and their presence ignored.

Session Protocol Format

Session Manager Protocol

Session Protocol is the Odata that is included by Session service for communications purposes. It consists of a base field that is present in all Session messages, as well as subfields that are used to communicate with the Session Manager.

Session Manager Protocol Base Field

FIG. 8A illustrates the content of the Session Manager Base subfield. As with the Transport protocol it contains a header with total length and version number followed by a protocol type indicator. The content of the Session Manager Base subfield is:

- SLENGTH: 1000 gives the length of all Session protocol data that is in the message, including the SLENGTH field itself. Adding SLENGTH to the start of the Session Odata will give the first octet of Presentation Odata to be delivered to the Session application.
- SLEVEL: 1001 gives the version number of the protocol in use. Currently, this will have the value of 2 (binary).
- STYPE: 1002 Strictly speaking, the data mover does not use one session protocol—it uses one of several, depending on the events at hand. This field identifies the "subtype" of session protocol that is contained in this message. STYPE=0 indicates that this message is part of a direct communication between Session applications after the connection has been established. In that case, only the base field is present; no subfields are defined. STYPE=1 indicates that a dialogue between Session Service on one end and a Session Manager at the other is taking place. Information on application names and addresses is being exchanged. STYPE=2 and STYPE>2 are reserved.

Session Manager Connect Protocol

FIG. 8B illustrates the content of the Session Manager Connect subfield, including the Session Manager Base subfield. This information is sent on the behalf of an application that has issued an S-CONNECT. It is a request for a Session Manager to complete a connection to an S-OFFERing application. Four alphanumeric eight character strings are supplied to match sessions and supply information about the connecting party. All transmissions of this character data over the network must use the ASCII code. Any ASCII character values are acceptable for application and host names. The content of the Session Manager Connect subfield, including the Session Manager Base subfield is:

- SPNAMED: 1009 contains the name of the application that is to be connected to. It is the character information supplied in NRBCONN2 on the S-CONNECT request, and must match a string supplied in NRBCONN2 of some outstanding S-OFFER request in order for the connection to complete.
- SPHOSTD: 1010 The name of the host that the connector wishes to address. This field should match the name of the host assigned during data mover generation or initialization. If this field is being generated to perform an S-CONNECT, it should contain the host field in NRBCONN1, translated into ASCII code.
- SPHOSTS: 1011 contains the generated name of the host from which the connect request is originating. It is not needed to complete the connection; its intended use is to permit simpler security and accounting checks of potential connections and to make operator displays of outstanding sessions more informative.
- SPNAMES: 1012 contains a data mover generated name for the application program. The manufacture of this name is system dependent and should be some value which is "unique" at any one time to that computer system, such as jobnanie, Logon ID, account number, etc. This field is not needed to complete the connection; its intended use is to permit simpler security and accounting checks of potential connections and to make operator displays of outstanding sessions more informative.

Session Manager Confirm Protocol

FIG. 8C illustrates the content of the Confirm subfield, including the Session Manager Base subfield. This information is sent on the behalf of an application that has issued an S-CONNECT. The confirm protocol is used when the Session Manager wishes to return information back to the connector. It will inform the connector whether the connection had a matching offer or not, as well as giving information on the route to be followed to reach the offering application. The response to a connect request comes in one of three sizes depending on the nature of the response. 1. If the connection did not succeed, a reason code is returned that details the reason for the failure. In this case SPLEN=5. 2. If the connection did succeed and the PAM used to connect to the Session Manager is also suitable for connection to the user application, then the N-ref of the application is returned and the connection application can use the Session Manager PAM and the application N-ref to establish the application to application connection. 3. If the connection succeeded, but the PAM used to connect to the session manager is not appropriate to connect to the application, then the Session Manager can return a complete list of PAM's, suitable for passing directly to Transport Service with the application to application T-CONNECT request. The meanings of the various fields are:

- SPFFLAGS: 1018 details the following information.
  Su—If on, this indicates that the connection succeeded in matching an OFFER maintained by the Session Manager. If this bit is on, then the SPFNREF, SPNAMED, and SPHOSTD fields will be supplied and the protocol length fields will reflect this fact. The SPFWHY field will contain zero, indicating a successful connection.
- SPFWHY: 1019 contains a binary zero if the connection succeeded, and the reason for the failure to connect if the connection failed. In the event of failure, this sixteen bit reason code will be placed in NRBSTAT of the application's S-CONNECT request to indicate the reason for failure. Most often this error will simply indicate that the offered party is not present; however, exceptional conditions or user exits may return other codes or installation dependent codes back to the connecting user through this mechanism.
- SPFNREF: 1020 contains the N-ref of the application that is to be directly connected to. It should be supplied in NRBCONN2 of the T-CONNECT for the connection to succeed. This field must be present if the Su bit is on.
- SPFNAMED: 1021 contains the name of the user program or task that accepted the connection. The generation of this field is system dependent and should contain a "unique" identifier such as jobname, Logon ID, etc. The value of this field is not needed for establishment of the connection. It could be used as a check to ensure that the correct party is connected to and to make operator information displays more informative. The field consists of 8 octets of character ASCII data.
- SPHOSTD: 1022 contains the name of the host computer that actually accepted the connection. Generally, this will be identical to the SPHOSTD value provided with the Session Manager Connect information. However, if the connection was made using host groups or NTXADM, it will be the ultimate destination host. The value in the SPHOSTD field is not needed to complete the connection. It can be used to make operator information displays more informative and to check for the possibility of exchanging information with undesirable hosts. The field consists of 8 octets of character ASCII data.

PAM list is optional. Following the Session information in the response is an optional PAM list, in the same form as is provided to a T-CONNECT request. This PAM is returned in a form that can be directly used to establish communications with the application that issued the S-OFFER. This field can be produced by modifying the incoming PAM that T-connected to the Session Manager, or it can be produced by generating a list of routes between the two applications based on the Session Manager's knowledge of the network.

Session Manager Disconnect Protocol

No Odata is associated with a Disconnect request to the Session Manager. The Session Manager will re-offer itself as soon as the first connection is terminated for whatever reason.

Session Service Protocol

Session Service Protocol is the Odata that is included by Session service for communications purposes after the two Session applications have established a direct T-connection between one another. It consists of only a base field that is present in all Session messages. No subfields are present, as Transport provides all the services that are needed in this version of Session protocol.

Session Service Protocol Base Field

FIG. 8D illustrates the content of the Session Service Base subfield. As with the Transport protocol it contains a header with total length and version number followed by a protocol type indicator. The content of the Session Service Base subfield is:

SLENGTH: 1003 gives the length of all Session protocol data that is in the message, including the SLENGTH field itself. Adding SLENGTH to the start of the Session Odata will give the first octet of Presentation Odata to be delivered to the Session application.

SLEVEL: 1004 gives the version number of the protocol in use. This will have the value of 2 (binary).

STYPE: 1005 contains a binary zero, indicating that this session protocol is intended for direct application to application connections. Only the base field is present when STYPE=O.

Abbreviated Session Protocol field

Normally, there is little or no session protocol to be sent in a TPO non-connect type message. Optionally, an abbreviated form of session protocol can be used, as illustrated in FIG. 8E.

Application Protocol Format

Embodiments of the TPO contain a method of forming TPO messages that include Application Protocol (i.e. packet driver) data for the purpose of communicating with the peer-level Application layer (i.e. packet driver) on the destination side of the TPO connection. FIG. 9A illustrates the format and contents of the TPO packet driver application data. It consists of the following fields:

Routing Header: 1200 contains the routing header (see FIG. 9A). There is one routing header in each packet driver buffer, and is located at the start of the buffer.

Figure 9B:
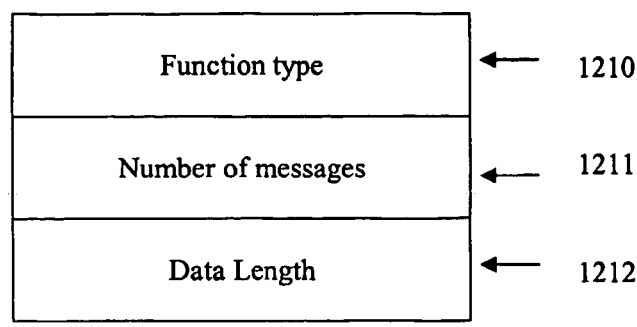
FIG. 9B is a diagram showing a packet driver protocol data—routing header.
Figure 9C:
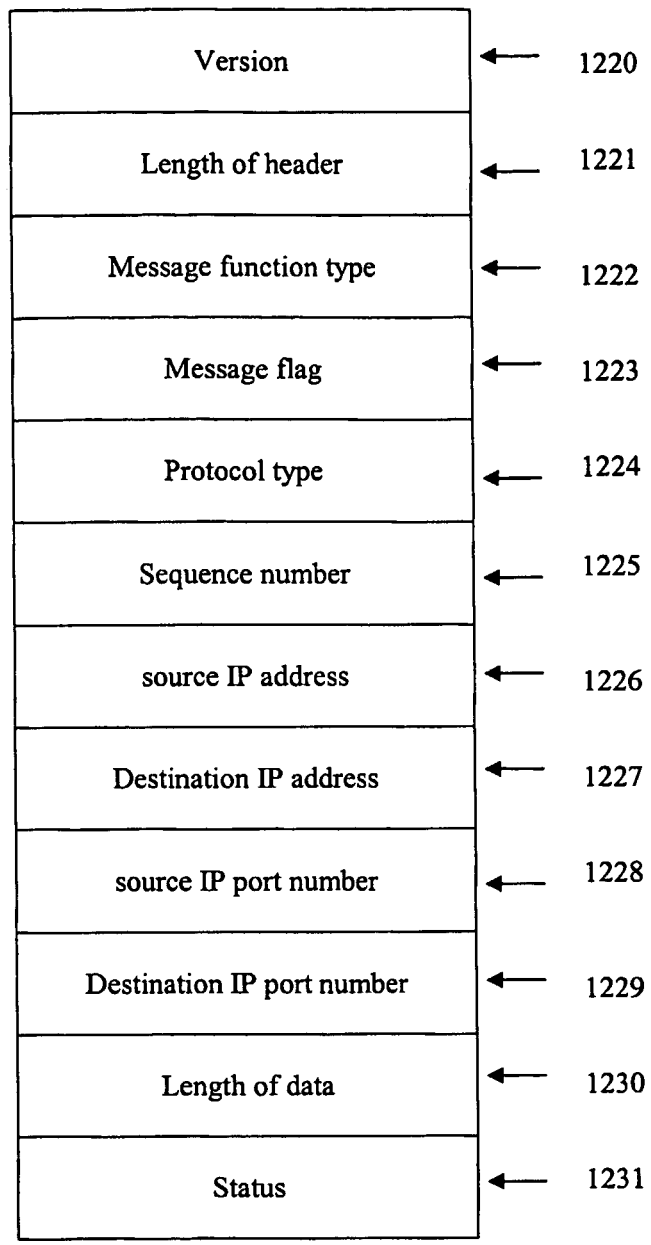
FIG. 9C is a diagram showing a packet driver protocol data—message header.

Message Header 1: 1201 contains the Message Header (see FIG. 9B). There is one Message Header for each intercepted IP packet data in the packet driver buffer. The Message Header immediately precedes the associated IP packet data.

Data contents 1: 1202 contains the data contents of an intercepted IP packet. This is the data payload that was contained in the IP packet. It does not include any data from the packet header.

Message Header 2: 1203 contains the next Message Header in the packet driver buffer.

Data contents 2: 1204 contains the next IP packet data contents in the packet driver buffer.

(up to)

Message Header n: 1205 contains the last Message Header in the packet driver buffer.

Data contents n: 1206 contains the last IP packet data contents in the packet driver buffer.

The Message Header and data contents sequence can be repeated up to the limits of the available space in the buffer.

FIG. 9B illustrates the contents of the TPO packet driver Routing Header. It consists of the following fields:

Function type: 1210 indicates the type of data in the packet driver buffer: (a) DATA: indicates normal packet data and (b) NOTIFY: indicates a notification message used for packet driver flow control.

Number of messages: 1211 specifies the number of Message Headers contained in the packet driver buffer.

Data length: 1212 specifies the total length of all data in the packet driver buffer following the Routing Header.

FIG. 9C illustrates the contents of the TPO packet driver Message Header. It consists of the following fields:

Version number 1220 indicates the version number of the packet driver protocol.

Length of this header 1221 specifies the length of this Message Header.

Message function 1222 indicates the type of this message: (a) DATA indicates normal packet data; (b) FLOW indicates a flow control message; (c) CONNREQ indicates a user application connection request; (d) CONNRESP indicates a user application connection response; (e) ERROR indicates a packet driver error message.

Message flag 1223 specifies flags: (a) FSTART indicates the start of flow control and (b) FSTOP indicates the stop of flow control.

Protocol type 1224 specifies the protocol type of the intercepted IP packet: (a) TCP indicates the intercepted packet was the TCP protocol type; (b) UDP indicates the intercepted packet was the UDP protocol type; and (c) ICMP indicates the intercepted packet was the ICMP protocol type.

Message sequence number: 1225 specifies a sequence number assigned by the packet driver to this Message Header. These sequence numbers are maintained relative to each intercepted IP stream. For example, the packet driver buffer could contain the following messages:

(a) message sequence 1; IP packet 1 for intercepted quintuple 1* (src:p, dst:p, prot)

(b) message sequence 2; IP packet 2 for intercepted quintuple 1* (src:p, dst:p, prot)

(c) message sequence 1; IP packet 1 for intercepted quintuple 2* (src:p, dst:p, prot)

(d) message sequence 3; IP packet 3 for intercepted quintuple 1* (src:p, dst:p, prot)

(e) message sequence 2; IP packet 2 for intercepted quintuple 2* (src:p, dst:p, prot)

(f) message sequence 1; IP packet 1 for intercepted quintuple 3* (src:p, dst:p, prot)

Intercepted source IP address: 1226 specifies the source IP address of the intercepted IP packet.

Intercepted destination IP address: 1227 specifies the destination IP address of the intercepted IP packet.

Intercepted source port number: 1228 specifies the source port number of the intercepted IP packet.

Intercepted destination port number: 1229 specifies the destination port number of the intercepted packet.

Length of data: 1230 specifies the total length of data following this header.

Status code: 1231 specifies the completion status of Packet Driver requests.

Collectively, fields 1226, 1228, 1227, 1229, and 1224 are referred to as a "quintuple".

Thus a transport protocol optimizer for optimizing the end-to-end throughput of data transported over TCP/IP networks is provided. One skilled in the art will appreciate that the invention can be practiced by other than the described embodiments, which are presented for purposes of illustration and not limitation, and the present invention is limited only by the claims that follow.

What is claimed:

1. A method of transport protocol optimization of an internet protocol for efficiently moving large amounts of data, comprising the steps of:
    (a) using a source packet interceptor at a source network location to intercept an IP packet from a source application, the source packet interceptor examines an IP header of the IP packet to determine if it is an IP packet to be intercepted,
    (b) using a source edge process at the source network location to act as the new destination for the source application resulting in terminating the connection between the source application and a destination application such that the source edge process becomes the new endpoint for the connection from the source application, and generating transport protocol acknowledgment messages with the source edge process and sending them to the source application, wherein such transport protocol acknowledgement messages would otherwise be generated on behalf of the destination application,
    (c) using a source packet driver at the source network location to aggregate the intercepted IP packets from the source application while retaining all IP header routing information for the intercepted IP packets,
    (d) using a source compression engine at the source network location to compress the aggregated IP packets,
    (e) using a source data mover at the source network location to transport the compressed and aggregated IP packets over a communication link to a destination data mover at a destination network location,
    wherein the source packet interceptor, source edge process, source packet driver, source compression engine and source data mover are integrated into a source transport protocol optimization system and the source transport protocol system is attached to a source LAN, the packets from the source application transported over the source LAN to the source transport protocol system;
    (f) using a destination compression engine at the destination network location to decompress the compressed and aggregated IP packets,
    (g) using a destination packet driver at the destination network location to disaggregate the transported aggregated packets, and
    (h) using a destination edge process at the destination network location to deliver the disaggregated IP packets to the destination application;
    wherein the destination compression engine, destination packet driver, destination edge process are integrated into a destination transport protocol optimization system and the destination transport protocol system is attached to a destination LAN, the packets from the destination transport protocol optimization system transported over the destination LAN to the destination application.

2. The transport protocol optimization method of claim 1, comprising the step of using IP routing.

3. The transport protocol optimization method of claim 1, the IP packet comprising a TCP, UDP, ICMP, or other type of IP packet.

4. The transport protocol optimization method of claim 1, the step of intercepting an IP packet from the source application comprises the steps of comparing the IP packet's address to packet addresses in a look-up table and (b) intercepting only those source packets with the same addresses as those stored in the look-up table.

5. The transport protocol optimization method of claim 4 comprising the step of modifying the destination address of the IP packets accepted for interception to be the address of the source packet interceptor.

6. The transport protocol optimization method of claim 1, the address of the IP packet comprises the packet's source IP address, source port number, destination IP address, destination port number, and protocol type.

7. The transport protocol optimization method of claim 1, the step of intercepting an IP packet from the source application comprises the step of routing the IP packet to an edge process that is unique to the address of the IP packet.

8. The transport protocol optimization method of claim 7, comprising the step of combining a routing header field, a message header field, and the intercepted IP packet data from the edge process.

9. The transport protocol optimization method of claim 7, comprising the step of creating a edge process for each TCP application connection; a UDP edge process for each UDP intercept; and a ICMP edge process for a ICMP intercept.

10. The transport protocol optimization method of claim 1, the step of intercepting an IP packet from the source application comprises the steps of a source edge process (a) reading the data contained in the routed IP packets and (b) forming a message header field for the routed IP packets.

11. The transport protocol optimization method of claim 10, the message header comprises a version field, a length of header field, a message function type field, a message flag field, a protocol type field, a sequence number field, a source IP address field, a destination IP address field, a source IP port number field, a destination IP port number field, a length of data field, and a status field.

12. The transport protocol optimization method of claim 1, comprising the step of the packet driver forming a packet driver message.

13. The transport protocol optimization method of claim 12, the packet driver message comprises the message header field and intercepted IP packet data from the source edge process.

14. The transport protocol optimization method of claim 13, comprising the step of forming a plurality of packet driver messages.

15. The transport protocol optimization method of claim 14, comprising the step of aggregating multiple packet driver messages into a packet driver buffer.

16. The transport protocol optimization method of claim 15, the size of the aggregated packet driver messages is less than or equal to a predetermined maximum size of the buffer.

17. The transport protocol optimization method of claim 16, comprising the step of the packet driver forming a routing header in the packet driver buffer that precedes a first packet driver message.

18. The transport protocol optimization method of claim 17, the routing header comprises a function type field, a number of packet driver messages field, and a data length field.

19. The transport protocol optimization method of claim 1, comprising the step of routing the aggregated packet driver messages to the source data mover.

20. The transport protocol optimization method of claim 19, further comprising transmitting a packet driver buffer over a communication link comprising one or more of the steps of (a) inserting data mover fields into the start of the packet driver buffer; (b) reducing the size of the packet driver buffer by breaking the buffer into multiple segments, with each segment being no greater than the size specified in the configuration file; (c) using standard UDP socket calls to interface with the TCP stack for UDP delivery of the segments over the network.

21. The transport protocol optimization method of claim 20, the communication link comprising a TCP, UDP, or other TCP/IP link.

22. The transport protocol optimization method of claim 21, the TCP, UDP, or other TCP/IP link for transporting the stored packets is over a WAN.

23. The transport protocol optimization method of claim 20, the data mover protocol comprising (a) data mover transport data subfield, and (b) data mover transport acknowledgement subfield.

24. The transport protocol optimization method of claim 23, the data mover transport data subfield comprising the length of the entire subfield, the subfield type code, the logical sequence number of the packet driver buffer or packet drive buffer segment, and the physical sequence number of the packet driver buffer or packet driver buffer segment.

25. The transport protocol optimization method of claim 23, the data mover transport acknowledgement subfield comprising the length of the entire subfield, the subfield type code, the highest physical block number sent from the source packet driver to the destination packet driver over a communication link, the highest physical block number received by the source packet driver that was sent by the destination packet driver over a communication link, the bit-significant flags representing the blocks received, and the rate of data delivery to the destination packet driver.

26. The transport protocol optimization method of claim 1, the packets intercepted by an operating system exit point.

27. The transport protocol optimization method of claim 1, comprising the step of opening a connection between a source application and a destination data application.

28. The transport protocol optimization method of claim 27, comprising the steps of (a) opening a connection between the source application and the source edge processor and (b) opening a connection between the destination edge processor and the destination application.

29. The transport protocol optimization method of claim 28, comprising the steps of (a) transporting packets from the source application to the source packet interceptor over a source LAN and (b) transporting packets delivered to a destination data mover to a destination application over a destination LAN.

30. A method of internet protocol optimization and efficiently moving large amounts of data, comprising the steps of:
(a) using a source packet interceptor at a source network location to intercept IP packets identified in a look-up table as having a specified source address, source port number, destination address, destination port number, and protocol type;
(b) terminating the connection between the source application and a destination application and generating and sending acknowledgement messages from a source edge process to the source application that would otherwise be generated and sent on behalf of a destination application;
(c) using a source packet driver at the source network location to encapsulate the IP packets into a packet driver message, and to aggregate packet driver messages while retaining all IP header routing information for the intercepted IP packets;
(d) using a source compression engine at the source network location to compress the aggregated packet driver messages;
(e) using a source data mover at the source network location to route via IP routing the aggregated packet driver messages to a destination data mover at a destination network location over a UDP communication link;
(f) using a destination compression engine at the destination network location to decompress the aggregated packet driver messages;
(g) using a destination packet driver at the destination network location to disaggregate the packet driver messages and to dis-encapsulate the IP packets; and
(h) using a destination edge process at the destination network location to deliver the dis-encapsulated IP packets to their respective destinations;
wherein the source packet interceptor, source edge process, source packet driver, source compression engine and source data mover are integrated into a source transport protocol optimization system and the source transport protocol system is attached to a source LAN, the packets from the source application transported over the source LAN to the source transport protocol system; and
wherein the destination compression engine, destination packet driver, destination edge process are integrated into a destination transport protocol optimization system and the destination transport protocol system is attached to a destination LAN, the packets from the destination transport protocol optimization system transported over the destination LAN to the destination application.

* * * * *